US012770594B2

(12) United States Patent
Kishi

(10) Patent No.: US 12,770,594 B2
(45) Date of Patent: Oct. 20, 2026

(54) INFORMATION PROCESSING APPARATUS, INFORMATION PROCESSING METHOD, AND INFORMATION PROCESSING PROGRAM

(71) Applicant: SONY GROUP CORPORATION, Tokyo (JP)

(72) Inventor: Haruhiko Kishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 1050 days.

(21) Appl. No.: 17/756,123

(22) PCT Filed: Nov. 17, 2020

(86) PCT No.: PCT/JP2020/042871
§ 371 (c)(1),
(2) Date: May 18, 2022

(87) PCT Pub. No.: WO2021/106693
PCT Pub. Date: Jun. 3, 2021

(65) Prior Publication Data

US 2022/0406280 A1 Dec. 22, 2022

(30) Foreign Application Priority Data

Nov. 26, 2019 (JP) ................................ 2019-212913

(51) Int. Cl.
*G10H 1/00* (2006.01)
*G06F 16/638* (2019.01)
(Continued)

(52) U.S. Cl.
CPC ......... *G10H 1/0025* (2013.01); *G06F 16/639* (2019.01); *G06F 16/685* (2019.01);
(Continued)

(58) Field of Classification Search
CPC ............... G10H 1/0025; G10H 1/0041; G10H 2210/056; G10H 2210/061;
(Continued)

(56) References Cited

U.S. PATENT DOCUMENTS 9,110,817 B2 8/2015 Pachet et al.
2018/0137845 A1 5/2018 Prokop
(Continued)

FOREIGN PATENT DOCUMENTS

CN 1369091 A 9/2002
CN 109036355 A 12/2018
(Continued)

OTHER PUBLICATIONS

Fiebrink et al. ("A Meta-Instrument for Interactive, On-the-fly Machine Learning," Jun. 6, 2009, retrieved Feb. 6, 2026) (Year: 2009).*
International Search Report and Written Opinion of PCT Application No. PCT/JP2020/042871, issued on Dec. 28, 2020, 08 pages of ISRWO.

*Primary Examiner* — Jeffrey Donels
*Assistant Examiner* — Philip G Scoles
(74) *Attorney, Agent, or Firm* — XSENSUS LLP

(57) ABSTRACT

An information processing apparatus according to the present disclosure includes: a storage unit that stores a plurality of pieces of music feature information in which a plurality of types of feature amounts extracted from music information is associated with predetermined identification information, the music feature information being used as learning data in composition processing using machine learning; a reception unit that receives instruction information transmitted from a terminal apparatus; an extraction unit that extracts the music feature information from the storage unit according to the instruction information; and an output unit that outputs presentation information of the music feature information extracted by the extraction unit.

20 Claims, 35 Drawing Sheets

(51) Int. Cl.
*G06F 16/683* (2019.01)
*G06N 5/022* (2023.01)

(52) U.S. Cl.
CPC ........... *G06N 5/022* (2013.01); *G10H 1/0041* (2013.01); *G10H 2210/056* (2013.01); *G10H 2210/061* (2013.01); *G10H 2210/071* (2013.01); *G10H 2210/111* (2013.01); *G10H 2210/131* (2013.01); *G10H 2240/131* (2013.01); *G10H 2240/145* (2013.01)

(58) Field of Classification Search
CPC ....... G10H 2210/071; G10H 2210/111; G10H 2210/131; G10H 2240/131; G10H 2240/145; G06F 16/639; G06F 16/685; G06N 5/022
USPC ........................................................... 84/649
See application file for complete search history.

(56) References Cited

U.S. PATENT DOCUMENTS

| | | | | |
|---|---|---|---|---|
| 2018/0190249 | A1* | 7/2018 | Roblek .................. | G06N 3/044 |
| 2019/0164528 | A1* | 5/2019 | Sheppard ............ | G10H 1/0058 |

FOREIGN PATENT DOCUMENTS

| | | | | |
|---|---|---|---|---|
| CN | 109643533 | A | | 4/2019 |
| JP | 1-296286 | A | | 11/1989 |
| JP | 2000112472 | A | | 4/2000 |
| JP | 2011175006 | A | | 9/2011 |
| JP | 2016161774 | A | * | 9/2016 |
| JP | 2019-159146 | A | | 9/2019 |
| KR | 20190100543 | A | | 8/2019 |
| WO | 2019/176954 | A1 | | 9/2019 |

* cited by examiner

INFORMATION PROCESSING APPARATUS, INFORMATION PROCESSING METHOD, AND INFORMATION PROCESSING PROGRAM

CROSS REFERENCE TO RELATED APPLICATIONS

This application is a U.S. National Phase of International Patent Application No. PCT/JP2020/042871 filed on Nov. 17, 2020, which claims priority benefit of Japanese Patent Application No. JP 2019-212913 filed in the Japan Patent Office on Nov. 26, 2019. Each of the above-referenced applications is hereby incorporated herein by reference in its entirety.

FIELD

The present disclosure relates to an information processing apparatus, an information processing method, and an information processing program.

BACKGROUND

With the advancement of artificial intelligence (AI), utilization of computers in the field of art has been advanced. For example, a technology is known in which machine learning is performed on existing music as learning data to generate a model for music generation and a computer is caused to compose new music (for example, Patent Literature 1). In such a technology, it is possible to imitate features of existing music or generate a more natural melody by using a Markov model.

CITATION LIST

Patent Literature

Patent Literature 1: U.S. Pat. No. 9,110,817

SUMMARY

Technical Problem

According to conventional art, since music information proposed (generated) by AI can be used in composition work, a user can perform composition on the basis of more various viewpoints.

The automatic composition function by AI is set for general users, and the general users can receive automatically created music information only by setting images such as bright and dark. On the other hand, since a producer who creates music often specifically sets features of music such as chord progression and bass progression in the process of creating the music, there has been a demand from the producer to receive provision of music information that matches the features of the music rather than an image.

Therefore, the present disclosure proposes an information processing apparatus, an information processing method, and an information processing program capable of improving convenience of a music creation function by a user.

Solution to Problem

To solve the above problem, an information processing apparatus according to the present disclosure includes: a storage unit that stores a plurality of pieces of music feature information in which a plurality of types of feature amounts extracted from music information is associated with predetermined identification information, the music feature information being used as learning data in composition processing using machine learning; a reception unit that receives instruction information transmitted from a terminal apparatus; an extraction unit that extracts the music feature information from the storage unit according to the instruction information; and an output unit that outputs presentation information of the music feature information extracted by the extraction unit.

DESCRIPTION OF EMBODIMENTS

Figure 1:
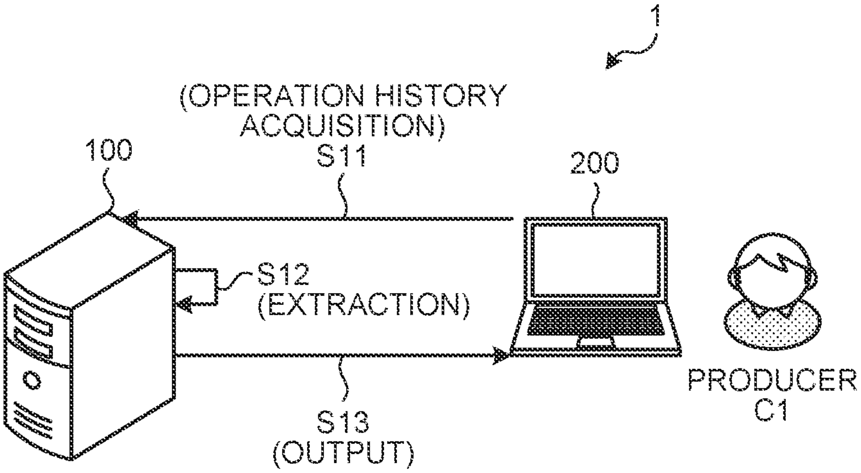
FIG. 1 is a conceptual diagram illustrating a flow of information processing according to a first embodiment.

The embodiment of the present disclosure will be described below in detail on the basis of the drawings. Note that the information processing apparatus, the information processing method, the information processing program according to the present application are not limited by the embodiment. In addition, in each embodiment described below, the same parts are designated by the same reference numerals, and duplicate description will be omitted.

The present disclosure will be described in the order of items described below.

1. First embodiment
   - 1-1. Example of the information processing according to the first embodiment
   - 1-2. Configuration of the information processing system according to the first embodiment
   - 1-3. Configuration of the information processing apparatus according to the first embodiment
   - 1-4. Configuration of the producer terminal according to the first embodiment
   - 1-5. Procedure of the information processing according to the first embodiment
   - 1-6. Effects according to the first embodiment
2. Variation of the first embodiment
   - 2-1. Example of the information processing according to variation of the first embodiment
   - 2-2. Procedure of the information processing according to variation of the first embodiment
   - 2-3. Effect according to variation of the first embodiment
3. Second embodiment
   - 3-1. Example of the information processing according to the second embodiment
   - 3-2. Configuration of the information processing system according to the second embodiment
   - 3-3. Configuration of the information processing apparatus according to the second embodiment
   - 3-4. Configuration of the general user terminal according to the second embodiment
   - 3-5. Procedure of the information processing according to the second embodiment
     - 3-5-1. Processing of presenting style information
     - 3-5-2. Processing of providing playlist
     - 3-5-3. Processing of providing music information after recomposition or arrangement
   - 3-6. Effects according to the second embodiment
4. Third embodiment
   - 4-1. Example of the information processing according to the third embodiment
   - 4-2. Configuration of the information processing system according to the third embodiment
   - 4-3. Configuration of the information processing apparatus according to the third embodiment
   - 4-4. Configuration of the general user terminal according to the third embodiment
   - 4-5. Procedure of the information processing according to a fourth embodiment
     - 4-5-1. Processing of presenting style information
     - 4-5-2. Processing of providing playlist
     - 4-5-3. Processing of providing music information after recomposition or arrangement
   - 4-6. Effects according to the third embodiment
5. Conceptual diagram of configuration of the information processing system
   - 5-1. Regarding overall configuration
   - 5-2. Regarding server apparatus
   - 5-3. Regarding music producer app unit
   - 5-4. Regarding general user app
   - 5-5. UI (user interface)
6. Other embodiments
   - 6-1. Other configuration examples
   - 6-2. Others
7. Hardware configuration

1. First Embodiment

[1-1. Example of the Information Processing According to the First Embodiment]

First, an example of information processing according to the first embodiment will be described with reference to FIG. 1. FIG. 1 is a conceptual diagram illustrating a flow of information processing according to the first embodiment. The information processing according to the first embodiment is executed by an information processing apparatus 100 and a producer terminal 200.

In the present first embodiment, a case where the information processing apparatus 100 is an information processing apparatus that provides a service related to creation of content as a copyrighted work (also simply referred to as a "service") will be described as an example. Note that, in the following, music (music content) will be described as an example of the content, but the content is not limited to music, and may be various types of content such as video content such as a movie or character content such as a book (novel or the like). In addition, the music referred to herein is not limited to one completed music (whole), and is a concept including a part of a sound source constituting one song (music) and various music information such as a short sound used for sampling.

The information processing apparatus 100 communicates with the producer terminal 200 of a user who uses the service provided by the information processing apparatus 100 by using a network N (see FIG. 6) such as the Internet. Note that the number of producer terminals 200 is not limited to that illustrated in FIG. 1.

The producer terminal 200 is an information processing terminal such as a personal computer (PC) or a tablet terminal. Various program applications are installed in the producer terminal 200. A music creation-related application is installed in the producer terminal 200. For example, the producer terminal 200 has an automatic composition function by AI added by a plug-in (extended application) to an app such as a DAW that realizes a comprehensive music production environment. For example, the plug-in may take the form of Steinberg's Virtual Studio Technology (VST) (registered trademark), AudioUnits, Avid Audio eXtension (AAX), or the like. In addition, the producer terminal 200 is not limited to the DAW, and may use, for example, a mobile app such as iOS.

The producer terminal 200 activates and executes the automatic composition function by the DAW and AI, communicates with the information processing apparatus 100 and receives provision of music information composed by the information processing apparatus 100. In addition, the producer terminal 200 transmits, to the information processing apparatus 100, operation history information indicating a history of operations executed with respect to the producer terminal 200 when the automatic composition function is activated.

The user of the producer terminal 200 is any one of a manager who operates and manages the entire system, a composer who creates music, an arranger, a producer such as a studio engineer, and a general user who receives provision of music information via the automatic composition function. In the present first embodiment, it is assumed that the producer terminal 200 is used by a producer Cl.

The information processing apparatus 100 is a server apparatus that executes information processing related to the automatic composition function by AI of the producer terminal 200. For example, the information processing apparatus 100 is a so-called cloud server, executes automatic composition by AI according to information an instruction of which is given by the producer terminal 200 via the network N, and provides the generated music information to the producer terminal 200.

The information processing apparatus 100 performs machine learning to generate a composition model for music generation. For example, the information processing apparatus 100 provides music information automatically composed using a Markov model or the like to the producer terminal 200.

The information processing apparatus 100 uses the style information (music feature information) as learning data of the composition model. The style information is information in which a plurality of types of feature amounts such as a chord progression, a melody, and a bass progression extracted from music information as a plurality of types of feature amounts is associated with predetermined identification information, and is used in composition processing using machine learning. The information processing apparatus 100 obtains a plurality of types of feature amounts from the copyrighted music information or the music information created by the producer, and compiles the feature amounts and assigns a style information ID (predetermined identification information) for each piece of music information to generate a plurality of pieces of style information and create a database.

Figure 2:
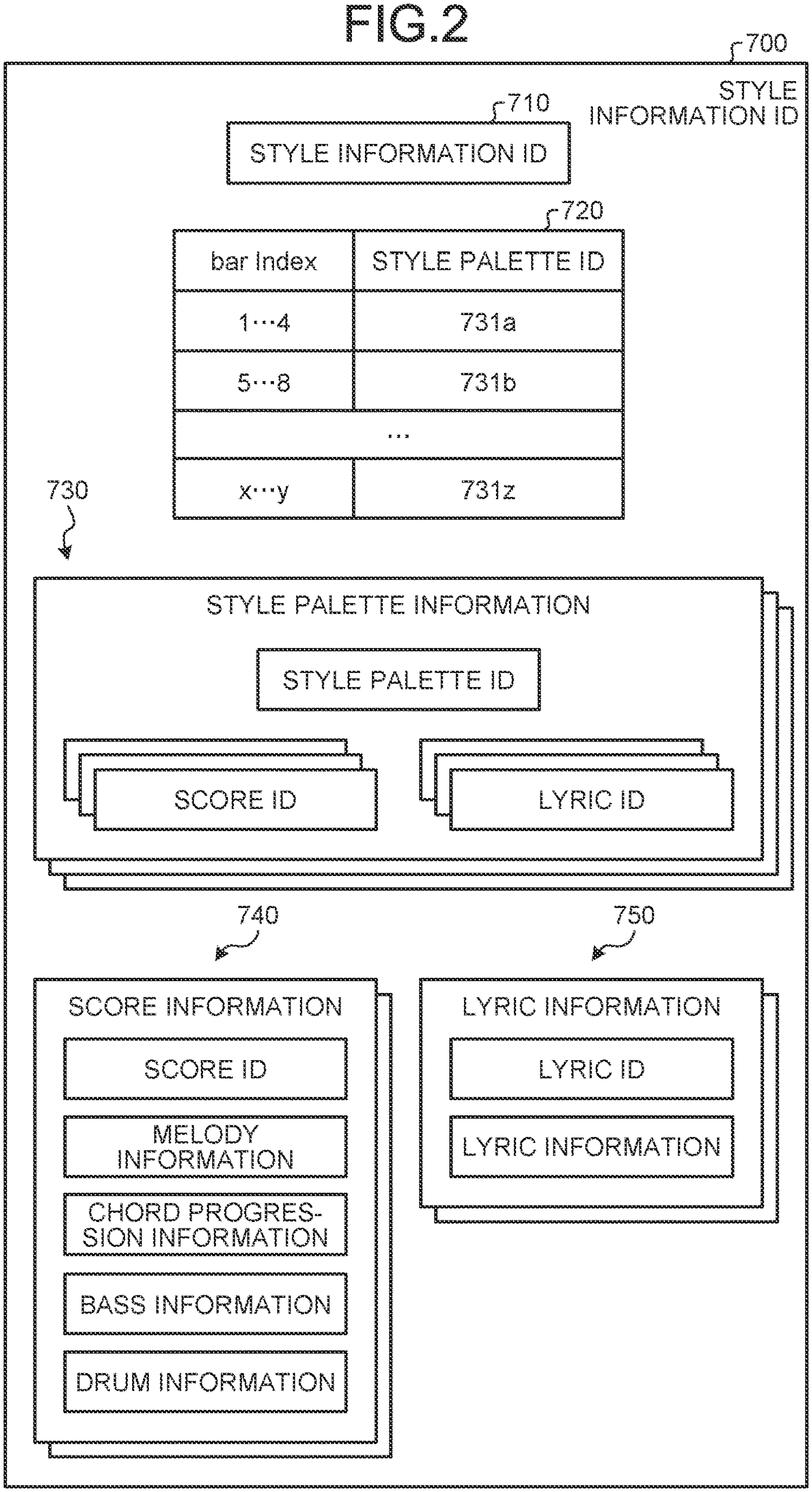
FIG. 2 is a diagram illustrating an example of a data configuration of style information according to the first embodiment.

FIG. 2 is a diagram illustrating an example of a data configuration of style information according to the first embodiment. The style information includes a style information ID 710, which is identification information of the style information, style palette sequence information 720 (music order information), style palette information 730 (music format information), score information 740, and lyric information 750.

The score information 740 includes a plurality of types of feature amounts extracted from music. The score information 740 includes a score ID, melody information, chord progression information, bass information, and drum information. The score ID is identification information of the score information. The melody information is a melody in a bar having a prescribed length. The chord progression information is information indicating a chord progression in a bar having a prescribed length. The bass information is information indicating a bass sound progression in a bar having a prescribed length. The drum information is information indicating a drum sound progression (pattern or tempo of the drum) in a bar having a prescribed length.

The lyric information 750 includes a lyric ID and lyric information. The lyric ID is identification information of the lyric information. The lyric information is information indicating lyrics in a bar having a prescribed length. The lyric information is, for example, phrases or character keywords which are a source of the lyrics, and automatic lyric writing using a plurality of pieces of lyric information is also possible.

The style palette information 730 is information in which the score ID of the score information 740 and the lyric ID of the lyric information 750 for the same bar are registered in association with a style palette ID that is identification information of the style palette information.

For the style palette information 730, similar chord progressions of chord information from the pieces of the score information 740 and lyric information 750 may be bundled. The similar chord progression is, for example, an identical chord progression. Alternatively, the similar chord progression may be such that each chord is classified into Tonic (T), Sub-dominat (S), and Dominat (D) and the sequences of T, S, and D are the same. Note that in the case of C major and A minor, T is C/Em/Am, S is F and Dm, and D is G and Dm7-5. Then, since both chord progressions C-D-G-C and Em-Dm-Bm7-5-Am are T-S-D-T, they can be considered as the same chord progression. In addition, regarding the similar chord progression, the similar chord progression can be classified, for example, on the basis of machine learning or deep learning, instead of using music theory.

The style palette sequence information 720 is information indicating the order of the style palette information 730. The style palette sequence information 720 includes a plurality of sets, each set including the style palette ID uniquely indicating the style palette information 730 and a bar index so as to be information for managing the order of the style palette information 730 in music. For example, in the case of the example illustrated in FIG. 2, it is defined that first to fourth bars of music correspond to a style palette ID 731*a*, fifth to eighth bars correspond to a style palette ID 731*b*, and x-th to y-th bars correspond to a style palette ID 731*z*.

The information processing apparatus 100 performs machine learning using the style information 700 as learning data and performs composition processing. Therefore, the information processing apparatus 100 does not learn the music information itself, but learns the style information including the plurality of types of feature amounts such as a chord progression, a melody, a bass progression, and the like extracted from the music information. That is, since the information processing apparatus 100 learns the plurality of feature amounts extracted in advance from the music information, the load of the information processing is small as compared with the double of learning the music information itself, and the music information to the user can be efficiently provided.

In addition, the information processing apparatus 100 presents style information that is a candidate for learning data to the producer terminal 200 at the time of composition by the producer. The producer can select style information having a desired feature from the presented style information, and the information processing apparatus 100 can provide the producer with music information composed on the basis of the style information selected by the producer. Thus, the producer can obtain music information matching the feature of the music selected by the producer.

Figure 3:
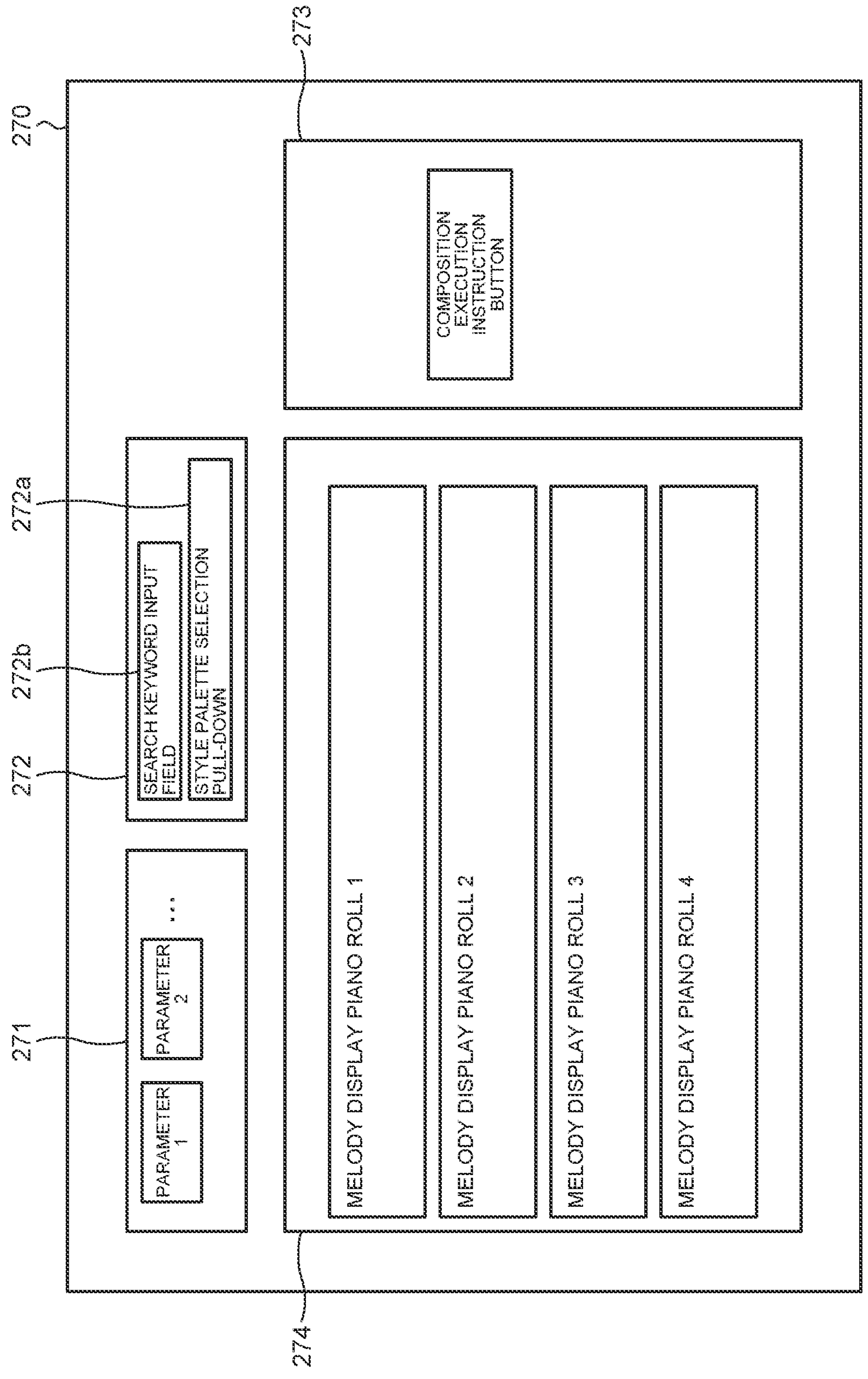
FIG. 3 is a diagram illustrating an example of a display screen of a user terminal according to the first embodiment.
Figure 4:
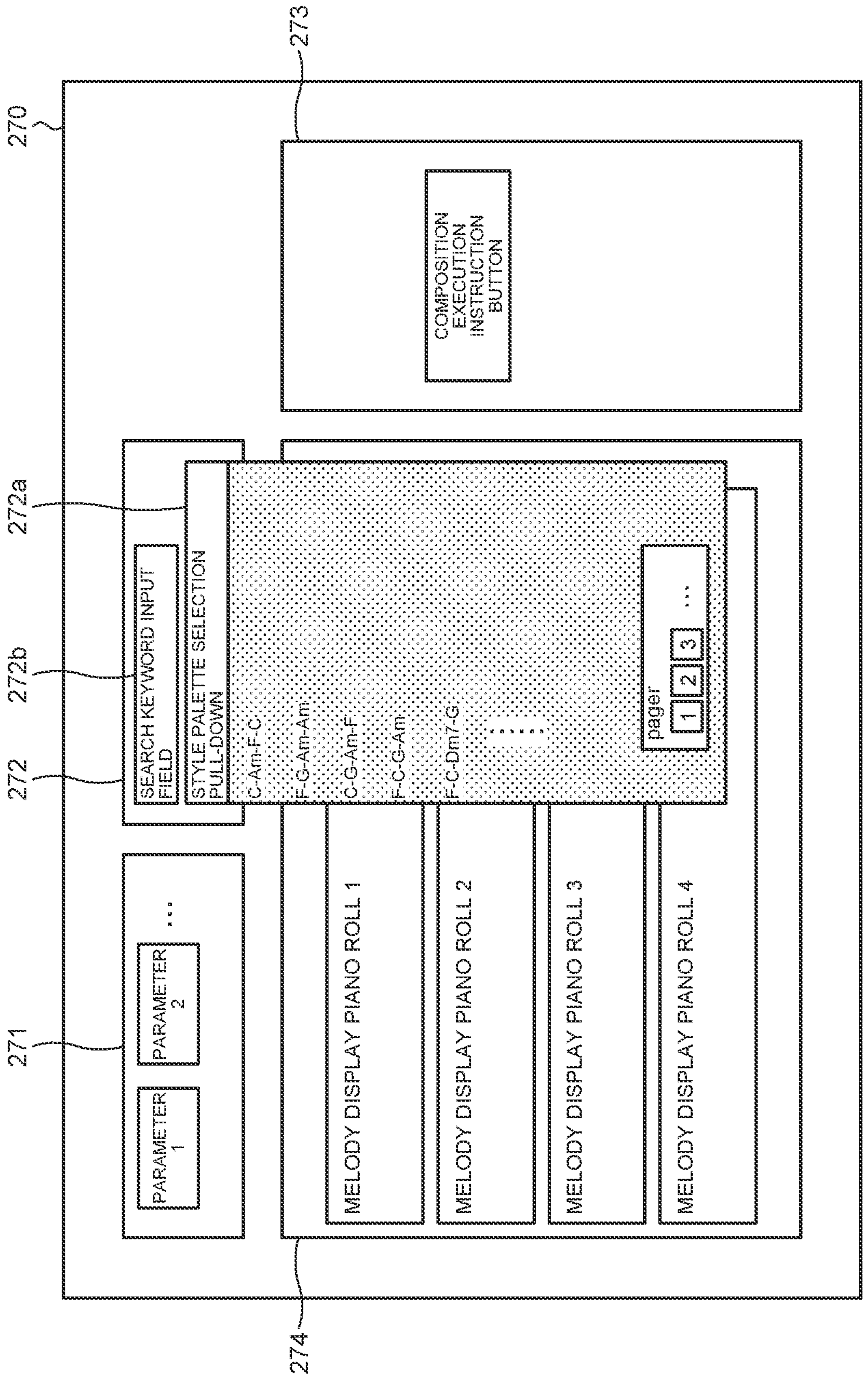
FIG. 4 is a diagram illustrating an example of a display screen of a user terminal according to the first embodiment.
Figure 5:
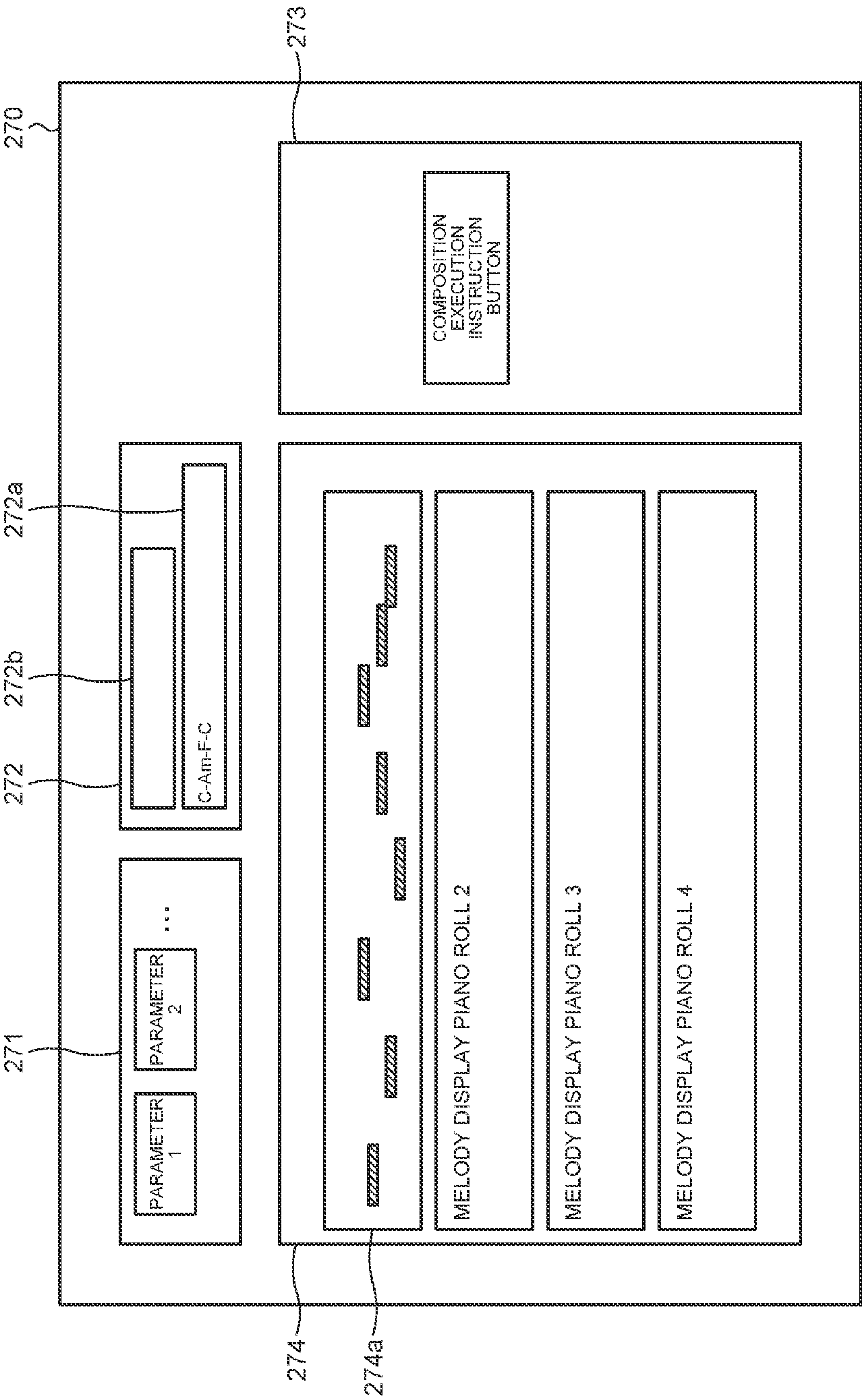
FIG. 5 is a diagram illustrating an example of a display screen of a user terminal according to the first embodiment.

Specifically, a process of music creation by a producer will be described. FIGS. 3 to 5 are diagrams illustrating an example of a display screen of the producer terminal 200 according to the first embodiment. When the producer activates the automatic composition function on the producer terminal 200, a window 270 illustrated in FIG. 3 is displayed on the producer terminal 200.

Note that the window 270 includes a composition parameter setting unit 271, a style information display unit 272, a composition control unit 273, and a produced music display editing unit 274. The composition parameter setting unit 271 is a region in which parameters such as a note duration and complexity can be set. The style information display unit 272 is a region in which style information to be used for composition can be selected by keyword input or pull-down selection. The composition control unit 273 is a region in which a composition instruction can be made by selecting a composition execution instruction button. The produced music display editing unit 274 is a region in which a plurality of piano rolls on which melodies and lyrics are displayed is displayed.

Then, as illustrated in FIG. 4, when a style palette selection pull-down 271*a* is selected, the chord progression of each style information included in the information processing apparatus 100 is displayed in a list as a candidate.

The chord progression candidates may be displayed in any order such as an alphabetical order, an order in which the number of times of use by the producer is large, an order in which the number of times of use by all users is large, and an order of generation of style information. Regarding the chord progression, all the style information included in the information processing apparatus 100 may be displayed. In addition, regarding the chord progression, only a part of the style information included in the information processing apparatus 100 may be displayed. In this case, regarding the chord progression, among the style information ranked using a predetermined rule, chord progressions of the style information of predetermined ranks are displayed in the style palette selection pull-down 271*a* in order of ranking.

Then, when there are many chord progression candidates, the display region can be selected with a pager. In addition, the producer can also input a desired chord progression in the search keyword input field. In this case, the information processing apparatus 100 ranks the style information having the input chord progression as the feature amount using a predetermined rule, and extracts the style information of the preset rank. This ranking is set, for example, in correspondence with the number of pieces of chord progression information that can be displayed as a list in a style palette selection pull-down 371*a* of the producer terminal 200. Then, the information processing apparatus 100 may display a list of the chord progression information of the extracted style information in the style palette selection pull-down 371*a* of the producer terminal 200 in descending order of ranking.

The producer selects a desired chord progression from the chord progressions presented in the style palette selection pull-down 371*a* and selects the composition execution instruction button. The producer selects, for example, a chord progression "C-Am-F-C".

Thus, the information processing apparatus 100 extracts the style information having the selected chord progression "C-Am-F-C", performs machine learning using the extracted style information 700 as learning data, and performs the composition processing. Then, the information processing apparatus 100 provides music information to the producer terminal 200.

In response to this, on the screen of the producer terminal 200, the melody of the music information provided from the information processing apparatus 100 is displayed on a melody display piano roll 374*a* of FIG. 5. Thus, the producer can receive the provision of the music information generated in accordance with the chord progression only by selecting the desired chord progression from the chord progressions presented in the style palette selection pull-down 371*a*.

As described above, the information processing apparatus 100 creates a database of the style information including the plurality of types of feature amounts of the music information, and presents the style information to the producer. Then, the information processing apparatus 100 causes the composition model to learn the style information selected by the producer as learning data. Thus, the information processing apparatus 100 provides the producer with the music information composed in accordance with the features of the music selected by the producer.

In addition, when presenting the style information to the producer, the information processing apparatus 100 presents style information of a predetermined rank among the style information ranked using the predetermined rule. For example, the information processing apparatus 100 receives the operation information in the producer terminal 200 as the instruction information, and extracts the style information according to the instruction information. When an application (DAW or automatic composition function) is activated, the information processing apparatus 100 acquires, from the producer terminal 200, operation history information indicating a history of operations executed with respect to the producer terminal 200 by the producer who creates the music. Then, the information processing apparatus 100 ranks the style information used to compose the music information in descending order of the number of times of predetermined operation with respect to the music information on the basis of the operation history information.

The predetermined operation is, for example, reproduction, editing, selection of the composition execution instruction button, or the like. The music information that has been reproduced many times and the music information that has been edited many times are considered to match the producer's preference. Therefore, the information processing apparatus 100 obtains music information in which the number of times of reproduction and arrangement is larger than a predetermined number from the operation history information, and ranks the style information used to compose the music information in descending order of the number of times of reproduction and correction. Alternatively, the information processing apparatus 100 may register these pieces of style information as favorite style learning, present the favorite style information again, or present style information similar to the favorite style information.

In addition, it is considered that the music information that has been partially reproduced but has been immediately subjected to the automatic composition processing does not match the producer's preference. Therefore, the information processing apparatus 100 lowers the rank of the style information used for the music information. Alternatively, the information processing apparatus 100 may register the style information as unfavorite style information and may not present the unfavorite style information again.

The information processing apparatus 100 presents style information of a preset rank among the style information ranked by such rule to the producer in order of ranking. As a result, since the style information matching the producer's preference is presented to the producer terminal 200, the producer can receive the provision of the music information close to the own style by selecting the style information matching the producer's preference. Hereinafter, a flow of style information presentation processing in the information processing according to the present embodiment will be described with reference to FIG. 1.

When receiving the presentation information of the style information from the information processing apparatus 100 while creating the music, the producer terminal 200 presents, for example, the chord progression of the style information in the style palette selection pull-down 371*a*. When the producer selects a desired chord progression from the presented chord progression, the information processing apparatus 100 composes music on the basis of the style information having the selected chord progression and provides the music to the producer terminal 200.

Then, the information processing apparatus 100 acquires, from the producer terminal 200, the operation history information indicating a history of operations executed with respect to the general user terminal 300 by the producer when the application is activated (Step S11). The information processing apparatus 100 ranks the style information used in the music information in descending order of the number of times of reproduction and editing with respect to the music information, and extracts the style information of the preset rank (Step S12). Then, the information processing apparatus 100 outputs the presentation information of the extracted style information to a producer terminal apparatus (Step S13).

As described above, in the information processing according to the present first embodiment, the operation history information with respect to the producer terminal 200 by the producer is analyzed, and the style information matching the producer's preference is presented to the producer terminal 200, so that the convenience of the music creation function by the producer is improved.

Figure 6:
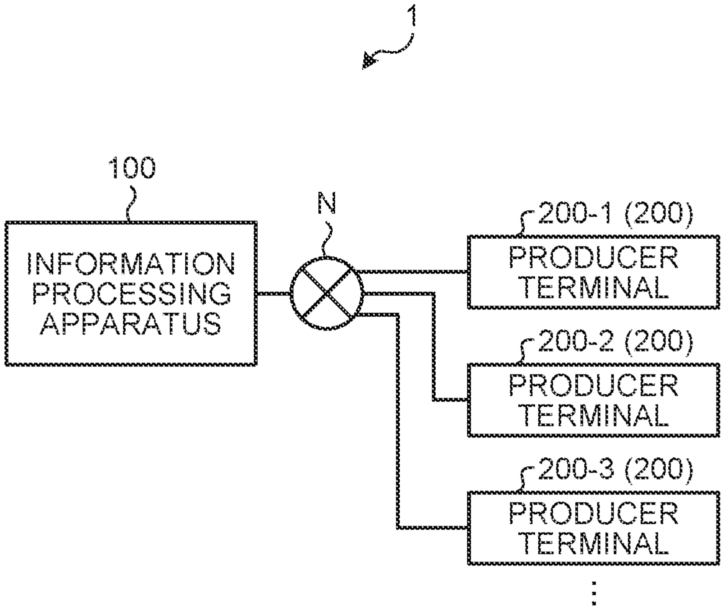
FIG. 6 is a diagram illustrating an example of an information processing system according to the first embodiment.

The overview of the overall flow of the information processing according to the present first embodiment has been described above. In FIG. 6 and subsequent drawings, a configuration of an information processing system 1 including the information processing apparatus 100 and the producer terminal 200 will be described, and details of various processing will be described in order.

[1-2. Configuration of the Information Processing System According to the First Embodiment]

FIG. 6 is a diagram illustrating an example of the information processing system 1 according to the first embodiment. As illustrated in FIG. 6, the information processing system 1 includes producer terminals 200-1 to 200-3 and the information processing apparatus 100. The information processing system 1 functions as an automatic composition function management system. In the example of FIG. 6, three producer terminals 200-1 to 200-3 are illustrated, but are referred to as the producer terminal 200 when described without particular distinction.

The information processing apparatus 100 and the producer terminal 200 are communicably connected to each other by wire or wirelessly via the network N.

The producer terminal 200 transmits, to the information processing apparatus 100, instruction information by the producer and the operation history information with respect to the producer terminal 200 by the producer when the automatic composition function is activated. When the automatic composition function is activated, the producer terminal 200 receives provision of the music information composed by the information processing apparatus 100.

The information processing apparatus 100 includes a plurality of pieces of style information generated from the music information as learning data of machine learning. Then, the information processing apparatus 100 performs machine learning using the style information to generate a composition model, and provides the composed music information to the producer terminal 200. At this time, the information processing apparatus 100 extracts the style information according to the instruction information transmitted from the producer terminal 200, outputs the presentation information of the extracted style information to the producer terminal 200, and supports the producer in creating the music.

[1-3. Configuration of the Information Processing Apparatus 100 According to the First Embodiment]

Figure 7:
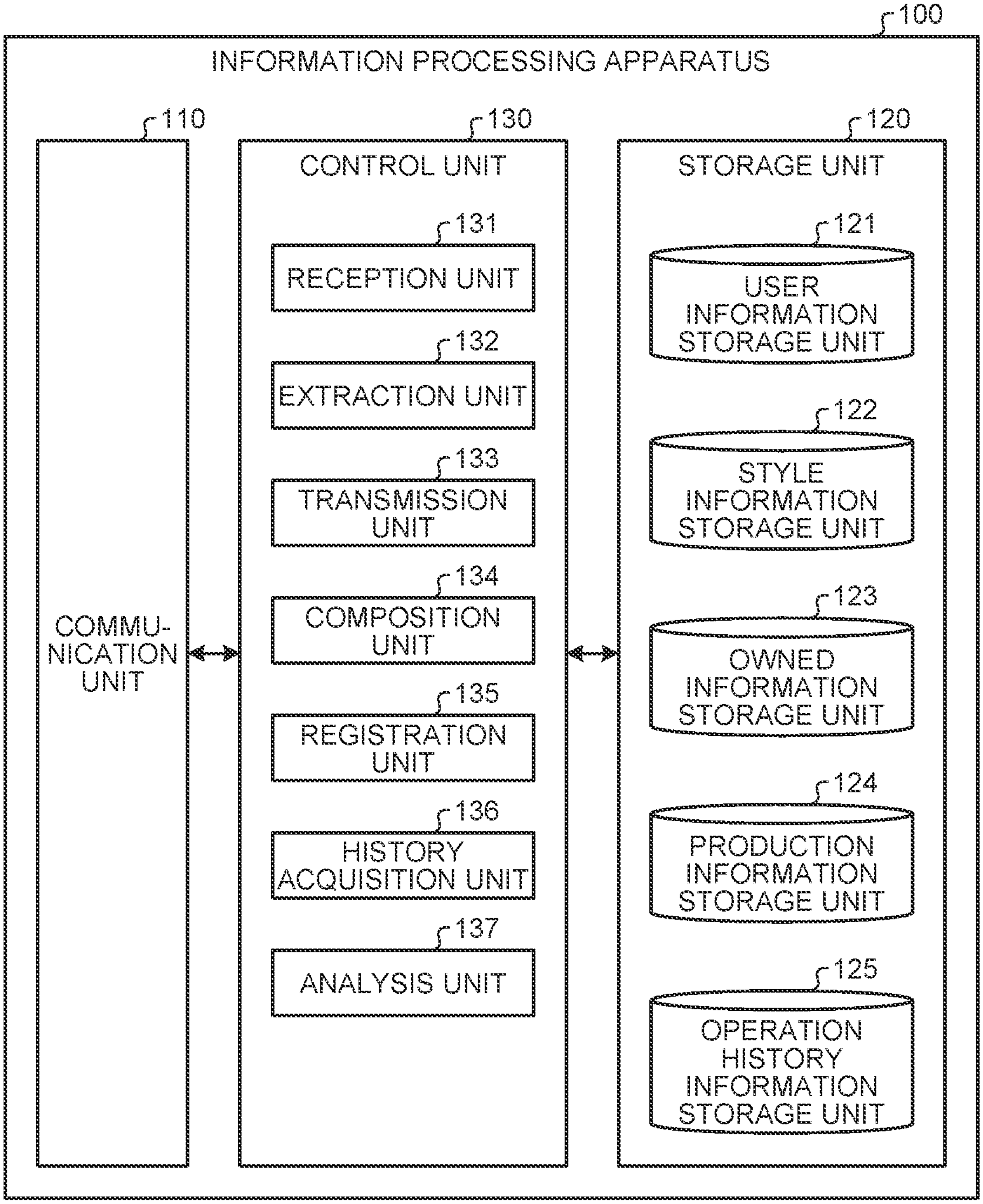
FIG. 7 is a diagram illustrating a configuration example of an information processing apparatus according to the first embodiment.

Next, a configuration of the information processing apparatus 100 illustrated in FIG. 6 will be described with reference to FIG. 7. FIG. 7 is a diagram illustrating a configuration example of the information processing apparatus 100 according to the first embodiment. As illustrated in FIG. 7, the information processing apparatus 100 includes a communication unit 110, a storage unit 120, and a control unit 130.

The communication unit 110 is realized by, for example, a network interface card (NIC) or the like. The communication unit 110 is connected to the network N by wire or wirelessly, and transmits and receives information to and from the producer terminal 200 via the network N.

The storage unit 120 is realized by, for example, a semiconductor memory element such as a random access memory (RAM) or a flash memory, or a storage apparatus such as a hard disk or an optical disk. The storage unit 120 stores various data used for information processing. The storage unit 120 includes a user information storage unit 121, a style information storage unit 122, an owned information storage unit 123, a production information storage unit 124, and an operation history information storage unit 125.

Figure 8:
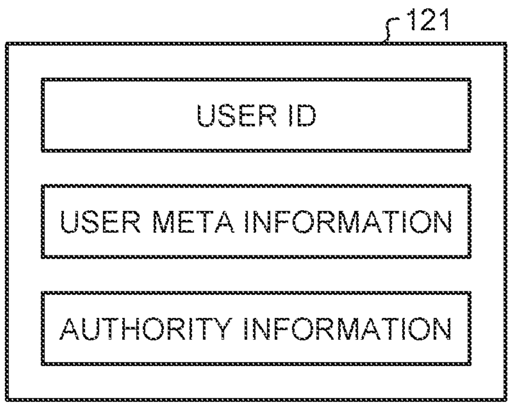
FIG. 8 is a diagram illustrating an example of a user information storage unit according to the first embodiment.

The user information storage unit 121 stores various information regarding the user (user information). FIG. 8 is a diagram illustrating an example of the user information storage unit 121 according to the first embodiment.

The user information storage unit 121 stores user information including a user ID, user meta information, and authority information. The user information storage unit 121 stores the user meta information or the authority information corresponding to each user ID in association with each user ID.

The user ID indicates identification information for uniquely specifying the user. For example, the user ID indicates identification information for uniquely specifying a user such as a producer, a general user, a system manager, or the like. The user meta information is, for example, additional information of the user such as a name and an address of the user. As the authority information, for example, values for identifying the authority such as system manager authority information, producer authority information, and general user authority information are stored. Note that the user information storage unit 121 is not limited to the above, and may store various types of information depending on the purpose. Various information related to the user may be stored in the user meta information. For example, in a case where the user is a natural person, demographic attribute information, psychographic attribute information such as gender and age of the user, and the like may be stored in the user meta information.

Figure 9:
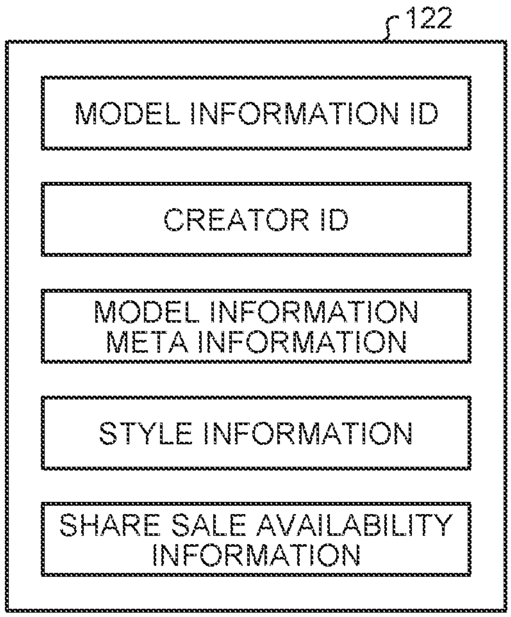
FIG. 9 is a diagram illustrating an example of a style information storage unit according to the first embodiment.

The style information storage unit 122 stores information regarding the composition model. FIG. 9 is a diagram illustrating an example of the style information storage unit 122 according to the first embodiment.

The style information storage unit 122 stores learning model information including a model information ID, a creator ID, model information meta information, the style information 700, a copyrighted work ID, and share availability information. The style information storage unit 122 stores the creator ID, the model information meta information, the style information, the copyrighted work ID, and the share availability information corresponding to each model information ID in association with each model information ID.

The model information ID indicates identification information for uniquely specifying the composition model information. The creator ID indicates identification information for uniquely specifying the creator of the corresponding composition model information. For example, the creator ID indicates identification information for uniquely specifying a user such as a system manager, a producer, a general user, or the like.

The model information meta information is, for example, information indicating a feature of a copyrighted work to be learned. The learning model information meta information is information such as tempo of music, genre, atmosphere such as light and dark, structure of music such as 1st verse, 2nd verse, and chorus, chord progression, scale, and a church mode.

The style information 700 is learning data of the composition model included in the information processing apparatus 100. As described in FIG. 2, the style information 700 is information in which a plurality of types of feature amounts such as a chord progression, a melody, and a bass progression extracted from music information is associated with predetermined identification information.

The share availability information indicates, for example, whether the corresponding learning model can be shared. As the share availability information, for example, a value for specifying and identifying whether or not the corresponding learning model can be shared is stored.

Note that the style information storage unit 122 is not limited to the above, and may store various types of information depending on the purpose. For example, the composition model information meta information may store various types of additional information related to the composition model, such as information related to a date and time when the composition model is created.

Figure 10:
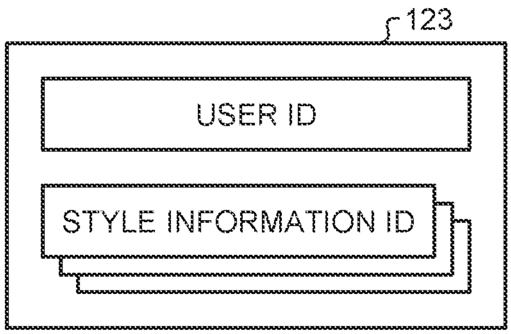
FIG. 10 is a diagram illustrating an example of an owned information storage unit according to the first embodiment.

The owned information storage unit 123 stores various information regarding the style information selected at the time of creating the music by the producer who creates the music. FIG. 10 is a diagram illustrating an example of the owned information storage unit 123 according to the first embodiment. The owned information storage unit 123 stores the user ID of the producer who creates the music and the style information ID selected by the producer in association with each other.

Figure 11:
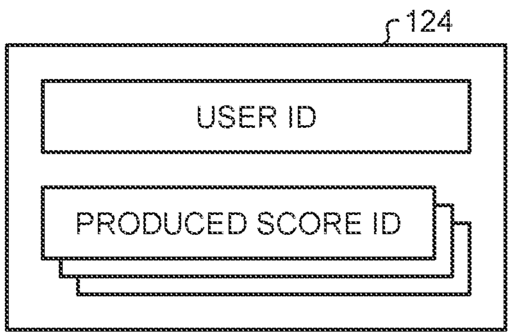
FIG. 11 is a diagram illustrating an example of a production information storage unit according to the first embodiment.

The production information storage unit 124 stores various information regarding the produced music. FIG. 11 is a diagram illustrating an example of the production information storage unit 124 according to the first embodiment. As illustrated in FIG. 11, the production information storage unit 124 stores the user ID of the producer who created the music and the score ID produced by the producer in association with each other.

Figure 12:
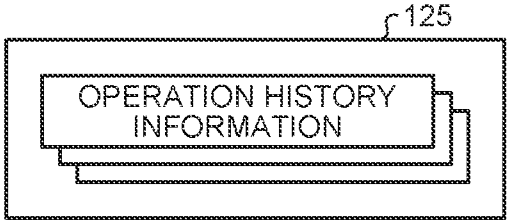
FIG. 12 is a diagram illustrating an example of an operation history information storage unit according to the first embodiment.

The operation history information storage unit 125 stores operation history information by the producer with respect to the producer terminal 200. FIG. 12 is a diagram illustrating an example of the operation history information storage unit 125 according to the first embodiment.

As illustrated in FIG. 12, the operation history information storage unit 125 stores operation history information with respect to the producer terminal 200 by the producer. For example, each piece of the operation history information is associated with the user ID of each producer. The operation history information is information indicating a history of operations executed with respect to the producer terminal 200 by the producer when the automatic composition function is activated. For example, the operation history information may include various information regarding the operation of the producer, such as the content of the operation performed by the producer, the date and time when the operation was performed, or the like. Examples of the operation include selection of style information presented from the information processing apparatus 100, selection of a composition execution instruction button, and reproduction and editing of music information received from the information processing apparatus 100.

Referring back to FIG. 7, the description will be continued. The control unit 130 is realized by, for example, a central processing unit (CPU), a micro processing unit (MPU), or the like executing a program stored inside the producer terminal 200 using a random access memory (RAM) or the like as a work area. In addition, the control unit 130 is a controller and may be realized by, for example, an integrated circuit such as an application specific integrated circuit (ASIC) or a field programmable gate array (FPGA).

The control unit 130 includes a reception unit 131, an extraction unit 132, a transmission unit 133, a composition unit 134, a registration unit 135, a history acquisition unit 136, and an analysis unit 137, and realizes or executes a function or operation of information processing described below.

The reception unit 131 communicates with the producer terminal 200, and receives various information. The reception unit 131 receives instruction information related to the output of the presentation information of the style information from the producer terminal 200. The instruction information is operation information related to the terminal apparatus.

Specifically, the instruction information is composition start information associated with activation of the automatic composition function or information giving an instruction on automatic composition. In addition, the instruction information is information for selecting one piece of the score information. Specifically, the instruction information is information related to the feature amounts of the music information such as the chord progression information input by the producer as the feature amount of the music, the lyric information indicating the lyrics to be searched, or the like. In addition, the instruction information is selection information or the like for selecting one piece of the style information presented by the information processing apparatus 100. In addition, the instruction information is the operation history information by the producer with respect to the producer terminal 200.

The extraction unit 132 extracts the style information from the style information storage unit 122 according to the instruction information received by the reception unit 131. In a case where the instruction information is information regarding the feature amounts of the music information such as the chord progression information, the extraction unit 132 ranks the plurality of pieces of style information using a predetermined rule on the basis of the feature amounts indicated by the instruction information, and extracts the style information of the preset rank.

For example, the extraction unit 132 obtains music information in which the number of times of predetermined operation exceeds a threshold value on the basis of the operation history information of the producer stored in the operation history information storage unit 125. Then, the extraction unit 132 ranks the style information used for the obtained music information in descending order of the number of times of predetermined operation, and extracts the style information of the preset rank. The predetermined operation is reproduction or editing. The extraction unit 132 obtains music information in which the number of times of reproduction and correction is larger than a predetermined number from the operation history information, and ranks the style information used to compose the music information in descending order of the number of times of reproduction and correction.

The transmission unit 133 transmits various information to an external apparatus. For example, the presentation information of the style information extracted by the extraction unit 132 is output. At this time, the transmission unit 133 transmits the presentation information of the style information extracted by the extraction unit 132 to the producer terminal 200 together with the ranking information indicating the ranking of the style information.

Thus, in the producer terminal 200, a list of the chord progressions of the style information is displayed in a selectable manner in the style palette selection pull-down in descending order of ranking. By selecting a desired chord progression from the chord progressions indicated in the style palette selection pull-down, the producer can receive the provision of the music information composed using the style information having the chord progression. In addition, the transmission unit 133 transmits the music information composed by the composition unit 134 (described below) to the producer terminal 200.

The composition unit 134 composes the music information using machine learning on the basis of the style information. Upon receiving selection information giving an instruction on selection of any of the presented style information from the producer terminal 200, the composition unit 134 acquires the selected style information from the style information storage unit 122. Then, the composition unit 134 composes the music information using machine learning on the basis of the acquired style information. The composition unit 134 may compose music using various existing music generation algorithms.

For example, the composition unit 134 may use a music generation algorithm using a Markov chain or may use a music generation algorithm using deep learning. In addition, the composition unit 134 may generate a plurality of pieces of music information with respect to the instruction information transmitted from the producer terminal 200. Thus, the producer can receive a plurality of proposals from the composition unit 134, and thus can proceed with composition work using more various information.

The registration unit 135 extracts feature amounts from performance information or the like transmitted from the producer terminal 200, and registers the extracted feature amounts as the score information. For example, in the producer terminal 200, editing of music and production of music by a performance are performed on the basis of the music information transmitted by the composition unit 134. When receiving the results of editing or the results of production from the producer terminal 200, the registration unit 135 extracts feature amounts and registers the feature amounts as the score information. The registration unit 135 generates the score information and registers the score information in the storage unit 120 until the music is completed by the producer.

The history acquisition unit 136 acquires operation history information indicating a history of operations executed with respect to the producer terminal 200 by the maker during music production. The history acquisition unit 136 may acquire target operation history information from the operation history information stored in the operation history information storage unit 125. In addition, the history acquisition unit 136 may acquire the operation history information by requesting transmission of the operation history information during music production from the producer terminal 200.

The analysis unit 137 analyzes the operation history information to obtain the number of times of each operation. The predetermined operation is, for example, reproduction or editing. Alternatively, the predetermined operation is an operation in which the automatic composition processing is immediately performed although partial reproduction is performed. The music information that has been reproduced many times and the music information that has been edited many times are considered to match the producer's preference. In addition, it is considered that the music information that has been partially reproduced but has been immediately subjected to the automatic composition processing does not match the producer's preference. Therefore, the analysis unit 137 obtains the number of times of each operation to analyze music information that matches the producer's preference or music information that does not match the producer's preference.

Then, the extraction unit 132 ranks the style information in descending order of the number of times of predetermined operation on the basis of the results of analysis by the analysis unit, and extracts the style information of the preset rank. The extraction unit 132 ranks the style information used for the music information in descending order of the number of times of reproduction and editing with respect to the music information, and extracts the style information of the preset rank. This is because the music information that has been reproduced many times and the music information that has been edited many times are considered to match the producer's preference. In addition, since it is considered that the music information which is partially reproduced but is immediately subjected to the automatic composition processing does not match the producer's preference, the extraction unit 132 may lower the rank of the style information used for this music information.

In this manner, the presentation information of the style information extracted by the extraction unit 132 on the basis of the results of analysis of the operation history information is transmitted to the producer terminal 200 by the transmission unit 133. As a result, since the style information matching the producer's preference is presented to the producer terminal 200, the producer can receive the provision of the music information close to the own style by selecting the style information matching the producer's preference.

[1-4. Configuration of the Producer Terminal 200 According to the First Embodiment]

Figure 13:
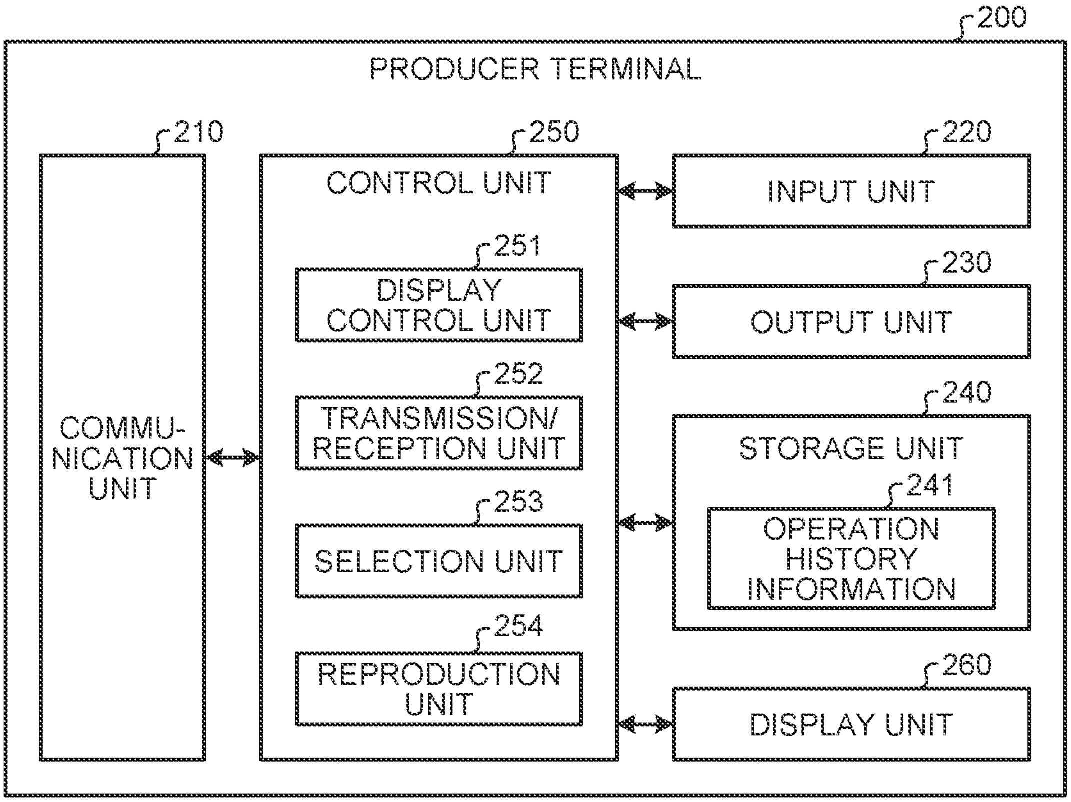
FIG. 13 is a diagram illustrating a configuration example of a producer terminal according to the first embodiment.

Next, a configuration of the producer terminal 200 illustrated in FIG. 6 will be described with reference to FIG. 13. FIG. 13 is a diagram illustrating a configuration example of the producer terminal 200 according to the first embodiment. As illustrated in FIG. 13, the producer terminal 200 includes a communication unit 210, an input unit 220, an output unit 230, a storage unit 240, a control unit 250, and a display unit 260.

The communication unit 210 is realized by, for example, a NIC, a communication circuit, or the like. The communication unit 210 is connected to the network N by wire or wirelessly, and transmits and receives information to and from another apparatus or the like such as the information processing apparatus 100, another terminal apparatus, or the like via the network N.

Various operations are input to the input unit 220 from the user. The input unit 220 includes a keyboard and a mouse connected to the producer terminal 2000. The input unit 220 receives an input from the user. The input unit 220 receives the user's input using a keyboard or a mouse. The input unit 220 may have a function of detecting a voice. In this case, the input unit 220 may include a microphone that detects a voice.

Various information may be input to the input unit 220 via the display unit 260. In this case, the input unit 220 may have a touch panel capable of realizing functions equivalent to those of a keyboard and a mouse. In this case, the input unit 220 receives various operations from the user via the display screen by a function of a touch panel realized by various sensors. Note that, as a method of detecting the user's operation by the input unit 220, a capacitance method is mainly adopted in the tablet terminal, but any method may be adopted as long as the user's operation can be detected and the function of the touch panel can be realized, such as a resistive membrane method, a surface acoustic wave method, an infrared method, and an electromagnetic induction method, which are other detection methods. In addition, the producer terminal 200 may include an input unit that also receives an operation by a button or the like.

The output unit 230 outputs various information. The output unit 230 includes a speaker that outputs a sound.

The storage unit 240 is realized by, for example, a semiconductor memory element such as a RAM or a flash memory, or a storage apparatus such as a hard disk or an optical disk. The storage unit 240 stores various information used for display of information. The storage unit 240 stores operation history information 241.

The operation history information 241 is information indicating a history of operations executed with respect to the producer terminal 200 by the producer who creates music when the application is activated. For example, the operation history information may include various information regarding the operation of the producer, such as the content of the operation performed by the producer, the date and time when the operation was performed, or the like. The operation includes selection of style information presented from the information processing apparatus 100, selection of a composition execution instruction button, and reproduction, editing, and production of music information received from the information processing apparatus 100.

The control unit 250 is realized by, for example, a CPU, an MPU, or the like executing a program stored in the producer terminal 200 using a RAM or the like as a work area. In addition, the control unit 250 is a controller and may be realized by, for example, an integrated circuit such as an ASIC or an FPGA. The control unit 250 includes a display control unit 251, a transmission/reception unit 252, a selection unit 253, and a reproduction unit 254.

The display control unit 251 controls various displays with respect to the display unit 260. The display control unit 251 controls display of the display unit 260. The display control unit 251 controls display of the display unit 260 on the basis of the information received from the information processing apparatus 100. The display control unit 251 controls display of the display unit 260 on the basis of information generated by processing by each component of the control unit 250. The display control unit 251 may control the display of the display unit 260 with an application that displays an image.

The display control unit 251 causes the display unit 260 to display the window 270 (see FIGS. 3 to 5) or the like using the application of the automatic composition function by the DAW and AI. In addition, when receiving the presentation information of the style palette from the information processing apparatus 100, the display control unit 251 displays the chord progression and the lyrics of the presented style palette in the style palette selection pull-down 371*a* (see FIG. 4) of the window 270.

The transmission/reception unit 252 communicates with the information processing apparatus 100, and transmits and receives various information. When the automatic composition function is activated, the transmission/reception unit 252 receives the presentation information of the style information transmitted from the information processing apparatus 100. The transmission/reception unit 252 transmits instruction information for selecting the style information to the information processing apparatus 100. Then, the transmission/reception unit 252 receives the music information generated by the information processing apparatus 100. In addition, the transmission/reception unit 252 transmits the music information such as arranged and produced melodies by the producer to the information processing apparatus 100.

The selection unit 253 selects any of the style information presented from the information processing apparatus 100. For example, any chord progression among the chord progressions displayed in the style palette selection pull-down 371*a* (see FIG. 4) of the window 270 is selected by the operation of the input unit 220 by the user. Thus, the selection unit 253 transmits the instruction information for selecting the style information corresponding to the selected chord progression from the transmission/reception unit 252 to the information processing apparatus 100.

The reproduction unit 254 reproduces the music information generated by the information processing apparatus 100. Specifically, the reproduction unit 254 sets arbitrary instrument information for each of the melody, the chord, and the bass sound included in music data, and reproduces each piece of data. Note that the reproduction unit 254 may reproduce a combination of each of the melody, the chord, and the bass sound.

In addition, the control unit 250 receives a performance by the producer when the producer performs the performance together with composition provided by the automatic composition function. In addition, the control unit 250 also receives processing related to arrangement of composition provided by the automatic composition function and production of music by the producer.

The display unit 260 displays various information. The display unit 260 is realized by, for example, a liquid crystal display, an organic electro-luminescence (EL) display, or the like. The display unit 260 displays various information in accordance with control by the display control unit 251. The display unit 260 can also display information such as an image provided from the information processing apparatus 100.

[1-5. Procedure of the Information Processing According to the First Embodiment]

Figure 14:
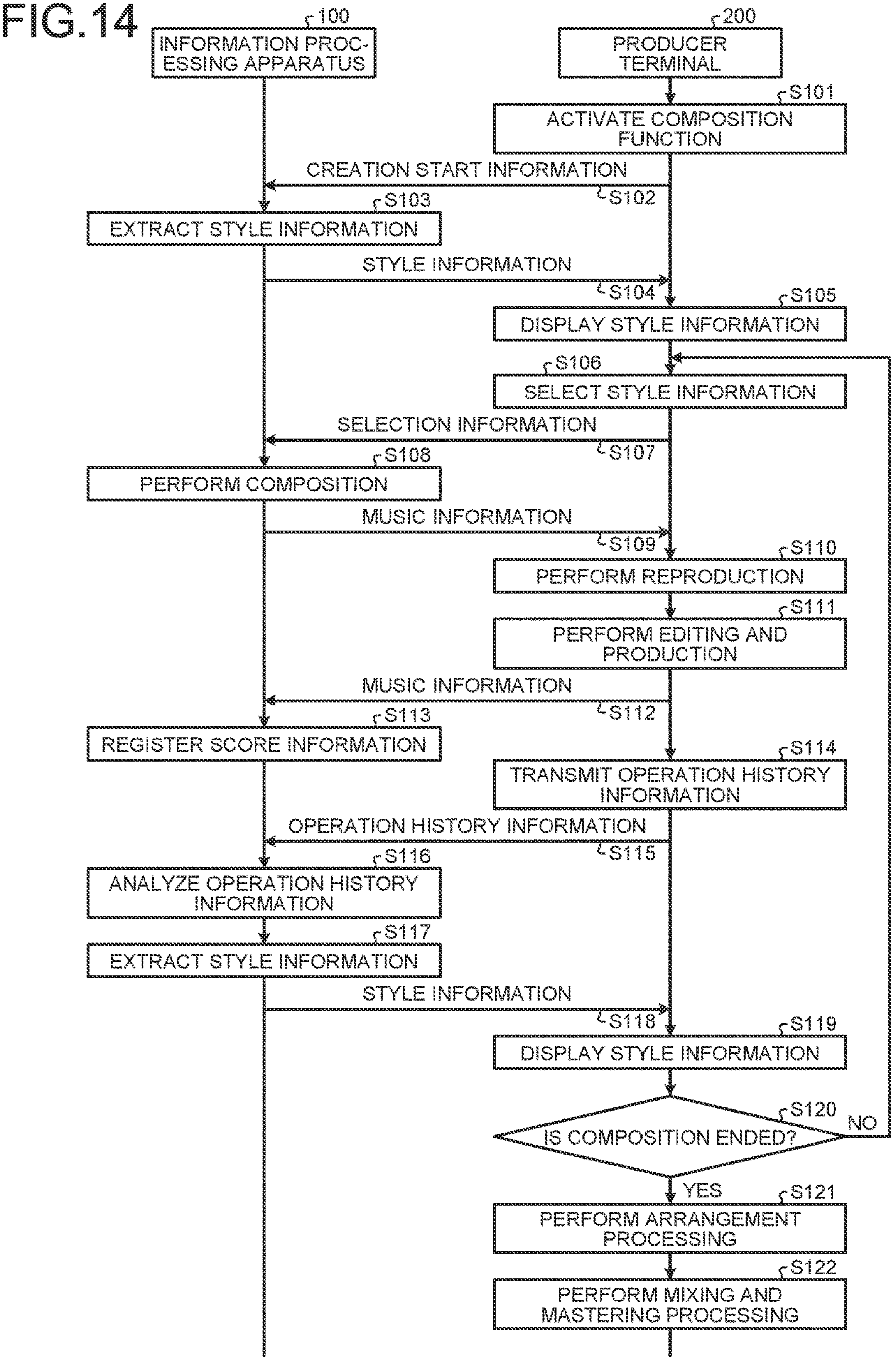
FIG. 14 is a sequence diagram illustrating a procedure of information processing according to the first embodiment.

Next, a procedure of various information processing according to the first embodiment will be described with reference to FIG. 14. FIG. 14 is a sequence diagram illustrating a procedure of information processing according to the first embodiment.

Upon receiving the composition start information (Step S102) in accordance with the activation of the automatic composition function on the producer terminal 200 (Step S101), the information processing apparatus 100 extracts the style information (Step S103) and transmits the presentation information of the extracted style information to the producer terminal 200 (Step S104). For example, the information processing apparatus 100 extracts all the style information, the style information in which the number of times of use by the producer exceeds a predetermined number of times, or the style information in which the number of times of use by all the users exceeds a predetermined number of times from the style information storage unit 222, and transmits the presentation information of the extracted style information.

Then, the producer terminal 200 displays a list of the style information on the basis of the presentation information (Step S105). For example, the producer terminal 200 displays a list of chord progressions of the style information as candidates. Then, in the producer terminal 200, when the style information is selected by the producer (Step S106), selection information indicating the selected style information is transmitted to the information processing apparatus 100 (Step S107).

The information processing apparatus 100 extracts the selected style information, performs machine learning using the extracted style information as learning data and performs the composition processing (Step S108), and provides the music information to the producer terminal 200 (Step S109). Note that the information processing apparatus 100 extracts a plurality of types of feature amounts from the composed music information, stores new score information including the feature amounts in the storage unit 120, and registers the new score information in the owned information storage unit 123.

When reproducing the provided music (Step S110), the producer terminal 200 receives an operation for editing and production processing with respect to the music information by the producer (Step S111). In a case where the producer performs a performance, for example, using a MIDI keyboard, MIDI information is received. Then, the producer terminal 200 transmits music information produced by editing processing or production processing by the producer to the information processing apparatus 100 (Step S112).

When receiving the music information arranged or produced, the information processing apparatus 100 extracts the feature amounts from the music information and registers score information generated on the basis of the extracted feature amounts (Step S113). The information processing apparatus 100 may add the score information based on the music information arranged and produced by the producer to the style information selected by the producer, and bring the style information closer to the style of the producer.

When the automatic composition function is activated, the producer terminal 200 transmits the operation history information to the information processing apparatus 100 (Steps S114 and S115). The information processing apparatus 100 analyzes the operation history information to obtain the number of times of each operation (Step S116). Then, in order to extract the style information that matches the producer's preference, the information processing apparatus 100 ranks the style information in descending order of the number of times of predetermined operation on the basis of the results of analysis and extracts the style information of the preset rank (Step S117). The information processing apparatus 100 transmits the presentation information of the extracted style information to the producer terminal 200 (Step S118).

Then, the producer terminal 200 displays a list of the style information extracted on the basis of the operation history information (Step S119). Then, in a case where the composition is not ended (Step S120: No), the producer terminal 200 returns to Step S106 and continues the processing of producing the music by the producer. In addition, when the composition by the producer ends (Step S120: Yes), the producer may operate the general user terminal 300 to perform, for example, arrangement processing (Step S121) and mixing and mastering processing (Step S122).

[1-6. Effects According to the First Embodiment]

As described above, the information processing apparatus (the information processing apparatus 100 in the embodiment) according to the first embodiment includes the storage unit (the storage unit 120 in the embodiment) that stores the music feature information (the style information 700 in the embodiment) in which the plurality of types of feature amounts extracted from the music information is associated with the predetermined identification information, the music feature information being used as the learning data in the composition processing using the machine learning, the reception unit (131) that receives the instruction information transmitted from the terminal apparatus (the producer terminal 200 in the embodiment), the extraction unit (the extraction unit 132 in the embodiment) that extracts the music feature information from the storage unit according to the instruction information, and the output unit (the transmission unit 133 in the embodiment) that outputs the presentation information of the music feature information extracted by the extraction unit.

As described above, in the information processing apparatus according to the first embodiment, the style information having the plurality of types of feature amounts of the music information is held, and the presentation information of the extracted music feature information is output according to the instruction information. That is, the information processing apparatus according to the first embodiment presents the music feature information corresponding to the instruction information to the terminal apparatus, so that the producer can select desired music feature information from the music feature information. Then, the information processing apparatus can provide the music information composed on the basis of the music feature information desired by the producer. Therefore, the information processing apparatus according to the present embodiment can improve convenience of the music creation function by the user.

In addition, the instruction information includes information regarding the feature amounts. The extraction unit performs ranking of a plurality of pieces of music feature information by using the predetermined rule on the basis of the information regarding the feature amounts, and extracts the music feature information of the preset rank. The output unit outputs the presentation information of the music feature information extracted by the extraction unit to the external apparatus together with the ranking information indicating the ranking of the music feature information. Thus, the information processing apparatus presents the music feature information with a high ranking together with the ranking information on the basis of the feature amounts of the music an instruction of which is given by the producer, so that the producer can quickly select the music feature information matching the producer's need only by checking the list of the music feature information.

In addition, the instruction information is operation information of the terminal apparatus. Therefore, the information processing apparatus can receive the operation information as the instruction information and extract appropriate style information according to the operation information.

The music feature information includes the score information including the chord progression information indicating the chord progression, the melody information indicating the melody, and the bass information indicating the bass progression in a bar having a prescribed length. Thus, the information processing apparatus can execute the composition on the basis of the music feature information including the chord progression, melody, and bass information. Then, at the time of composition, the information processing apparatus learns the feature amounts such as the chord progression information, the melody information, and the bass information instead of the music information itself, so that the music information can be efficiently provided to the user.

The score information further includes drum progression information indicating the drum progression in the bar having the prescribed length. Thus, the information processing apparatus can execute the composition on the basis of the music feature information including the chord progression, melody, bass information, and the drum progression information.

The music feature information includes music format information in which the identification information of the score information and the identification information of the lyric information for the same bar are registered in association with each other, and music order information indicating the order of the music format information. The information processing apparatus can further provide music information desired by the user because the music format information and its order can be learned.

The reception unit receives instruction information for selecting one piece of the score information. The extraction unit performs ranking by using the predetermined rule with respect to the music feature information including the score information selected by the instruction information and extracts the music feature information of the preset rank. Thus, the information processing apparatus presents the music feature information with a high ranking, for example, on the basis of the feature amounts of the score information an instruction of which is given by the producer, so that the producer can quickly select the music feature information matching the producer's need only by checking the list of the music feature information.

In addition, the terminal apparatus is a producer terminal apparatus in which a music creation-related application is installed. The instruction information is the operation history information indicating a history of operations executed with respect to the producer terminal apparatus by the producer who creates music when the application is activated. The extraction unit ranks the music feature information in descending order of the number of times of predetermined operation on the basis of the operation history information, and extracts the music feature information of the preset rank. The output unit outputs the presentation information of the music feature information extracted by the extraction unit to the producer terminal apparatus. Thus, the information processing apparatus analyzes the operation history information and presents the music information matching the producer's preference to the producer, so that the producer can quickly select the music feature information matching the producer's preference.

2. Variation of the First Embodiment

[2-1. Example of the Information Processing According to Variation of the First Embodiment]

Next, the information processing according to a variation of the first embodiment will be described. The style information 700 (see FIG. 2) includes lyric information as the feature amount. Therefore, only by inputting desired lyrics to the producer terminal 200, the producer can receive the presentation of the style information that matches the lyrics. FIGS. 15 to 18 are diagrams illustrating an example of a display screen of the producer terminal 200 according to the variation of the first embodiment.

Figure 15:
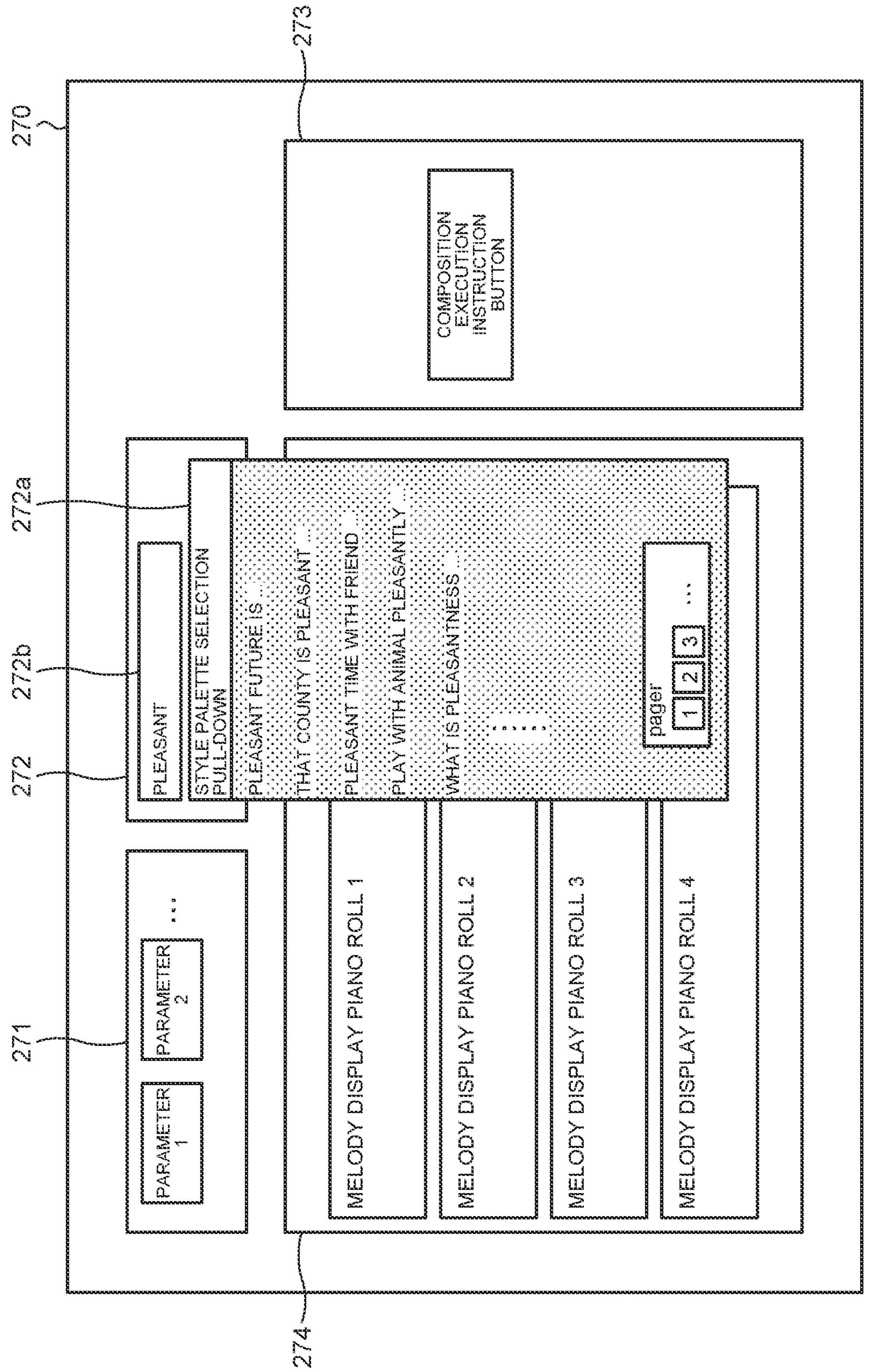
FIG. 15 is a diagram illustrating an example of a display screen of a producer terminal according to a variation of the first embodiment.

Specifically, as illustrated in FIG. 15, in a case where the producer inputs desired lyrics (for example, "pleasant") in a search keyword input field 272*b* of the window 270, the information processing apparatus 100 receives instruction information for searching the lyrics "pleasant".

Then, the information processing apparatus 100 ranks the style information including the lyric information including the lyrics or lyrics similar to the lyrics as the feature amount by using the predetermined rule, and extracts the style information of the preset rank. Then, when the information processing apparatus 100 transmits the presentation information of each piece of extracted style information to the producer terminal 200, the lyric information is displayed as a list in the style palette selection pull-down 371*a* in the producer terminal 200. For example, in the style palette selection pull-down 371*a*, lyric information including "pleasant" such as "pleasant future is . . . ", "that county is pleasant . . . ", and "pleasant time with friend . . . " is displayed.

Figure 16:
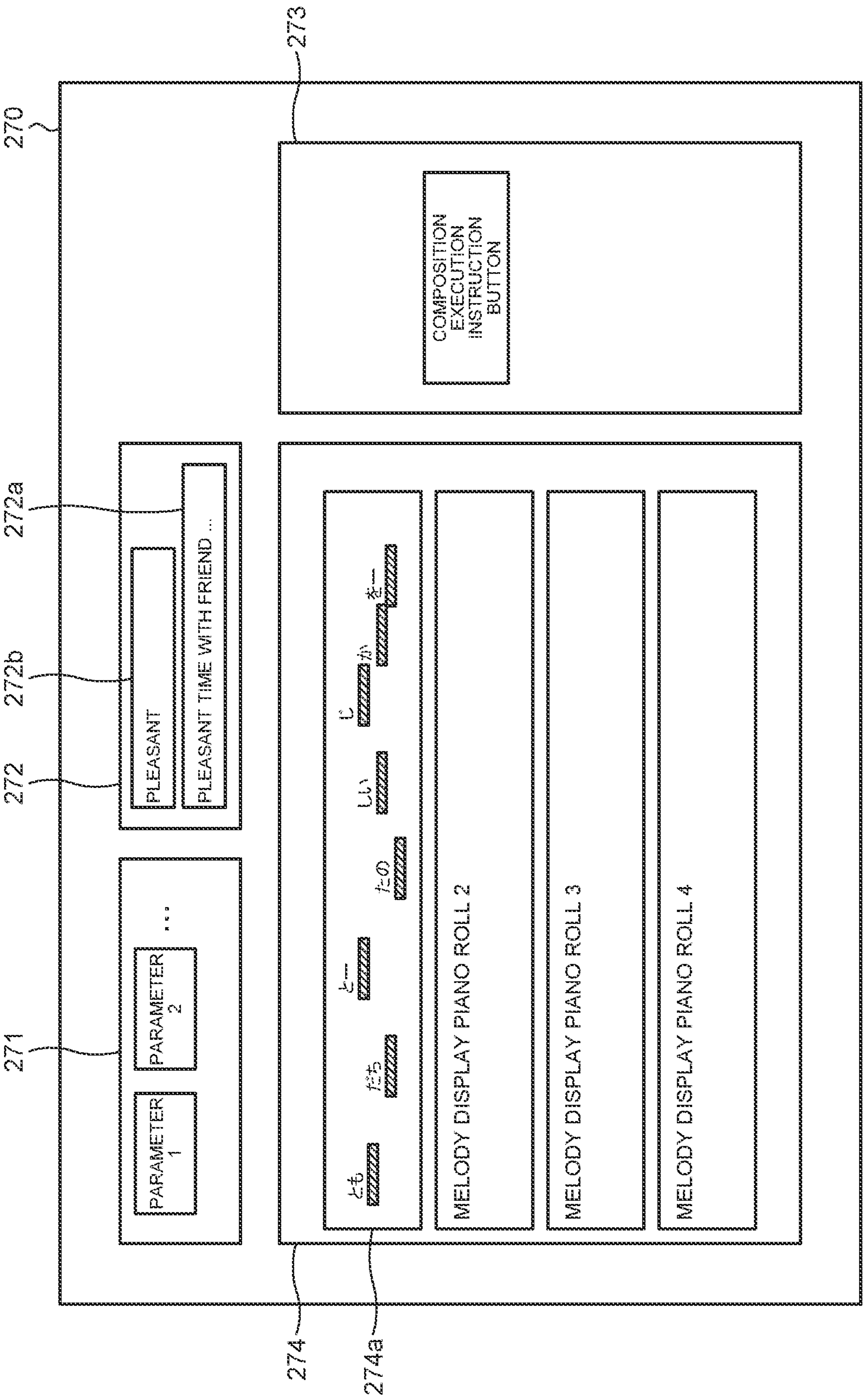
FIG. 16 is a diagram illustrating an example of a display screen of a producer terminal according to a variation of the first embodiment.

The producer selects desired lyric information from the lyric information presented in the style palette selection pull-down 371*a* and selects the composition execution instruction button. In the example of FIG. 16, "pleasant time with friend . . . " is selected. Thus, the information processing apparatus 100 extracts the style information having the selected lyric information, performs machine learning using the extracted style information 700 as learning data, performs the composition processing, and provides the music information to the producer terminal 200.

At this time, the information processing apparatus 100 may automatically generate lyrics in accordance with the generated music and provide the producer terminal 200 with music information in which the melody is associated with the lyrics. In this case, on the screen of the producer terminal 200, the melody and the lyrics corresponding to the melody are displayed on the melody display piano roll 374*a* of FIG. 16.

Thus, the producer can receive the provision of the music information generated in accordance with the selected lyric information only by selecting the desired lyric information from the lyric information presented in the style palette selection pull-down 371*a* after inputting the searched lyrics.

Figure 17:
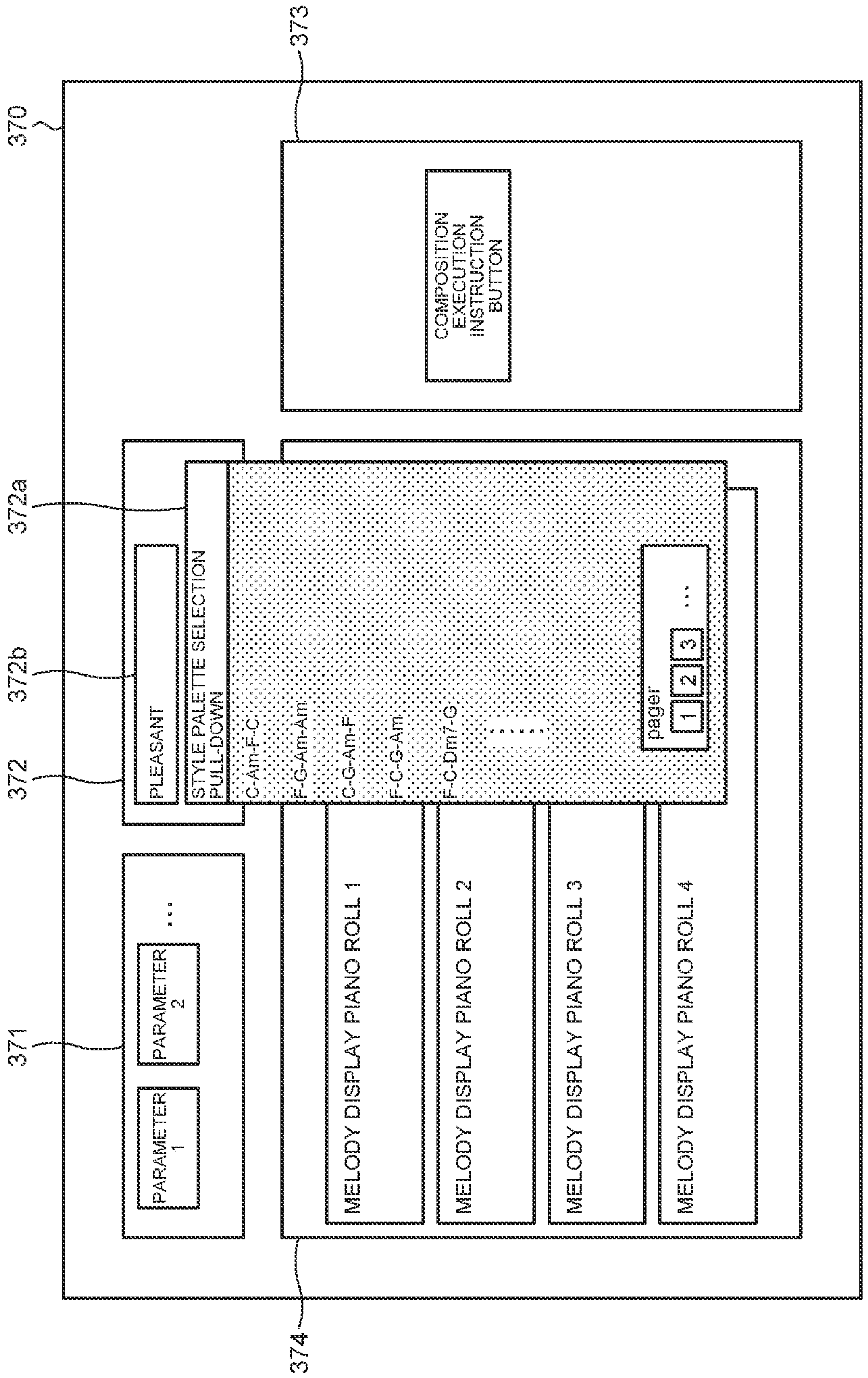
FIG. 17 is a diagram illustrating an example of a display screen of a producer terminal according to a variation of the first embodiment.
Figure 18:
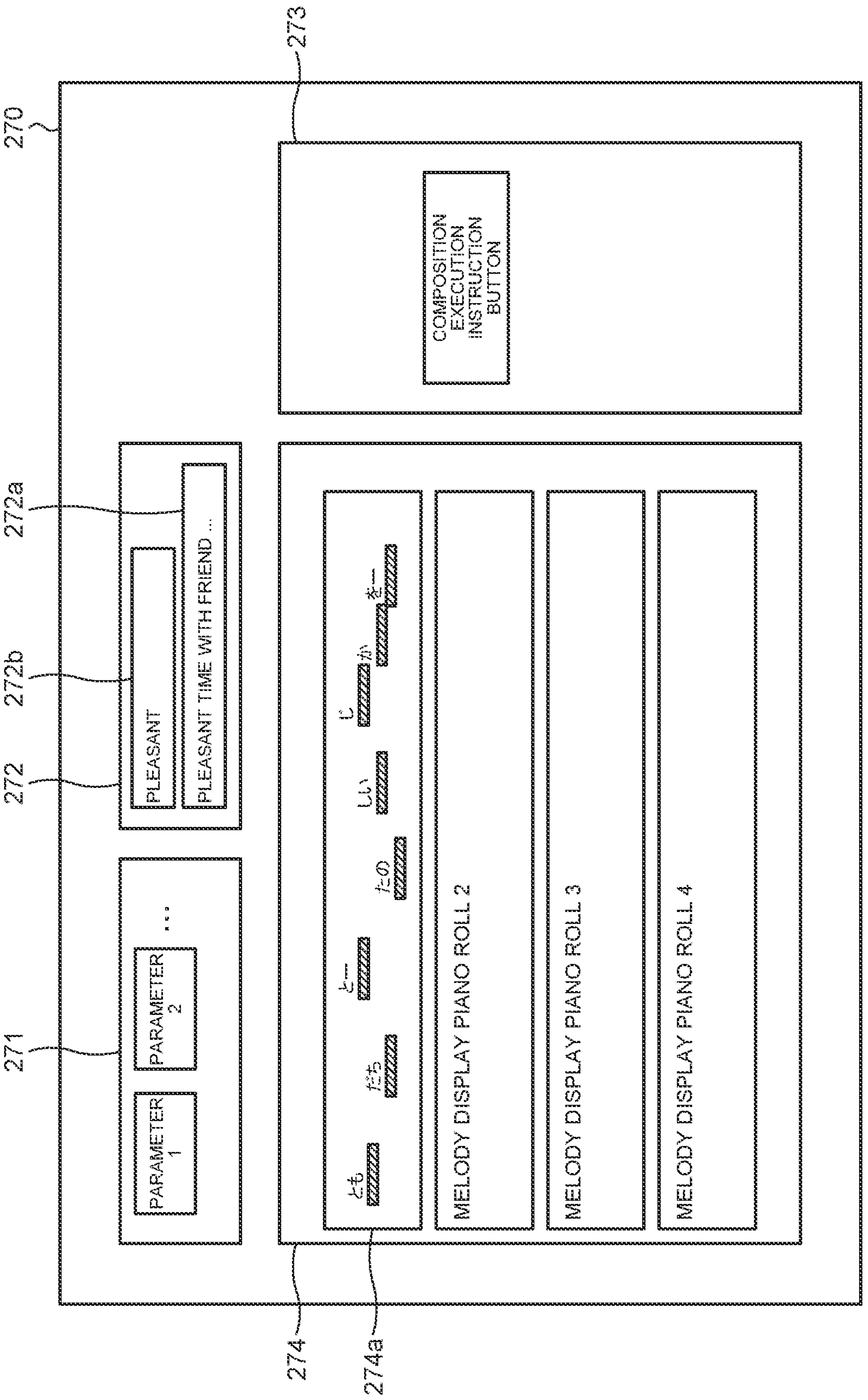
FIG. 18 is a diagram illustrating an example of a display screen of a producer terminal according to a variation of the first embodiment.

In addition, in a case where the user inputs the lyrics, as illustrated in FIG. 17, the producer terminal 200 may display a list of candidates of the chord progression of the style information presented from the information processing apparatus 100 and support the producer's music creation. In this case, on the screen of the producer terminal 200, the melody and the lyrics corresponding to the melody are displayed on the melody display piano roll 374*a* of FIG. 18.

As described above, in the information processing apparatus 100, the reception unit 131 receives the instruction information giving an instruction to search the lyrics. Then, the extraction unit 132 ranks the style information including the lyric information including the lyrics for which the instruction of searching is given by the instruction information or lyrics similar to the lyrics by using the predetermined rule, and extracts the style information of the preset rank. For example, the information processing apparatus 100 may extract and present the style information having the lyric information the lyrics of which match the search target lyrics (character keywords), and may classify the lyric information in advance by machine learning or deep learning and present the style information belonging to the classification including the search target lyrics. In addition, the composition unit 134 also automatically generates the lyrics according to the generated music.

[2-2. Procedure of the Information Processing According to Variation of the First Embodiment]

Figure 19:
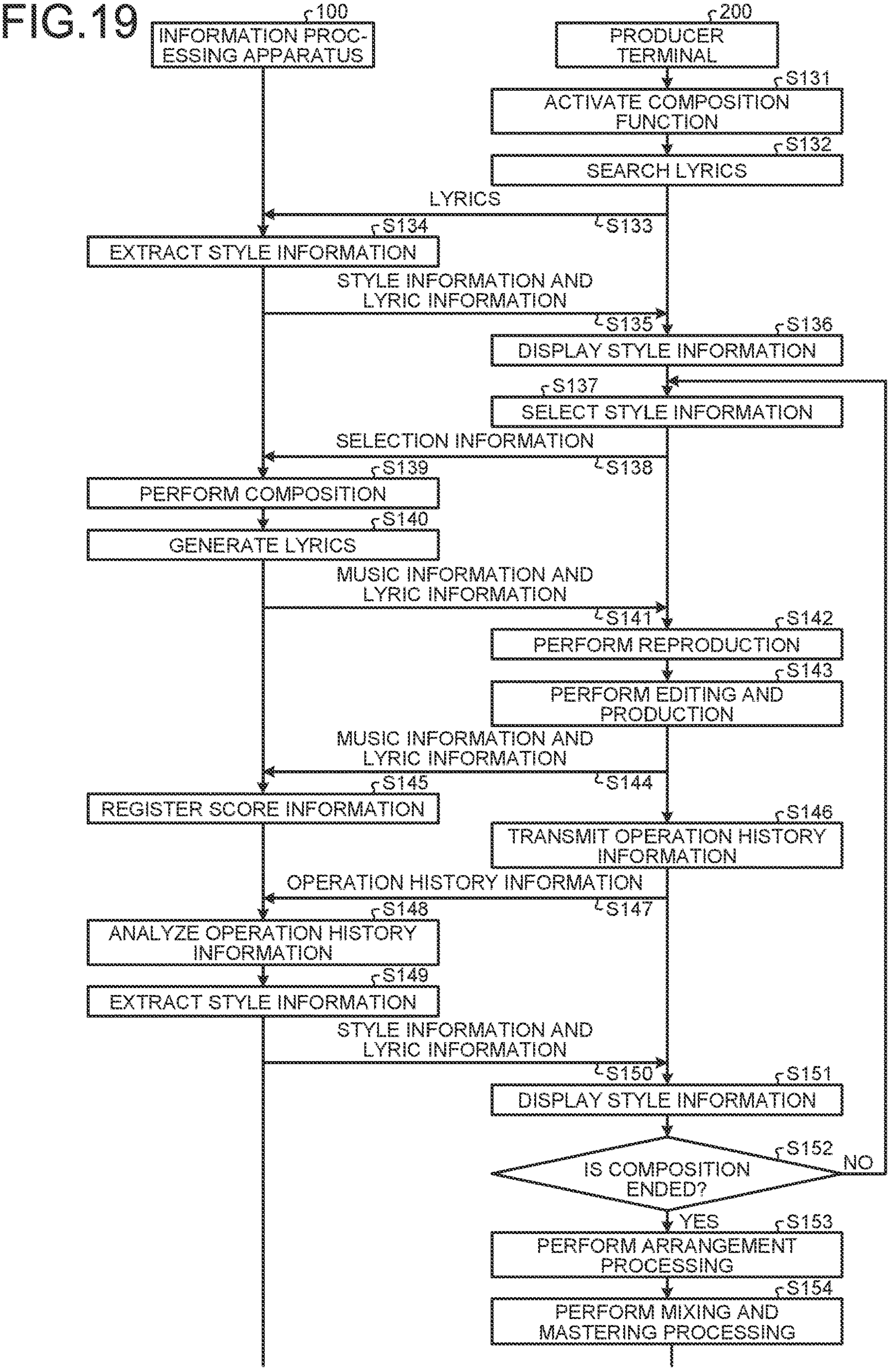
FIG. 19 is a flowchart illustrating a procedure of information processing according to a variation of the first embodiment.

Next, a procedure of various information processing according to the variation of the first embodiment will be described with reference to FIG. 19. FIG. 19 is a flowchart illustrating a procedure of information processing according to the variation of the first embodiment.

Step S131 illustrated in FIG. 19 is the same processing as Step S101 illustrated in FIG. 14. When receiving the search of lyrics (Step S132), the producer terminal 200 transmits instruction information giving an instruction to search the lyrics to the information processing apparatus 100 (Step S133).

The information processing apparatus 100 ranks the style information including the lyric information including the lyrics or lyrics similar to the lyrics as the feature amount by using the predetermined rule, and extracts the style information of the preset rank (Step S134).

Then, when the information processing apparatus 100 transmits the presentation information including the lyric information of each piece of the extracted style information to the producer terminal 200 (Step S135), the lyric information or chord progression is displayed as a list on the producer terminal 200 (Step S136). Steps S137 to S139 illustrated in FIG. 19 are the same processing as Steps S106 to S108 illustrated in FIG. 14. The information processing apparatus 100 automatically generates the lyrics (Step S140) and provides the producer terminal 200 with the composed music information and the generated lyric information (Step S141). Note that the information processing apparatus 100 extracts a plurality of types of feature amounts including the lyrics from the composed music information, stores new score information including the feature amounts in the storage unit 120, and registers the new score information in the owned information storage unit 123.

When reproducing the provided music with the lyrics (Step S142), the producer terminal 200 receives an operation for editing and production processing with respect to the music information and lyric information by the producer (Step S143). The producer terminal 200 transmits the music information and lyric information produced by editing processing and production processing by the producer to the information processing apparatus 100 (Step S144).

When receiving the music information arranged or produced, the information processing apparatus 100 extracts the feature amounts including the lyric information from the music information and registers the score information and lyric information generated on the basis of the extracted feature amounts (Step S145). The information processing apparatus 100 may add the score information and lyric information based on the music information arranged and produced by the producer to the style information selected by the producer, and bring the style information closer to the style of the producer.

Steps S146 to S149 illustrated in FIG. 19 are the same processing as Steps S115 to S117 illustrated in FIG. 14. The information processing apparatus 100 transmits the presentation information including the lyric information of the extracted style information to the producer terminal 200 (Step S150). Steps S151 to S154 illustrated in FIG. 19 are the same processing as Steps S119 to S122 illustrated in FIG. 14.

[2-3. Effect According to Variation of the First Embodiment]

As described above, in the variation of the first embodiment, in the information processing apparatus, the reception unit receives the instruction information giving an instruction to search the lyrics. The extraction unit performs ranking by using the predetermined rule with respect to the music feature information including the lyric information having the lyrics for which the instruction of searching is given by the instruction information and extracts the music feature information of the preset rank. Thus, the producer can receive the provision of the music information generated in accordance with the selected lyrics only by inputting the searched lyrics and selecting the desired music feature information from the presented music feature information. Therefore, the information processing apparatus according to the present embodiment can improve convenience of the music creation function by the user.

3. Second Embodiment

[3-1. Example of the Information Processing According to the Second Embodiment]

Figure 20:
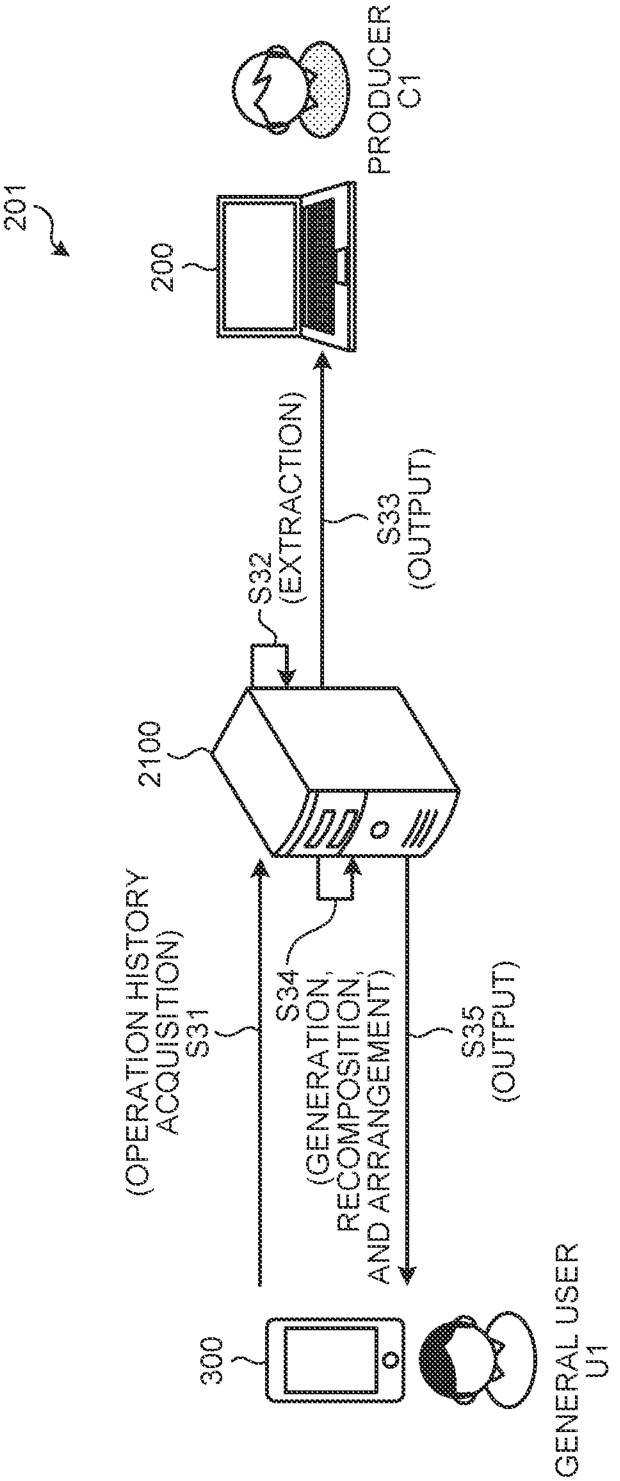
FIG. 20 is a conceptual diagram illustrating a flow of information processing according to a second embodiment.

Next, an example of information processing according to the second embodiment will be described with reference to FIG. 20. FIG. 20 is a conceptual diagram illustrating a flow of information processing according to the second embodiment. The information processing according to the second embodiment is executed by an information processing apparatus 2100, a producer terminal 200, and a general user terminal 300.

The general user terminal 300 is an information processing terminal such as a tablet terminal. Various program applications are installed in the general user terminal 300. A music viewing application is installed in the general user terminal 300. The general user terminal 300 communicates with the information processing apparatus 100 to receive provision of the music information. The user of the general user terminal 300 is a general user who receives the provision of the music information.

The general user terminal 300 transmits the operation history information indicating a history of operations executed with respect to the general user terminal 300 by the user to the information processing apparatus 2100 when the music viewing application is activated. In addition, the general user terminal 300 can also activate the automatic composition function by the DAW and AI. The general user terminal 300 is not limited to the DAW, and may use, for example, a mobile app such as iOS.

Similarly to the information processing apparatus 100, the information processing apparatus 2100 provides the presentation information of the style information or the music information to the producer terminal 200. Then, on the basis of the operation history information of the general user terminal 300, the information processing apparatus 2100 presents the style information to the producer terminal 200, provides a playlist of the music information provided to the general user terminal 300, or recomposes or arranges the music information provided to the general user terminal 300.

A flow of information processing according to the second embodiment will be specifically described with reference to FIG. 20. As illustrated in FIG. 20, the information processing apparatus 2100 acquires the operation history information in the general user terminal 300 (Step S31). Then, the information processing apparatus 2100 analyzes the operation history information to obtain the number of times of each operation by the user.

The predetermined operation is, for example, an operation such as reproduction, skipping, or repeating executed when the user views the music information. For example, the information processing apparatus 2100 classifies music whose number of times of reproduction is larger than a threshold value in the production music registered in the owned information storage unit 113 as music that the user likes. In addition, the information processing apparatus 2100 classifies music whose number of times of reproduction is smaller than the threshold value as music that the user does not like. In addition, the information processing apparatus 2100 classifies skipped music as disliked music.

Then, the information processing apparatus 2100 ranks the style information used to compose the music information in descending order of the number of times of predetermined operation on the music information and extracts the style information of the preset rank (Step S32), and outputs the style information to the producer terminal 200 (Step S33).

As described above, in the information processing according to the second embodiment, the operation history information with respect to the general user terminal 300 by the user is analyzed, and the style information of the music information that the user likes is presented to the producer terminal 200. Thus, the producer can produce new music requested by the user in substantially real time by using the style information used for currently popular music.

In addition, the information processing apparatus 2100 analyzes the operation history information, obtains music information in which the number of times of predetermined operation by the user exceeds the threshold value, generates a playlist on the basis of the obtained music information (Step S34), and outputs the playlist to the general user terminal 300 (Step S35).

As described above, in the information processing according to the second embodiment, the operation history information with respect to the general user terminal 300 by the user is analyzed, the playlist matching the user's preference is generated, and the playlist customized for each user is distributed and provided.

Then, the information processing apparatus 2100 analyzes the operation history information to obtain the music information in which the number of times of predetermined operation by the user exceeds the threshold value. Then, the information processing apparatus 2100 ranks the style information used for the obtained music information in descending order of the number of times of predetermined operation, and extracts the style information of the preset rank. The information processing apparatus 2100 recomposes or arranges the music information on the basis of the extracted style information (Step S34), and outputs the recomposed or arranged music information to the general user terminal 300 (Step S35).

As described above, in the information processing according to the second embodiment, it is possible to further recompose or arrange the production music being reproduced using the style information used for the production music that the user prefers, and to provide the user with the recomposed or arranged music. The recomposition and the arrangement may be actively performed by the user transmitting instruction information from the general user terminal 300, or may be automatically performed by the information processing apparatus 2100 on the basis of the operation history information. Next, a configuration of an information processing system 201 including the information processing apparatus 2100, the producer terminal 200, and the general user terminal 300 will be described, and details of various processing will be described in order.

[3-2. Configuration of the Information Processing System According to the Second Embodiment]

Figure 21:
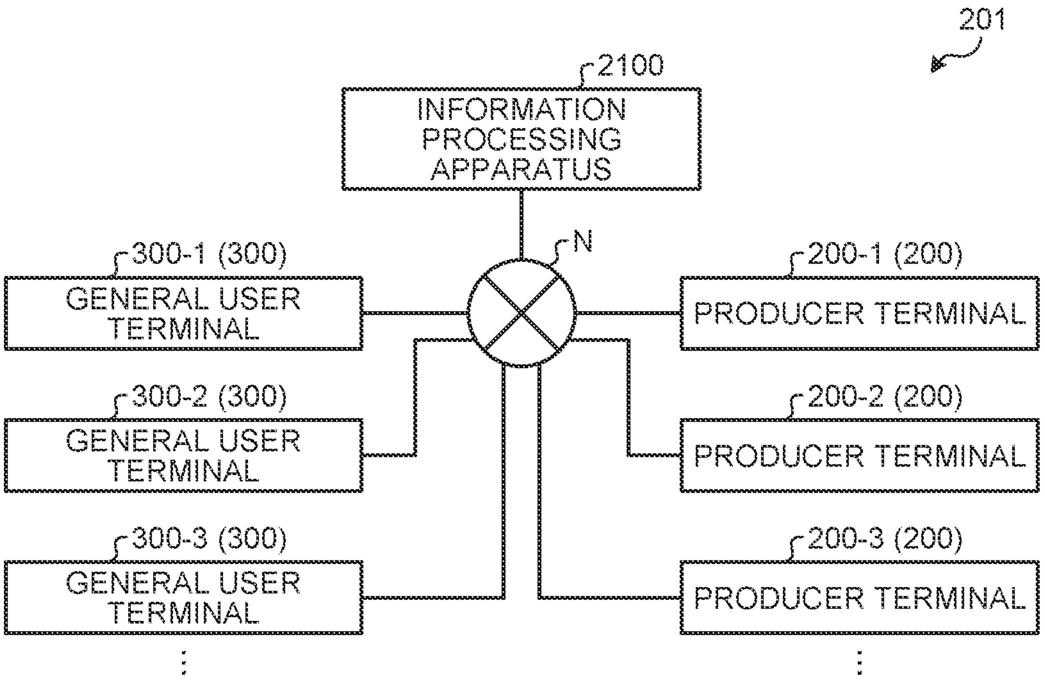
FIG. 21 is a diagram illustrating an example of an information processing system according to the second embodiment.

FIG. 21 is a diagram illustrating an example of the information processing system 201 according to the second embodiment. As illustrated in FIG. 21, the information processing system 201 includes producer terminals 200-1 to 200-3, general user terminals 300-1 to 300-3, and the information processing apparatus 2100. The information processing system 201 functions as an automatic composition function management system and a viewing music provision system. In the example of FIG. 21, three producer terminals 200-1 to 200-3 are illustrated, but are referred to as the producer terminal 200 when described without particular distinction. In addition, in the example of FIG. 21, three general user terminals 300-1 to 300-3 are illustrated, but are referred to as the general user terminal 300 when described without particular distinction.

The information processing apparatus 2100 and the producer terminal 200 are communicably connected to each other by wire or wirelessly via the network N. The information processing apparatus 2100 and the general user terminal 300 are communicably connected to each other by wire or wirelessly via the network N.

The general user terminal 300 transmits the operation history information to the information processing apparatus 2100. The operation history information is information indicating a history of operations executed with respect to the general user terminal 300 by the user when the music viewing application is activated. In addition, the general user terminal 300 receives provision of a playlist generated and music information recomposed or arranged by the information processing apparatus 2100 at the time of viewing music.

Similarly to the information processing apparatus 100, the information processing apparatus 2100 includes a plurality of pieces of style information as learning data of machine learning. The information processing apparatus 2100 analyzes the operation history information received from the general user terminal 300. The information processing apparatus 2100 outputs the presentation information of the style information extracted on the basis of the results of analysis of the operation history information to the producer terminal 200 to support creation of music by the producer. In addition, the information processing apparatus 2100 generates a playlist customized for a viewer on the basis of the results of analysis of the operation history information, and provides the playlist to the general user terminal 300. In addition, the information processing apparatus 2100 further recomposes or arranges the production music being reproduced using the style information used for the production music that the user prefers on the basis of the results of analysis of the operation history information, and provides the user with the recomposed or arranged music.

[3-3. Configuration of the Information Processing Apparatus 100 According to the Second Embodiment]

Figure 22:
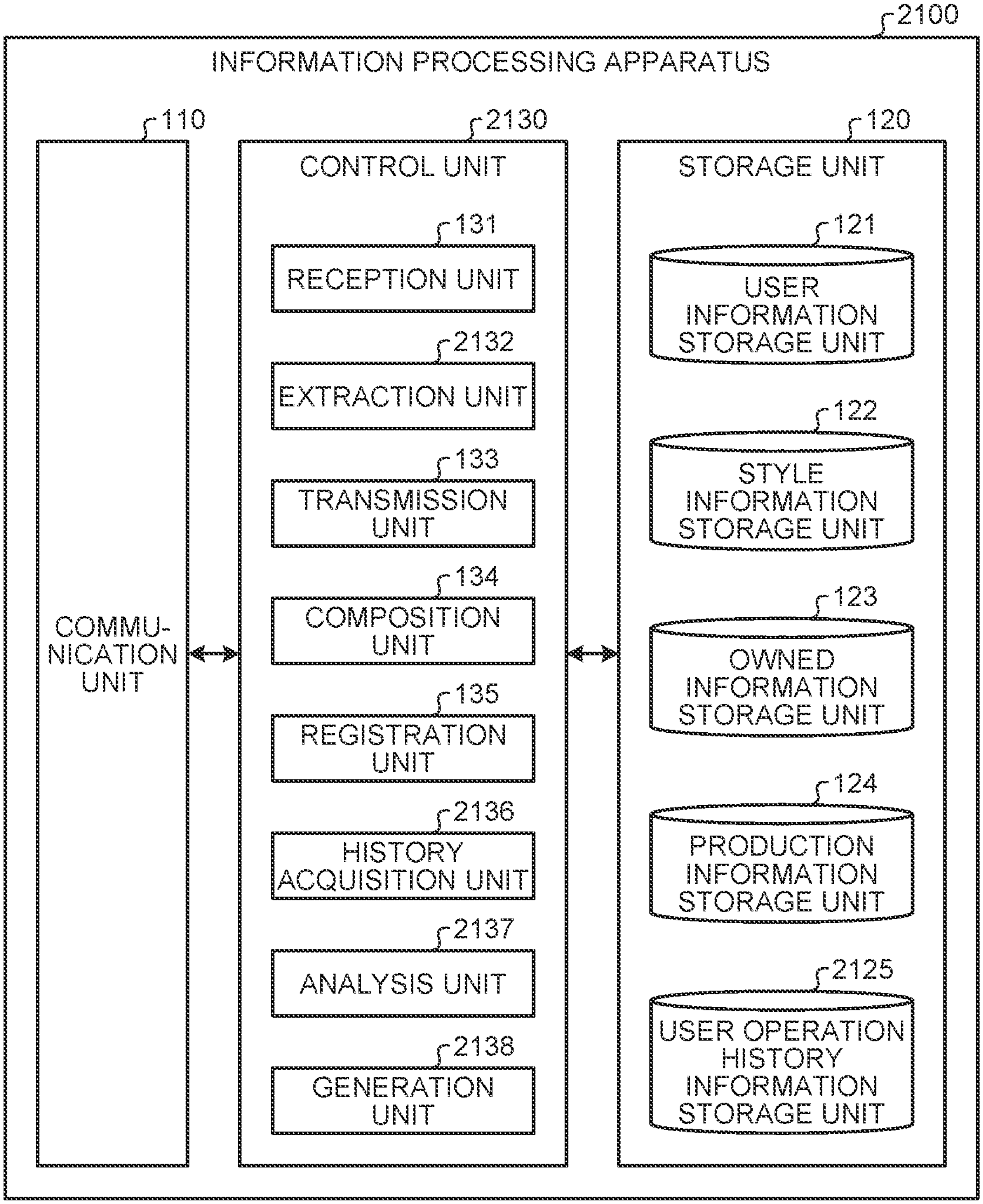
FIG. 22 is a diagram illustrating a configuration example of an information processing apparatus according to the second embodiment.

Next, a configuration of the information processing apparatus 2100 illustrated in FIG. 21 will be described with reference to FIG. 22. FIG. 22 is a diagram illustrating a configuration example of the information processing apparatus 2100 according to the second embodiment. As illustrated in FIG. 22, in the information processing apparatus 2100, a storage unit 120 includes a user operation history information storage unit 2125. Then, the information processing apparatus 2100 includes a control unit 2130 instead of the control unit 130.

Figure 23:
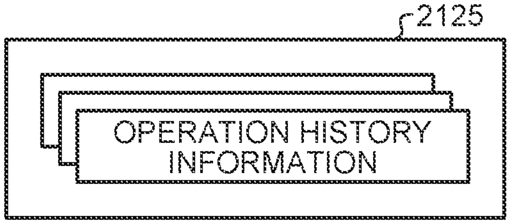
FIG. 23 is a diagram illustrating an example of a user history information storage unit according to the second embodiment.

The user operation history information storage unit 2125 stores operation history information by the user with respect to the general user terminal 300. FIG. 23 is a diagram illustrating an example of the user history information storage unit 2125 according to the second embodiment.

As illustrated in FIG. 23, the user operation history information storage unit 2125 stores the operation history information by the user with respect to the general user terminal 300. For example, each piece of the operation history information is associated with the user ID of each user. For example, the operation history information of the user may include various information regarding the operation of the user, such as the content of the operation performed by the user, the date and time when the operation was performed, or the like. Examples of the operation include reproduction, skipping, and repeating of music information.

As compared with the control unit 130 illustrated in FIG. 7, the control unit 2130 includes an extraction unit 2132, a history acquisition unit 2136, an analysis unit 2137, and a generation unit 2138.

The history acquisition unit 2136 acquires the operation history information of the user. The history acquisition unit 2136 may acquire target operation history information of the user from the operation history information stored in the user operation history information storage unit 2125. In addition, the history acquisition unit 2136 may acquire the operation history information by requesting transmission of the operation history information of the user during music viewing to the general user terminal 300.

The analysis unit 2137 analyzes the operation history information of the user to obtain the number of times of each operation. Examples of the predetermined operation include an operation such as reproduction, skipping, and repeating of music. For example, the analysis unit 2137 classifies music whose number of times of reproduction is larger than the threshold value as music that the user likes. In addition, the analysis unit 2137 classifies music whose number of times of reproduction is smaller than the threshold value as music that the user does not like. In addition, the analysis unit 2137 classifies skipped music as disliked music. Thus, the analysis unit 2137 obtains the number of times of each operation to analyze music information that matches the user's preference or music information that does not match the user's preference.

The generation unit 2138 obtains music information whose number of times of predetermined operation exceeds the threshold value on the basis of the results of analysis by the analysis unit 2137, and generates a playlist on the basis of the obtained music information. A transmission unit 133 outputs the playlist to the general user terminal 300.

The extraction unit 2132 obtains music information whose number of times of predetermined operation exceeds the threshold value on the basis of the results of analysis by the analysis unit 2137. Then, the extraction unit 2132 ranks the style information used for the obtained music information in descending order of the number of times of predetermined operation, and extracts the style information of the preset rank. The transmission unit 133 transmits the presentation information of the style information extracted by the extraction unit 2132 to the producer terminal 200.

Then, the composition unit 134 recomposes or arranges the music information on the basis of the style information extracted by the extraction unit 2132. The transmission unit 133 transmits the recomposed or arranged music information to the general user terminal 300.

[3-4. Configuration of the General User Terminal 300 According to the Second Embodiment]

Figure 24:
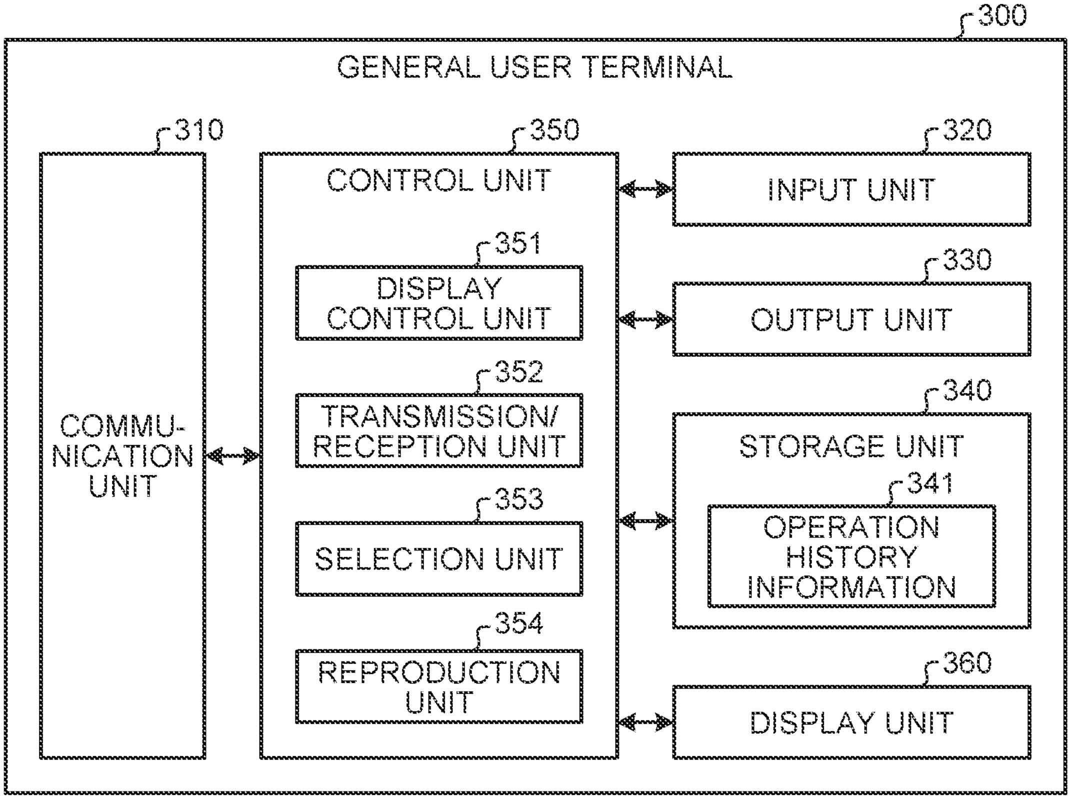
FIG. 24 is a diagram illustrating a configuration example of a general user terminal according to the second embodiment.

Next, a configuration of the general user terminal 300 illustrated in FIG. 21 will be described with reference to FIG. 24. FIG. 24 is a diagram illustrating a configuration example of the general user terminal 300 according to the second embodiment. As illustrated in FIG. 24, the general user terminal 300 includes a communication unit 310, an input unit 320, an output unit 330, a storage unit 340, a control unit 350, and a display unit 360.

The communication unit 310 has a function similar to that of the communication unit 210 illustrated in FIG. 13. The input unit 320 may have a touch panel similarly to the input unit 220 illustrated in FIG. 13. In addition, the input unit 320 may include a microphone that detects a voice. The output unit 330 has a function similar to that of the output unit 230 illustrated in FIG. 13.

The storage unit 340 has a function similar to that of the storage unit 240 illustrated in FIG. 13. The storage unit 340 stores operation history information 341. The operation history information 341 is information indicating a history of operations executed with respect to the general user terminal 300 by the user who views music when the application is activated. For example, the operation history information may include various information regarding the operation of the producer, such as the content of the operation performed by the user, the date and time when the operation was performed, or the like. The operation includes an operation or the like such as reproduction, skipping, and repeating of music.

The control unit 350 has a function similar to that of the control unit 250 illustrated in FIG. 13. The control unit 350 includes a display control unit 351, a transmission/reception unit 352, a selection unit 353, and a reproduction unit 354.

The display control unit 351 has a function similar to that of the display control unit 251 illustrated in FIG. 13. The display control unit 351 displays a viewing list, information regarding music being viewed, and icons by which operations such as reproduction, skipping, and repeating can be selected by the music viewing application.

The transmission/reception unit 352 has a function similar to that of the transmission/reception unit 252 illustrated in FIG. 13. The transmission/reception unit 352 receives the music information and the playlist transmitted from the information processing apparatus 2100. The transmission/reception unit 352 transmits the operation history information 341 of the user to the information processing apparatus 2100.

The selection unit 353 selects music information or a playlist, and selects operations such as reproduction, skipping, and repeating. The reproduction unit 354 reproduces the music information or playlist received from the information processing apparatus 2100. The display unit 360 has a function similar to that of the display unit 260 illustrated in FIG. 13.

[3-5. Procedure of the Information Processing according to the second embodiment]

[3-5-1. Processing of Presenting Style Information]

Figure 25:
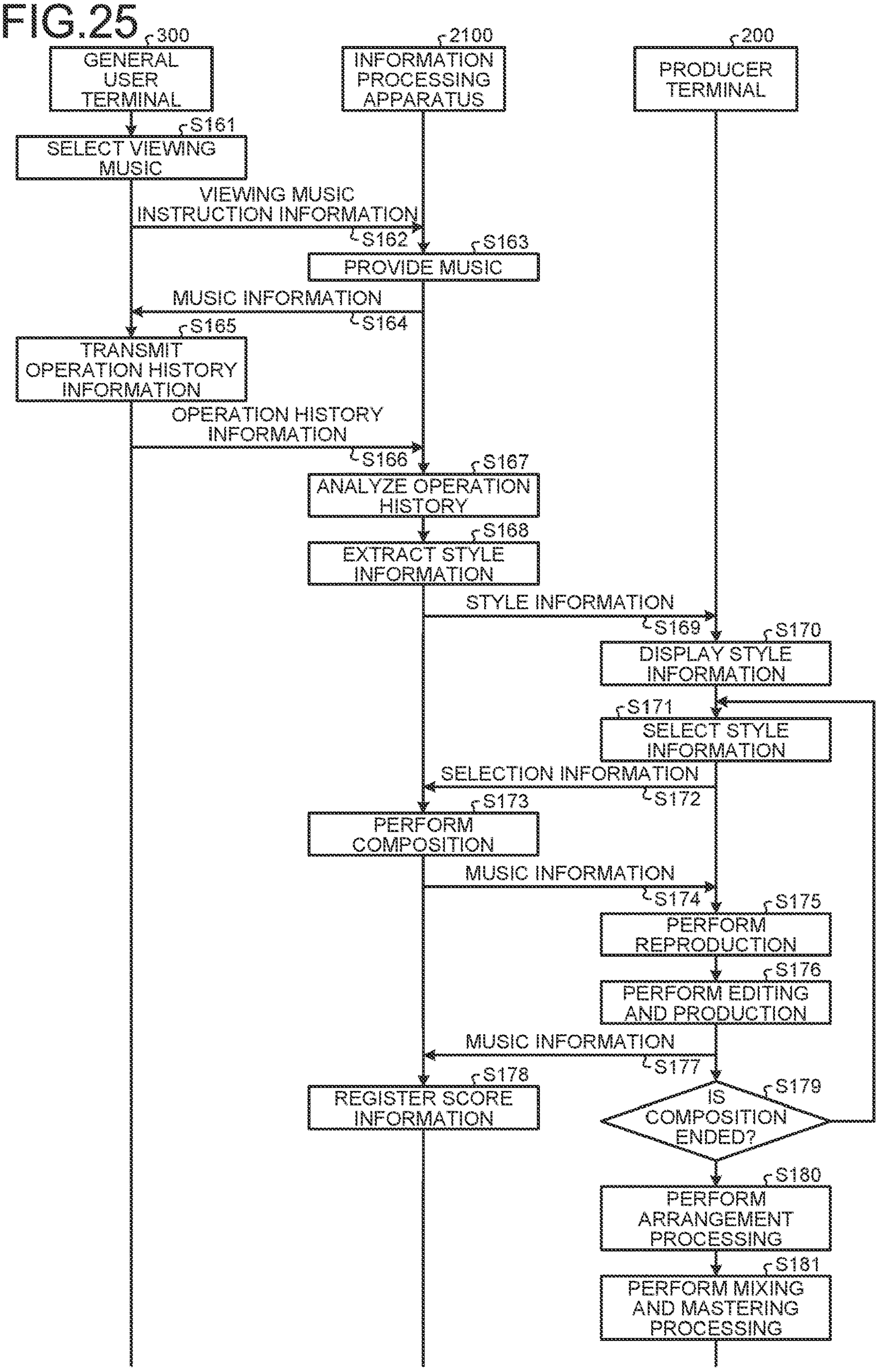
FIG. 25 is a sequence diagram illustrating a procedure of information processing according to the second embodiment.

Next, a procedure of various information processing according to the second embodiment will be described with reference to FIG. 25. FIG. 25 is a sequence diagram illustrating a procedure of information processing according to the second embodiment. In FIG. 25, the processing of presenting the style information to the producer will be described.

When viewing music instruction information is transmitted (Step S162) from the general user terminal 300 by the viewer selecting the viewing music (Step S161), the information processing apparatus 2100 transmits, to the general user terminal 300, the music an instruction of which is given and provides the music (Steps S163 and S164).

Then, the general user terminal 300 transmits the operation history information of the user to the information processing apparatus 2100 (Steps S165 and S166). The information processing apparatus 2100 analyzes the operation history information of the user to obtain the number of times of each operation (Step S167). Then, in order to extract the style information that the user prefers, the information processing apparatus 2100 ranks the style information in descending order of the number of times of predetermined operation on the basis of the results of analysis and extracts the style information of the preset rank (Step S168).

The information processing apparatus 2100 transmits the presentation information of the extracted style information to the producer terminal 200 (Step S169). Steps S170 to S178 illustrated in FIG. 25 are the same processing as Steps S105 to S113 illustrated in FIG. 14. Steps S179 to S181 illustrated in FIG. 25 are the same processing as Steps S120 to S122 illustrated in FIG. 14.

[3-5-2. Processing of Providing Playlist]

Figure 26:
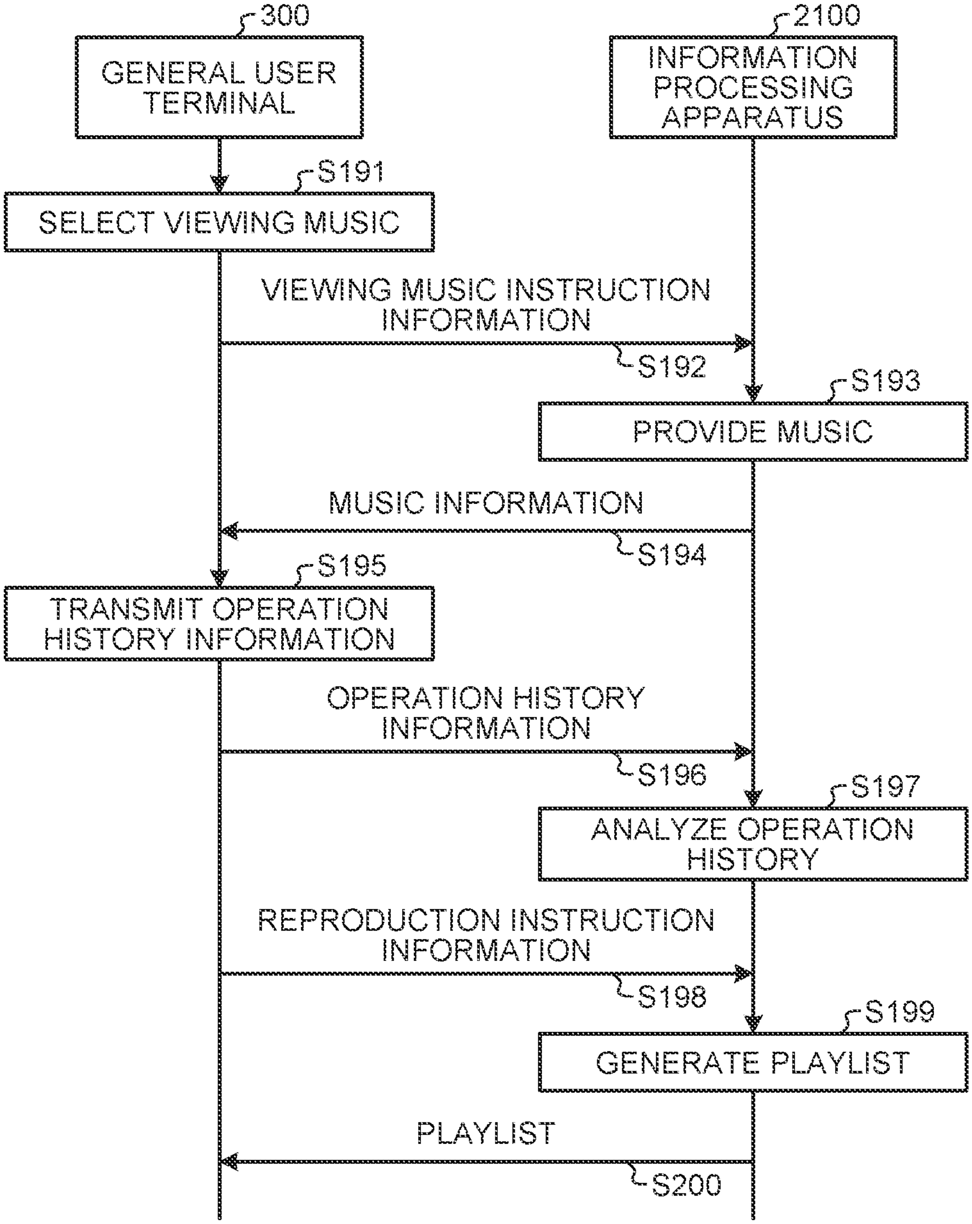
FIG. 26 is a sequence diagram illustrating a procedure of information processing according to the second embodiment.

Next, a procedure of various information processing according to the second embodiment will be described with reference to FIG. 26. FIG. 26 is a sequence diagram illustrating a procedure of information processing according to the second embodiment. In FIG. 26, the processing of providing the playlist to the user will be described.

Steps S191 to S197 illustrated in FIG. 26 are the same processing as Steps S161 to S167 illustrated in FIG. 25. When receiving reproduction instruction information giving an instruction on reproduction from the general user terminal 300 (Step S198), the information processing apparatus 2100 generates a playlist (Step S199). In Step S199, the information processing apparatus 2100 obtains music information whose number of times of predetermined operation exceeds the threshold value on the basis of the results of analysis with respect to the operation history information of the user, and generates a playlist on the basis of the obtained music information. Then, the information processing apparatus 2100 transmits the generated playlist to the general user terminal 300 (Step S200).

[3-5-3. Processing of Providing Music Information after Recomposition or Arrangement]

Figure 27:
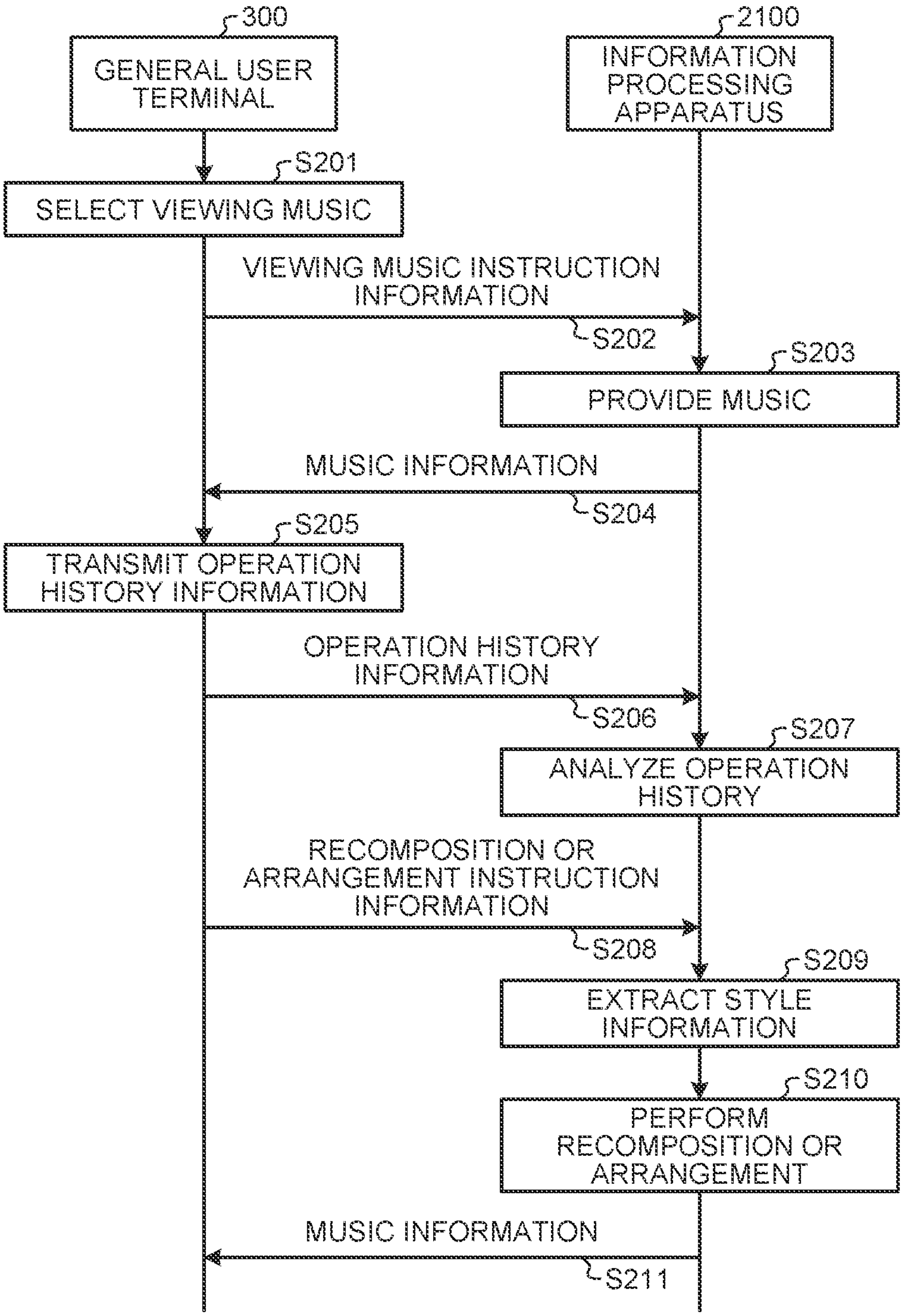
FIG. 27 is a sequence diagram illustrating a procedure of information processing according to the second embodiment.

Next, a procedure of various information processing according to the second embodiment will be described with reference to FIG. 27. FIG. 27 is a sequence diagram illustrating a procedure of information processing according to the second embodiment. In FIG. 27, the processing of providing the playlist to the user will be described.

Steps S201 to S207 illustrated in FIG. 27 are the same processing as Steps S161 to S167 illustrated in FIG. 25. The information processing apparatus 2100 receives instruction information giving an instruction on recomposition or editing from the general user terminal 300 (Step S208). The information processing apparatus 2100 obtains music information whose number of times of predetermined operation exceeds the threshold value on the basis of the results of analysis with respect to the operation history information of the user, and ranks the style information used for the obtained music information in descending order of the number of times of predetermined operation. Then, the information processing apparatus 2100 extracts style information of a preset rank (Step S209).

The information processing apparatus 2100 recomposes or arranges the music information on the basis of the style information extracted in Step S209 (Step S210). Then, the information processing apparatus 2100 transmits the recomposed or arranged music information to the general user terminal 300 (Step S211).

[3-6. Effects According to the Second Embodiment]

As described above, in the second embodiment, the instruction information is operation history information indicating a history of operations executed with respect to a user terminal apparatus by the user who views music when the application is activated. The information processing apparatus (the information processing apparatus 2100 in the embodiment) further includes the analysis unit (the analysis unit 2137 in the embodiment) that analyzes the operation history information and obtains the number of times of each operation by the user. Thus, the information processing apparatus can analyze the user's preference for the music information.

In addition, the extraction unit (extraction unit 2132 in the embodiment) ranks the music feature information in descending order of the number of times of predetermined operation on the basis of the results of analysis by the analysis unit, and extracts the music feature information of the preset rank. The output unit (transmission unit 133 in the embodiment) outputs the presentation information of the music feature information extracted by the extraction unit to a producer terminal apparatus in which a music creation-related application is installed. Thus, the information processing apparatus can present the style information of the music information preferred by the user to the producer terminal. As a result, the producer can produce new music requested by the user in substantially real time by using the music feature information used for currently popular music.

In addition, the information processing apparatus further includes the generation unit (transmission unit 2138 in the embodiment) that obtains music information whose number of times of predetermined operation exceeds the threshold value on the basis of the results of analysis by the analysis unit, and generates a playlist on the basis of the obtained music information. The output unit outputs the playlist to the user terminal apparatus. Thus, the information processing apparatus can generate a playlist that matches the user's preference and distribute and provide the playlist customized for each user.

In addition, the extraction unit obtains music information whose number of times of predetermined operation exceeds the threshold value on the basis of the results of analysis by the analysis unit, ranks the music feature information used for the obtained music information in descending order of the number of times of predetermined operation, and extracts the music feature information of the preset rank. The composition unit recomposes or arranges the music information on the basis of the style information extracted by the extraction unit. The output unit outputs the recomposed or arranged music information to the user terminal apparatus. Thus, the information processing apparatus can further recompose or arrange the production music being reproduced using the style information used for the production music that the user prefers, and provide the user with the recomposed or arranged music.

As described above, according to the second embodiment, the convenience of the music creation function by the producer can be improved, and the convenience of the music viewing function by the user can also be improved.

4. Third Embodiment

[4-1. Example of the Information Processing According to the Third Embodiment]

Figure 28:
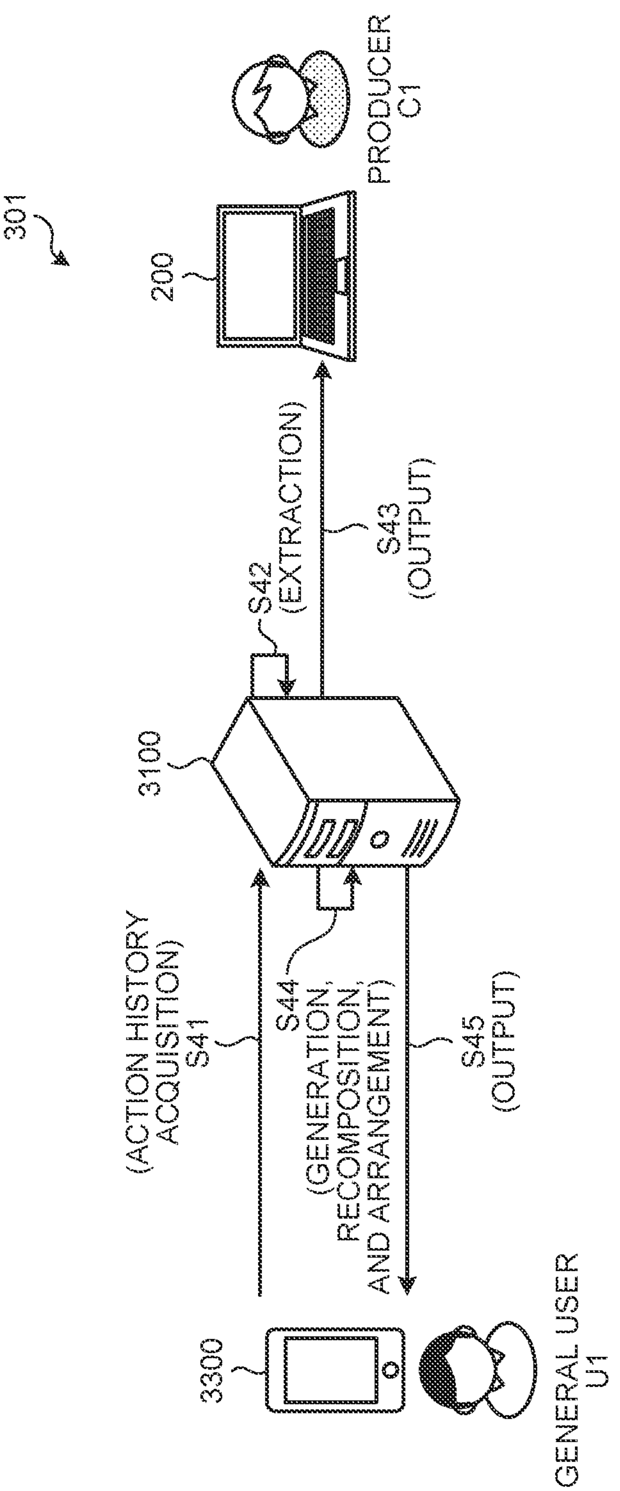
FIG. 28 is a conceptual diagram illustrating a flow of information processing according to a third embodiment.

Next, an example of information processing according to the third embodiment will be described with reference to FIG. 28. FIG. 28 is a conceptual diagram illustrating a flow of information processing according to the third embodiment. The information processing according to the third embodiment is executed by an information processing apparatus 3100, a producer terminal 200, and a user terminal 3300.

Similarly to the general user terminal 300, the general user terminal 3300 is a tablet terminal or the like, and a music viewing application is installed. The general user terminal 3300 transmits action history information indicating a history of movement of the general user terminal 3300 to the information processing apparatus 3100.

Similarly to the information processing apparatus 2100, the information processing apparatus 3100 provides the presentation information of the style information or the music information to the producer terminal 200. In addition, on the basis of the action history information of the general user terminal 3300, the information processing apparatus 3100 presents the style information to the producer terminal 200, provides a playlist of the music information provided to the general user terminal 3300, or recomposes or arranges the music information provided to the general user terminal 3300.

A flow of information processing according to the third embodiment will be specifically described with reference to FIG. 28. As illustrated in FIG. 28, the information processing apparatus 3100 acquires the action history information in the general user terminal 3300 (Step S41). Then, the information processing apparatus 3100 obtains music information viewed on the general user terminal 3300 and analyzes the action history information to obtain the position of the user.

Then, the information processing apparatus 3100 ranks the style information used for the music information viewed a number of times exceeding a threshold value at a predetermined place, extracts the style information of the preset rank (Step S42), and outputs the style information to the producer terminal 200 (Step S43). The information processing apparatus 3100 classifies, for example, as to where the production music registered in the owned information storage unit 123 is viewed. The predetermined place is, for example, a local government where the user is located, an event venue where the user is located, or the like.

As described above, in the information processing according to the third embodiment, the action history information with respect to the general user terminal 3300 is analyzed, and the style information of the music information which is frequently viewed by general users at a predetermined place is presented to the producer terminal 200. Thus, the producer can produce new music that is preferred at a specific place in substantially real time using, for example, the style information of the music information preferred at a specific place.

In addition, the information processing apparatus 3100 analyzes the action history information, obtains music information in which the number of times of predetermined operation exceeds the threshold value at a predetermined place, generates a playlist on the basis of the obtained music information (Step S44), and outputs the playlist to the general user terminal 3300 (Step S45).

As described above, in the information processing according to the third embodiment, the action history information with respect to the general user terminal 3300 is analyzed, the playlist matching the user's preference is generated, and the playlist customized specifically for the place where the user is located is distributed and provided. For example, the information processing apparatus 3100 can distribute and provide different area hit playlists to a user in Tokyo and a user in Yokohama. In addition, for example, the information processing apparatus 3100 can distribute and provide a playlist specialized for an event while dynamically creating the playlist.

Then, the information processing apparatus 3100 analyzes the action history information, ranks the style information used for the music information in which the number of times of predetermined operation exceeds the threshold value at the predetermined place in descending order of the number of times of predetermined operation, and extracts the style information of the preset rank. The information processing apparatus 3100 recomposes or arranges the music information on the basis of the extracted style information (Step S44), and outputs the recomposed or arranged music information to the general user terminal 3300 (Step S45).

As described above, in the information processing according to the third embodiment, it is possible to further recompose or arrange the production music being reproduced using the style information used for the production music preferred at the place where the user is located, and to provide the user with the recomposed or arranged music. Thus, for example, the general user can reproduce the production music being reproduced in a form arranged at the place. The recomposition and the arrangement may be actively performed by the user transmitting instruction information from the general user terminal 3300, or may be automatically performed by the information processing apparatus 3100 on the basis of the action history information. Next, a configuration of an information processing system 301 including the information processing apparatus 3100, the producer terminal 200, and the general user terminal 3300 will be described, and details of various processing will be described in order.

[4-2. Configuration of the Information Processing System According to the Third Embodiment]

Figure 29:
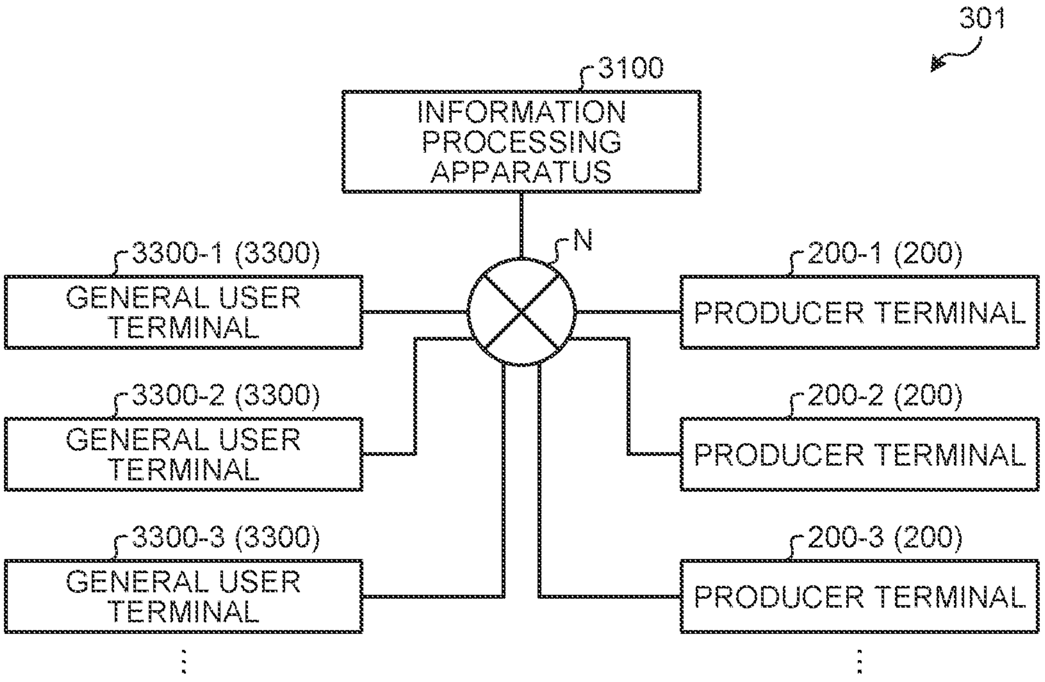
FIG. 29 is a diagram illustrating an example of an information processing system according to the third embodiment.

FIG. 29 is a diagram illustrating an example of the information processing system 301 according to the third embodiment. As illustrated in FIG. 29, the information processing system 301 includes producer terminals 200-1 to 200-3, general user terminals 3300-1 to 3300-3, and the information processing apparatus 3100. The information processing system 301 functions as an automatic composition function management system and a viewing music provision system. In the example of FIG. 29, three producer terminals 200-1 to 200-3 are illustrated, but are referred to as the producer terminal 200 when described without particular distinction. In addition, in the example of FIG. 29, three general user terminals 3300-1 to 3300-3 are illustrated, but are referred to as the general user terminal 3300 when described without particular distinction.

The information processing apparatus 3100 and the producer terminal 200 are communicably connected to each other by wire or wirelessly via the network N. The information processing apparatus 3100 and the general user terminal 3300 are communicably connected to each other by wire or wirelessly via the network N.

The general user terminal 3300 transmits the action history information indicating a movement history of the general user terminal 3300 to the information processing apparatus 3100. The general user terminal 3300 receives provision of a playlist generated and music information recomposed or arranged by the information processing apparatus 3100 at the time of viewing music.

Similarly to the information processing apparatus 100, the information processing apparatus 3100 includes a plurality of pieces of style information as learning data of machine learning. The information processing apparatus 3100 analyzes the action history information received from the general user terminal 3300. The information processing apparatus 3100 outputs the presentation information of the style information extracted on the basis of the results of analysis of the action history information to the producer terminal 200 to support creation of music by the producer. In addition, the information processing apparatus 3100 generates a playlist customized according to the position of the viewer on the basis of the results of analysis of the action history information, and provides the playlist to the general user terminal 3300. In addition, the information processing apparatus 3100 further recomposes or arranges the production music being reproduced using the style information used for the production music preferred at the place where the user is located on the basis of the results of analysis of the action history information, and provides the user with the recomposed or arranged music.

[4-3. Configuration of the Information Processing Apparatus 3100 According to the Third Embodiment]

Figure 30:
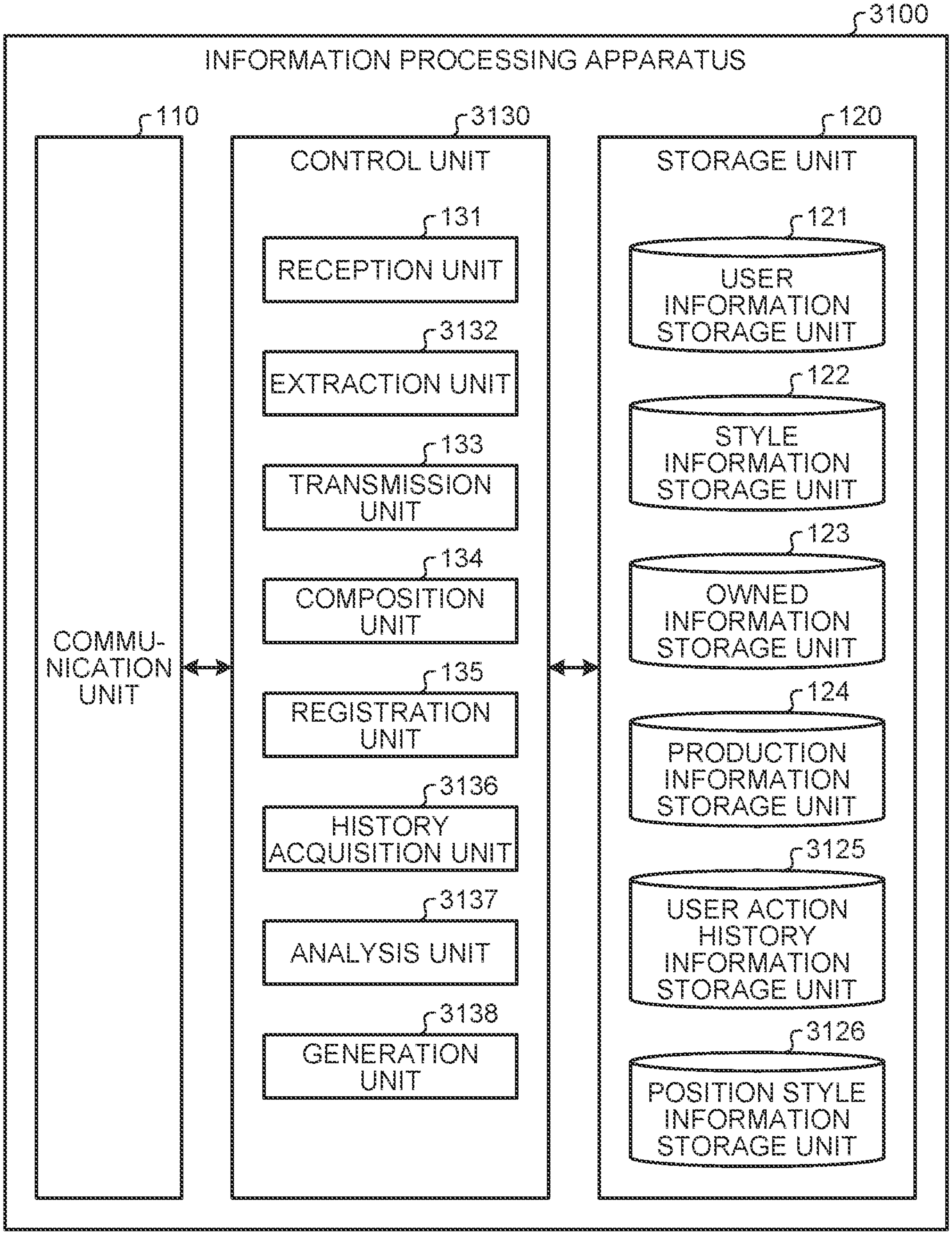
FIG. 30 is a diagram illustrating a configuration example of an information processing apparatus according to the third embodiment.

Next, a configuration of the information processing apparatus 3100 illustrated in FIG. 29 will be described with reference to FIG. 30. FIG. 30 is a diagram illustrating a configuration example of the information processing apparatus 3100 according to the third embodiment. As illustrated in FIG. 30, in the information processing apparatus 3100, a storage unit 120 includes a user action history information storage unit 3125 and a position style information storage unit 3126. Then, the information processing apparatus 3100 includes a control unit 3130 instead of the control unit 130.

Figure 31:
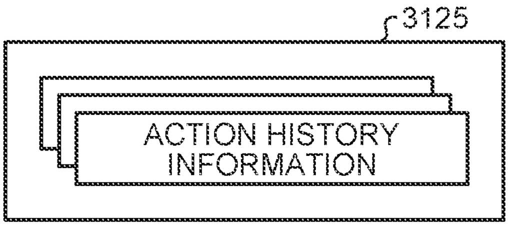
FIG. 31 is a diagram illustrating an example of a user action history information storage unit according to the third embodiment.

The user action history information storage unit 3125 stores a history of the position of the general user terminal 3300. FIG. 31 is a diagram illustrating an example of the user action history information storage unit 3125 according to the third embodiment.

As illustrated in FIG. 31, the user action history information storage unit 3125 stores the action history information of the general user terminal 3300. For example, each piece of the action history information is associated with the user ID of each user. The action history information of the user is information indicating a history of the position of the general user terminal 300. For example, the position history information of the user may include the position of the user such as date and time with respect to each position together with each position information of the user terminal 3300.

Figure 32:
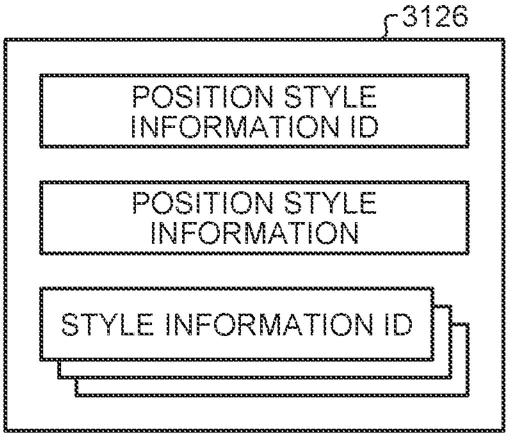
FIG. 32 is a diagram illustrating an example of a position style information storage unit according to the third embodiment.

The position style information storage unit 3126 stores the style information corresponding to a predetermined position. FIG. 32 is a diagram illustrating an example of the position style information storage unit 3126 according to the third embodiment.

As illustrated in FIG. 31, the position style information storage unit 3126 stores position style information ID, position style information, and style information ID. The position style information ID is identification information for uniquely specifying the position style information. The position style information is information indicating a position. The style information ID is identification information for uniquely specifying the style information. As described above, the position style information is information indicating the style information used for the music information that has been preferred to be viewed at the position indicated by the position style information.

As compared with the control unit 130 illustrated in FIG. 7, the control unit 3130 includes an extraction unit 3132, a history acquisition unit 3136, an analysis unit 3137, and a generation unit 3138.

The history acquisition unit 3136 acquires the action history information from the general user terminal 3300. The history acquisition unit 3136 may acquire target action history information of the user from the action history information stored in the user action history information storage unit 3125. In addition, the history acquisition unit 3136 may acquire the action history information by requesting transmission of the action history information to the general user terminal 3300.

The analysis unit 3137 obtains music information viewed on the general user terminal 3300 and analyzes the action history information to obtain the position of the user. In addition, the analysis unit 3137 may obtain the number of times of each operation to analyze music information that matches the user's preference or music information that does not match the user's preference. For example, the analysis unit 3137 classifies music whose number of times of reproduction is larger than the threshold value as music that the user likes. In addition, the analysis unit 3137 classifies music whose number of times of reproduction is smaller than the threshold value as music that the user does not like. In addition, the analysis unit 3137 classifies skipped music as disliked music.

The generation unit 2138 obtains music information whose number of times of predetermined operation exceeds the threshold value at the predetermined place, and generates a playlist on the basis of the obtained music information. The predetermined operation is reproduction, repeating, favorite registration, and the like.

The extraction unit 3132 ranks the style information used for the music information viewed a number of times exceeding a threshold value at a predetermined place by using a predetermined rule on the basis of the results of analysis by the analysis unit 3137, and extracts the style information of the preset rank. The transmission unit 133 transmits the presentation information of the style information extracted by the extraction unit 3132 to the producer terminal 200.

Then, the composition unit 134 recomposes or arranges the music information on the basis of the style information extracted by the extraction unit 3132. The transmission unit 133 transmits the recomposed or arranged music information to the general user terminal 3300.

[4-4. Configuration of the General User Terminal 3300 According to the Third Embodiment]

Figure 33:
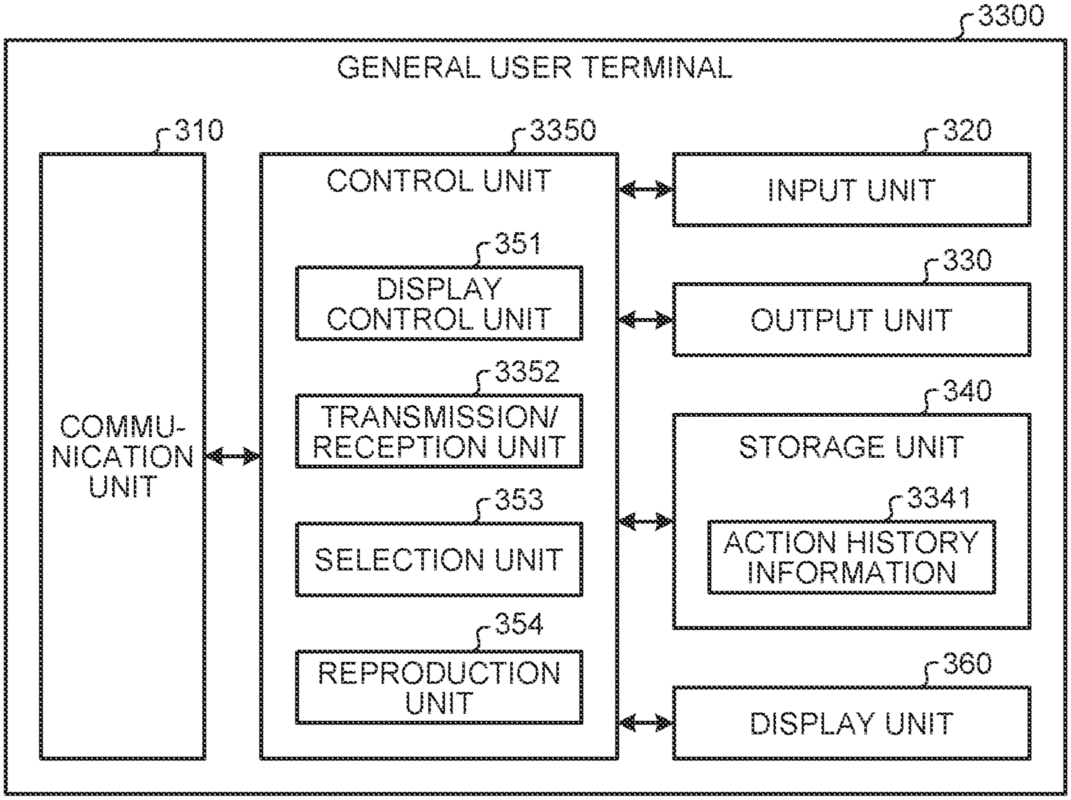
FIG. 33 is a diagram illustrating a configuration example of a general user terminal according to the third embodiment.

Next, a configuration of the general user terminal 3300 illustrated in FIG. 29 will be described with reference to FIG. 33. FIG. 33 is a diagram illustrating a configuration example of the general user terminal 3300 according to the third embodiment. As illustrated in FIG. 33, the general user terminal 3300 includes a control unit 3350 instead of the control unit 350 illustrated in FIG. 24. In addition, a storage unit 340 of the general user terminal 3300 stores action history information 3341 indicating a movement history of the general user terminal 3300. The action history information 3341 is generated using a GPS function or the like of the general user terminal 3300.

The control unit 3350 has a function similar to that of the control unit 350 illustrated in FIG. 24. The control unit 3350 includes a transmission/reception unit 3352 that performs transmission/reception having a function similar to that of the transmission/reception unit 352 illustrated in FIG. 24 and transmits the action history information 3341.

[4-5. Procedure of the Information Processing According to the Fourth Embodiment]

[4-5-1. Processing of Presenting Style Information]

Figure 34:
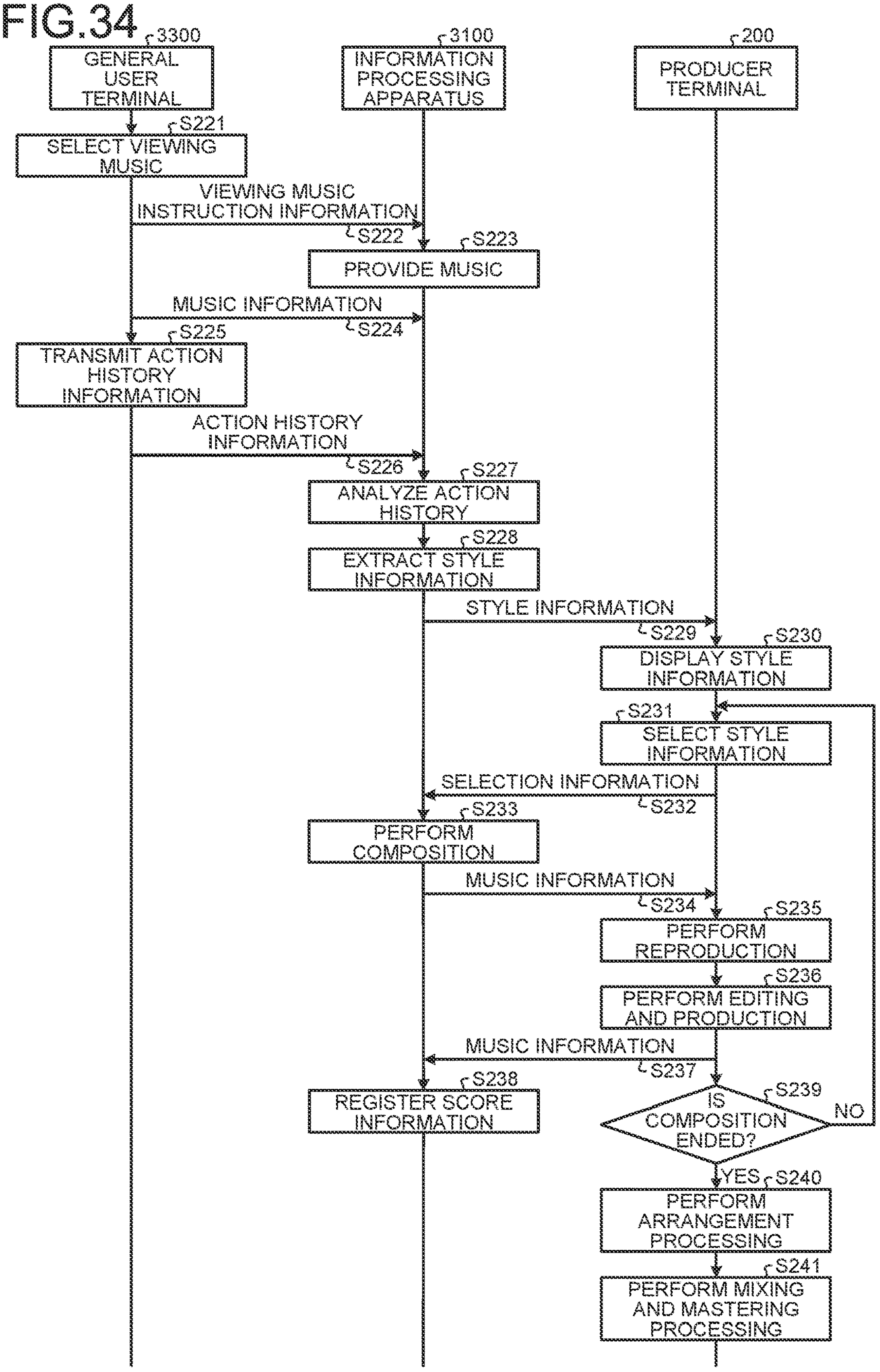
FIG. 34 is a sequence diagram illustrating a procedure of information processing according to the third embodiment.

Next, a procedure of various information processing according to the third embodiment will be described with reference to FIG. 34. FIG. 34 is a sequence diagram illustrating a procedure of information processing according to the third embodiment. In FIG. 34, the processing of presenting the style information to the producer will be described.

Steps S221 to S224 illustrated in FIG. 34 are the same processing as Steps S161 to S164 illustrated in FIG. 25. The general user terminal 3300 transmits the action history information of the general user terminal 3300 to the information processing apparatus 3100 (Steps S225 and S226).

The information processing apparatus 3100 obtains music information viewed on the general user terminal 3300 and analyzes the action history information to obtain the position of the user (Step S227). Then, the information processing apparatus 3100 ranks the style information used for the music information viewed a number of times exceeding the threshold value at a predetermined place by using the predetermined rule on the basis of the results of analysis, and extracts the style information of the preset rank (Step S228). Thus, the information processing apparatus 3100 extracts the style information of the music information preferred at the place where the user is located.

The information processing apparatus 3100 transmits the presentation information of the extracted style information to the producer terminal 200 (Step S229). Steps S230 to S241 illustrated in FIG. 34 are the same processing as Steps S169 to S181 illustrated in FIG. 25.

[4-5-2. Processing of Providing Playlist]

Figure 35:
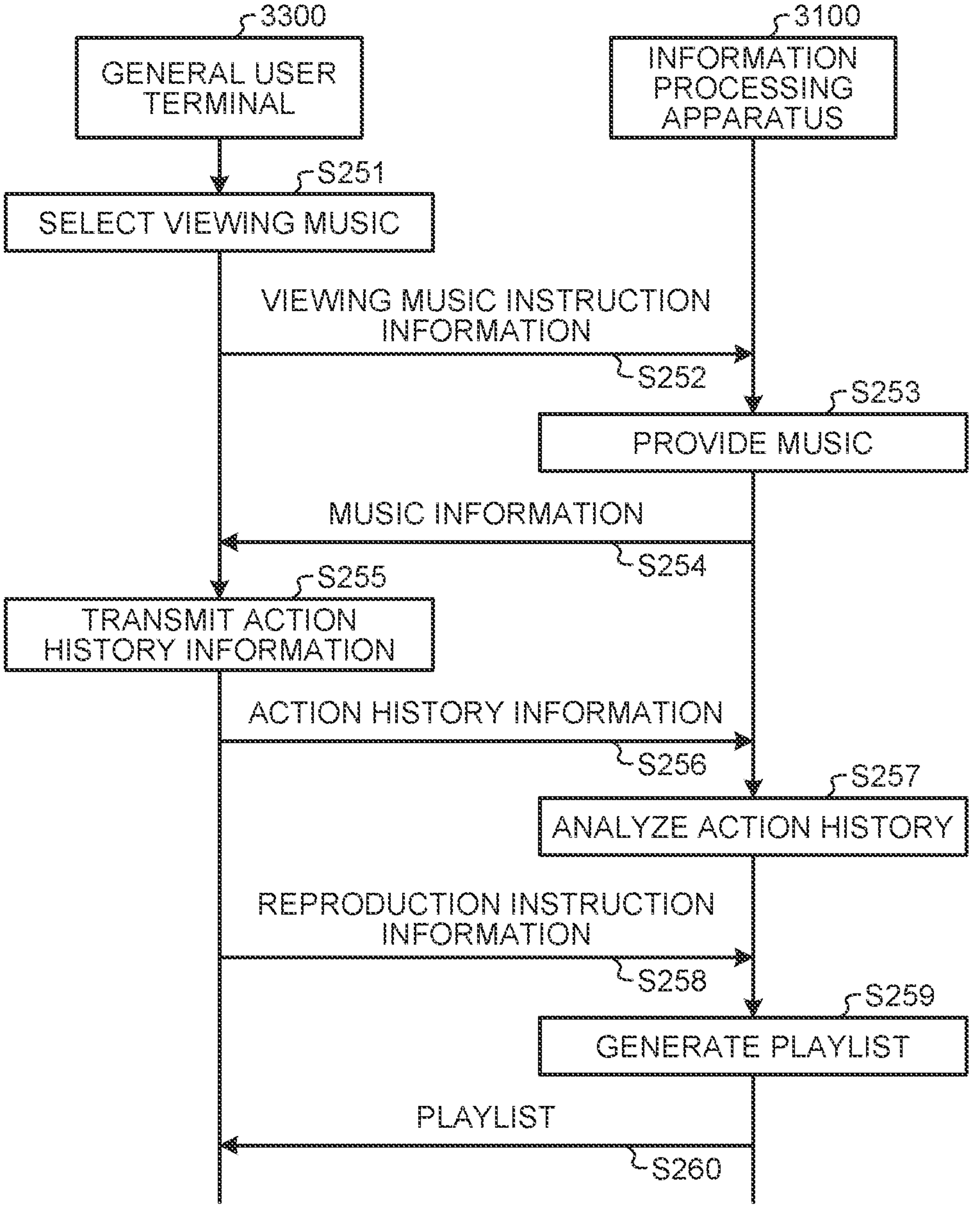
FIG. 35 is a sequence diagram illustrating a procedure of information processing according to the third embodiment.

Next, a procedure of various information processing according to the third embodiment will be described with reference to FIG. 35. FIG. 35 is a sequence diagram illustrating a procedure of information processing according to the third embodiment. In FIG. 35, the processing of providing the playlist to the user will be described.

Steps S251 to S257 illustrated in FIG. 35 are the same processing as Steps S2211 to S227 illustrated in FIG. 34. When receiving reproduction instruction information giving an instruction on reproduction from the general user terminal 3300 (Step S258), the information processing apparatus 3100 generates a playlist (Step S259). In Step S259, the information processing apparatus 3100 obtains music information whose number of times of predetermined operation exceeds the threshold value at the predetermined place on the basis of the results of analysis, and generates a playlist on the basis of the obtained music information. Then, the information processing apparatus 3100 transmits the generated playlist to the general user terminal 300 (Step S260).

[4-5-3. Processing of Providing Music Information after Recomposition or Arrangement]

Figure 36:
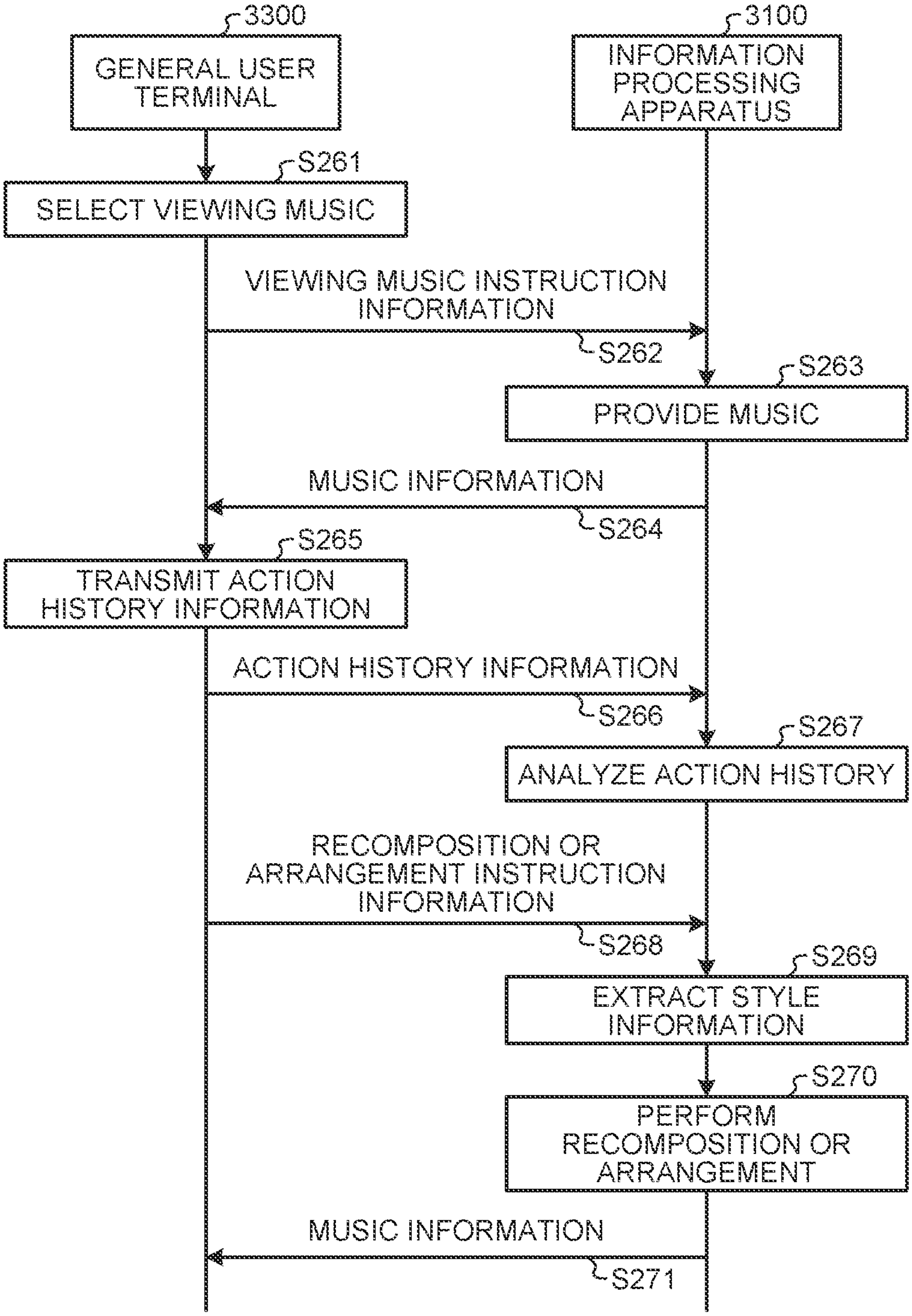
FIG. 36 is a sequence diagram illustrating a procedure of information processing according to the third embodiment.

Next, a procedure of various information processing according to the third embodiment will be described with reference to FIG. 36. FIG. 36 is a sequence diagram illustrating a procedure of information processing according to the third embodiment. In FIG. 36, the processing of providing the music information after recomposition or arrangement to the user will be described.

Steps S261 to S267 illustrated in FIG. 36 are the same processing as Steps S221 to S227 illustrated in FIG. 34. The information processing apparatus 3100 receives instruction information giving an instruction on recomposition or editing from the general user terminal 300 (Step S268). The information processing apparatus 3100 ranks the style information used for the music information viewed a number of times exceeding the threshold value at a predetermined place by using the predetermined rule on the basis of the results of analysis, and extracts the style information of the preset rank (Step S269).

The information processing apparatus 3100 recomposes or arranges the music information on the basis of the style information extracted in Step S269 (Step S370). Then, the information processing apparatus 3100 transmits the recomposed or arranged music information to the general user terminal 300 (Step S371).

[4-6. Effects According to the Third Embodiment]

As described above, in the third embodiment, the instruction information is the action history information indicating the movement history of the user terminal apparatus (the general user terminal 3300 in the embodiment). The information processing apparatus (the information processing apparatus 3100 in the embodiment) further includes the analysis unit (the analysis unit 3137 in the embodiment) that obtains music information viewed on the user terminal apparatus and analyzes the action history information to obtain the position of the user. Thus, the information processing apparatus can analyze the music information preferred to be viewed at the place where the user is located.

In addition, the extraction unit (the extraction unit 3132 in the embodiment) ranks the music feature information used for the music information viewed a number of times exceeding the threshold value at a predetermined place by using the predetermined rule on the basis of the results of analysis by the analysis unit, and extracts the music feature information of the preset rank. The output unit (transmission unit 133 in the embodiment) outputs the presentation information of the music feature information extracted by the extraction unit to a producer terminal apparatus in which a music creation-related application is installed. In this manner, the information processing apparatus can present the music feature information of the music information that is frequently viewed by general users at the predetermined place to the producer terminal. Thus, the producer can produce new music that is preferred at a specific place in substantially real time using the music feature information of the music information preferred at a specific place.

In addition, the information processing apparatus further includes the generation unit (transmission unit 3138 in the embodiment) that obtains music information whose number of times of predetermined operation exceeds the threshold value at the predetermined place from the results of analysis by the analysis unit, and generates a playlist on the basis of the obtained music information. The output unit outputs the playlist to the user terminal apparatus located at the predetermined place. Thus, the information processing apparatus generates the playlist matching the user's preference and distributes and provides the playlist customized specifically for the place where the user is located.

In addition, the extraction unit ranks the music feature information used for the music information whose number of times of predetermined operation exceeds the threshold value at the predetermined place in descending order of the number of times of predetermined operation from the results of analysis by the analysis unit, and extracts the music feature information of the preset rank. The composition unit recomposes or arranges the music information on the basis of the music feature information extracted by the extraction unit. The output unit outputs the recomposed or arranged music information to the user terminal apparatus located at the predetermined place. Thus, the information processing apparatus can further recompose or arrange the production music being reproduced using the music feature information used for the production music preferred at the place where the user is located, and provide the user with the recomposed or arranged music.

As described above, according to the third embodiment, the convenience of the music creation function by the producer can be improved, and the convenience of the music viewing function by the user can also be improved according to the place where the user is located.

5. Conceptual Diagram of Configuration of the Information Processing System

Figure 37:
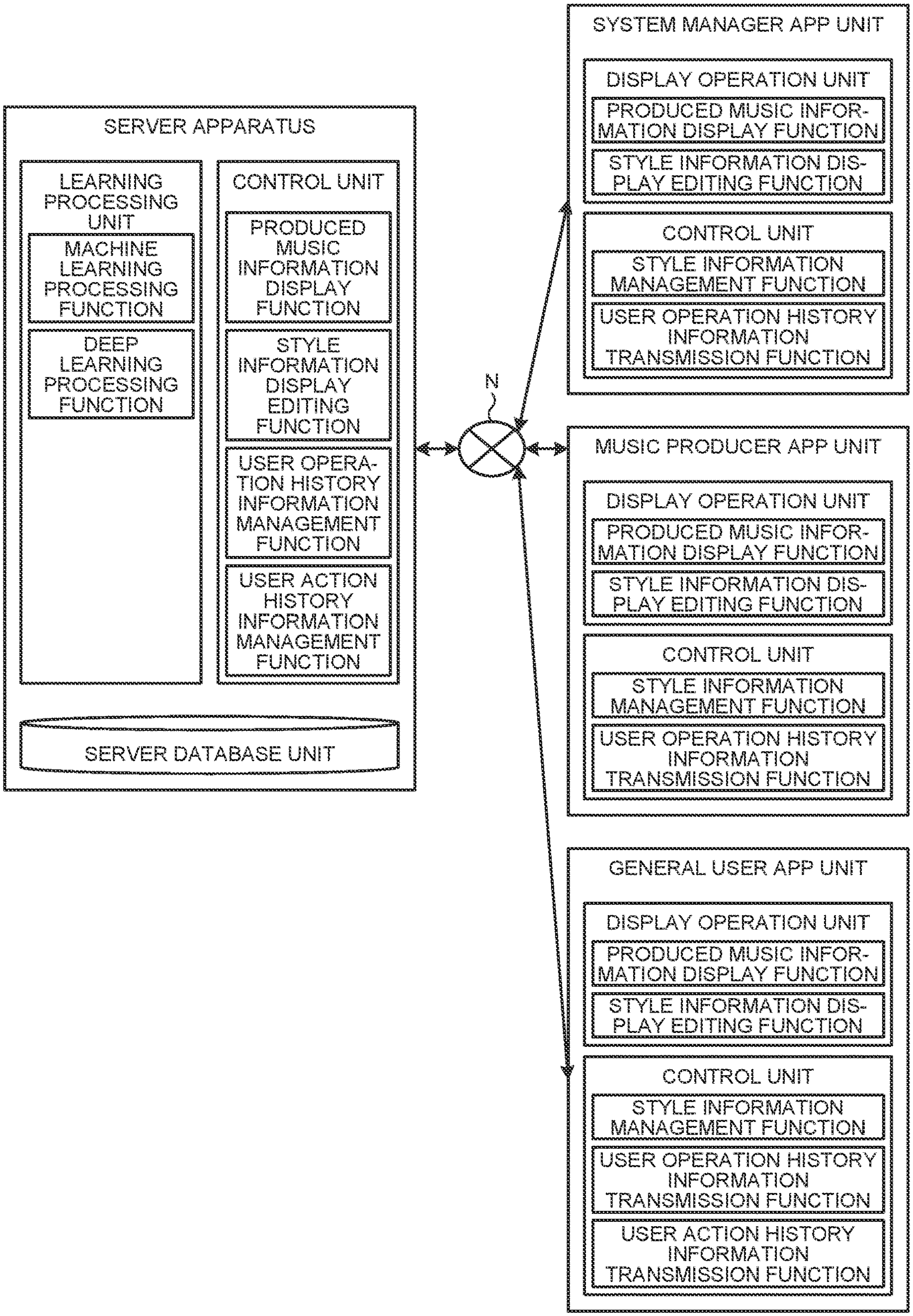
FIG. 37 is a diagram illustrating an example of a conceptual diagram of a configuration of an information processing system.

Here, each function, a hardware configuration, and data in the information processing system will be conceptually described with reference to the drawings. FIG. 37 is a diagram illustrating an example of a conceptual diagram of a configuration of the information processing system.

Specifically, FIG. 37 is a schematic diagram illustrating a functional outline of a system that is an example of applying the information processing systems 1, 201, and 301.

[5-1. Regarding Overall Configuration]

The server apparatus illustrated in FIG. 37 corresponds to the information processing apparatuses 100, 2100, and 3100 in the information processing systems 1, 201, and 301. In addition, a system manager app unit illustrated in FIG. 37 corresponds to an app installed in a terminal used by the system manager. In addition, a producer app unit illustrated in FIG. 37 corresponds to the producer terminal 200 in the information processing system 1 and an app installed in the producer terminal 200. In addition, a general user app unit illustrated in FIG. 37 corresponds to the general user terminals 300 and 3300 in the information processing systems 201 and 301 and an app installed in the general user terminals 300 and 3300. In the example of FIG. 37, one system manager app unit, one music producer app unit, and one general user app unit are illustrated, but a plurality of these may be included depending on the number of corresponding terminals.

A learning processing unit and a control unit of the server apparatus illustrated in FIG. 37 correspond to the control units 130, 2130, and 3130 of the information processing apparatuses 100, 2100, and 3100. For example, the learning processing unit of the server apparatus corresponds to the composition unit 134 of the information processing apparatuses 100, 2100, and 3100. A server database unit of the server apparatus corresponds to the storage unit 120 of the information processing apparatuses 100, 2100, and 3100.

A display operation unit and a control unit of the music producer app unit illustrated in FIG. 37 correspond to the control unit 250 of the producer terminal 200. For example, the display operation unit of the music producer app unit corresponds to the display control unit 251 of the producer terminal 200. A display operation unit and a control unit of the general user app unit illustrated in FIG. 37 correspond to the control unit 350 of the general user terminals 300 and 3300. For example, a display operation unit of the general user app unit corresponds to the display control unit 351 of the general user terminals 300 and 3300. The display operation units and control units of the system manager app unit and the general user app unit correspond to the control unit of the terminal apparatus used by each user.

As illustrated in FIG. 37, the server apparatus is connected to the system manager app unit, the music producer app unit, and the general user app unit via the network N such as the Internet.

[5-2. Regarding Server Apparatus]

First, a configuration related to the server apparatus will be described.

The server apparatus includes the control unit, the learning processing unit, and the server database unit. The control unit of the server apparatus has a produced music information management function, a style information management function, a user operation history information management function, and user action history information. The learning processing unit of the server apparatus has a machine learning processing function and a deep learning processing function.

[5-3. Regarding Music Producer App Unit]

Next, a configuration related to the music producer app unit will be described.

The music producer app unit includes the display operation unit and the control unit. The display operation unit of the music producer app unit has a produced music information display function and a style information display editing function. The music producer app unit has a style information share function and a user operation history information transmission function.

The music producer app unit is, for example, music editing software (DAW or the like), and can display, for example, music information by a copyrighted work information display function. When the DAW has, for example, an AI-assisted music production function, new music information can be produced using the style information display editing function. Note that the system manager app unit has the same configuration, and the authority of the user with respect to the system is different.

[5-4. Regarding General User App]

Next, a configuration related to the general user app unit will be described.

The general user app unit includes the display operation unit and the control unit. The display operation unit of the general user app unit has a produced music information display function and a style information display editing function. The music producer app unit has a style information share function, user operation history information transmission function, and a user action history information transmission function.

[5-5. UI (User Interface)]

Figure 38:
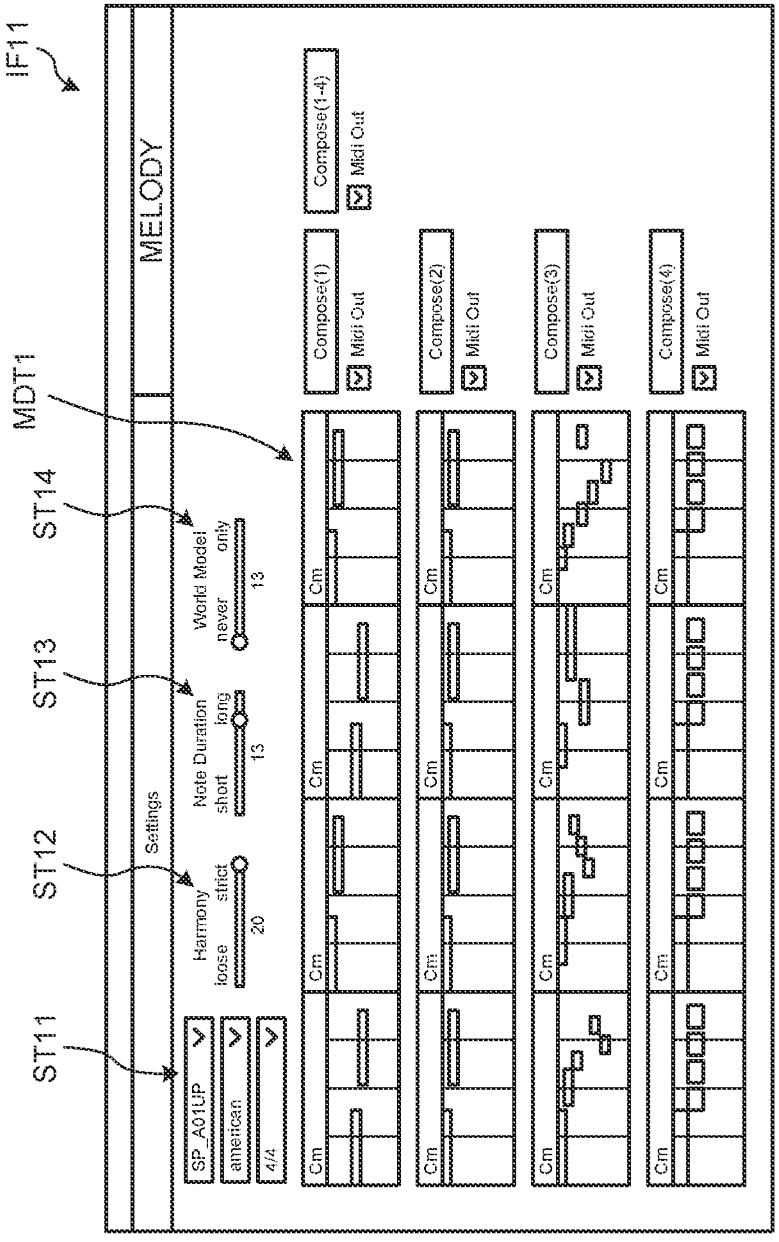
FIG. 38 is a diagram illustrating an example of a user interface according to the embodiment.
Figure 39:
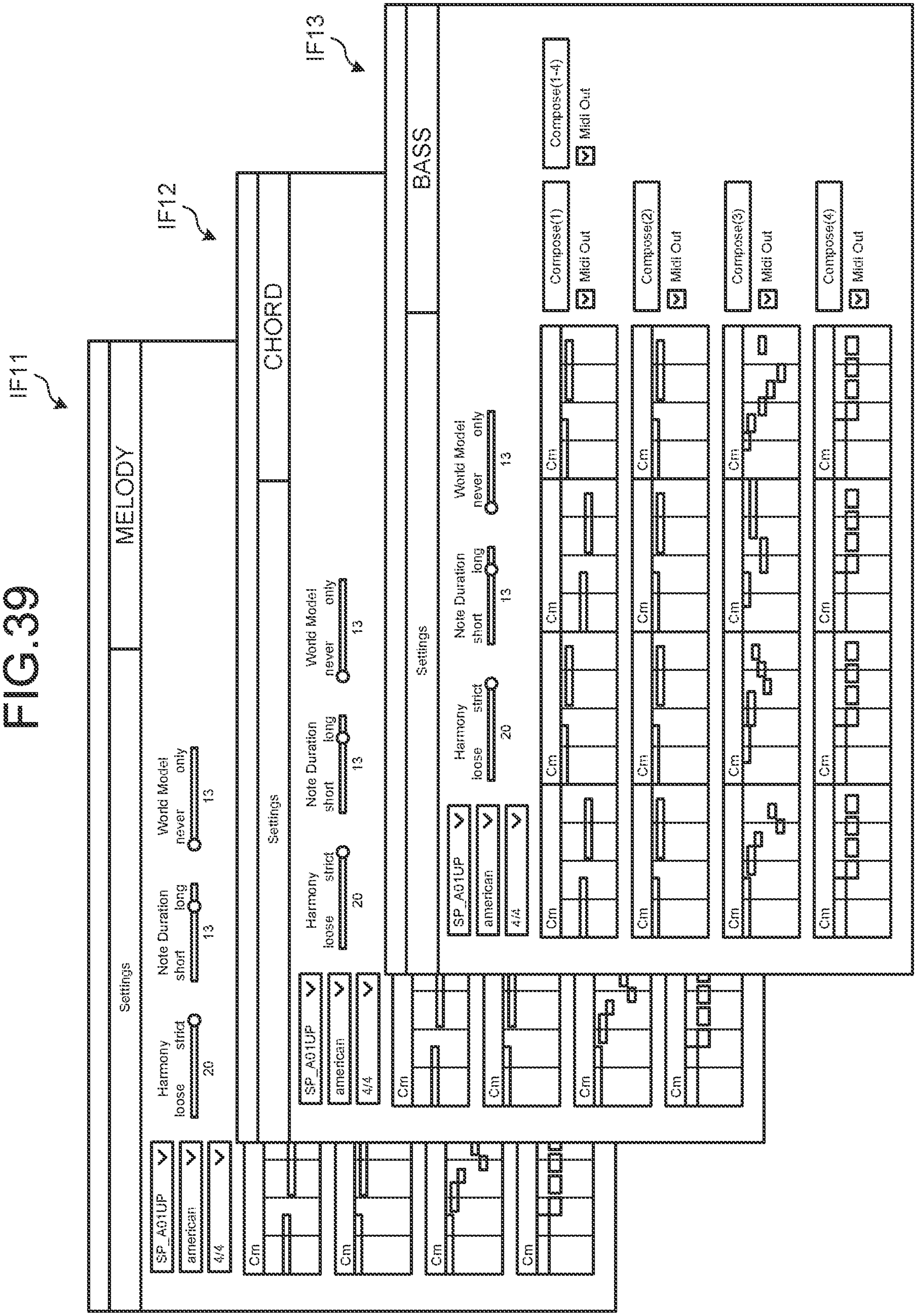
FIG. 39 is a diagram illustrating an example of a user interface according to the embodiment.

Here, details of the automatic composition function including information display by an app (music creation app) will be described with reference to FIGS. 38 and 39. FIGS. 38 and 39 are diagrams illustrating an example of a user interface according to the embodiment.

FIG. 38 illustrates an example of a user interface when the music creation app is displayed on the screen of the producer terminal 200.

In the example illustrated in FIG. 38, a user interface IF11 displays music data received by the music creation app. Note that, although details will be described below, the music data in the music creation app includes three types of different data: a melody, a chord, and a bass sound. The user interface IF11 illustrated in FIG. 38 displays data related to a melody among the three types of different data.

Setting information ST11 displays information regarding the style palette, which is an example of the setting information in the automatic composition function. The style palette is designation information for designating style information that becomes learning data of machine learning.

Setting information ST12 displays information regarding harmony, which is an example of the setting information in the automatic composition function. The information regarding harmony is, for example, information for determining a probability that a constituent sound included in a chord appears in a melody in music data composed by the information processing apparatus 100. For example, when the user sets the information regarding harmony to "strict", the probability that the constituent sound included in the chord appears in the melody in the automatically composed music data increases. On the other hand, when the user sets the information regarding harmony to "loose", the probability that the constituent sound included in the chord appears in the melody in the automatically composed music data decreases. The example of FIG. 38 indicates that the user applies the information regarding harmony to "strict".

Setting information ST13 displays note duration information, which is an example of the setting information in the automatic composition function. The note duration information is, for example, information for determining the note duration in the music data composed by the information processing apparatus 100. For example, when the user sets the note duration information to "long", the probability that a note having a relatively long length of a sound to be made (for example, a whole note, a half note, or the like) appears in the automatically composed music data increases. On the other hand, when the user sets the note duration information to "short", the probability that a note having a relatively short length of a sound to be made (for example, an eighth note, a sixteenth note, or the like) appears in the automatically composed music data increases.

Setting information ST14 displays information for determining the type and amount of material music other than material music included in the designation information (the style palette designated by the user), which is an example of the setting information in the automatic composition function. Such information is, for example, information for determining whether or not to strictly perform learning on the basis of music included in a style palette designated by the user in the music data composed by the information processing apparatus 100. For example, when the user sets such information to "never", music other than music included in the style palette is less likely to be used in the learning in the automatic composition. On the other hand, when the user sets such information to "only", music other than music included in the style palette is more likely to be used in the learning in the automatic composition.

Music data MDT1 displays specific music data transmitted from the information processing apparatus 100. In the example of FIG. 38, the music data MDT1 includes information indicating a chord progression such as of Cm, information indicating a pitch or note duration in a bar, transition of the pitch of a note (in other words, a melody), and the like. In addition, as illustrated in FIG. 26, the music data MDT1 may include, for example, four types of different contents. That is, the information processing apparatus 100 may transmit a plurality of pieces of music data instead of transmitting only one type of automatically composed music data. Thus, the user can select its favorite music data from a plurality of generated music data candidates or compose a favorite music by combining a plurality of pieces of music data.

Note that the user interface IF11 illustrated in FIG. 38 displays data related to a melody among the three types of different data: the melody, the chord, and the bass sound included in the music data, and other data is displayed on another user interface. This point will be described with reference to FIG. 39.

As illustrated in FIG. 39, in addition to the user interface IF11 that displays the data related to the melody, the producer terminal 200 may display a user interface IF12 that displays the data related to the chord and a user interface IF13 that displays the data related to the bass sound on the screen.

Although not illustrated in FIG. 39, note information different from the music data MDT1 in the user interface IF11 is displayed on the user interface IF12 or the user interface IF13. Specifically, note information (for example, the constituent sound or the like of Cm chord) related to a chord corresponding to the melody of music data is displayed on the user interface IF12. In addition, note information (for example, in the case of Cm chord, "C" sound or the like) related to a bass sound corresponding to the melody or chord of music data is displayed on the user interface IF13.

The user can select information to be copied from the displayed user interface IF11, user interface IF12, and user interface IF13, and perform work such as editing a part of the bass sound.

6. Other Embodiments

The processing according to the embodiment and variation described above may be performed in various different forms (variations) other than the embodiment and variation described above.

[6-1. Other Configuration Examples]

Each of the above-described configurations is an example, and the information processing systems 1, 201, and 301 may be any system configuration as long as the above-described information processing can be realized.

[6-2. Others]

In addition, among the pieces of processing described in each of the above embodiments, all or some of the pieces of processing described as being performed automatically can be performed manually, or all or some of the pieces of processing described as being performed manually can be performed automatically by a known method. In addition, the processing procedures, the specific names, and the information including various data and parameters indicated in the document and the drawings can be arbitrarily changed unless otherwise specified. For example, the various information illustrated in each drawing is not limited to the illustrated information.

In addition, each component of each apparatus illustrated in the drawings is functionally conceptual, and is not necessarily physically configured as illustrated in the drawings. That is, a specific form of distribution and integration of apparatuses is not limited to those illustrated, and all or a part thereof can be functionally or physically distributed and integrated in an arbitrary unit according to various loads, usage situations, and the like.

In addition, the above-described embodiments and variation can be appropriately combined within a range not contradicting processing contents.

In addition, the effects described in the present specification are merely examples and are not limitative, and there may be other effects.

7. Hardware Configuration

Figure 40:
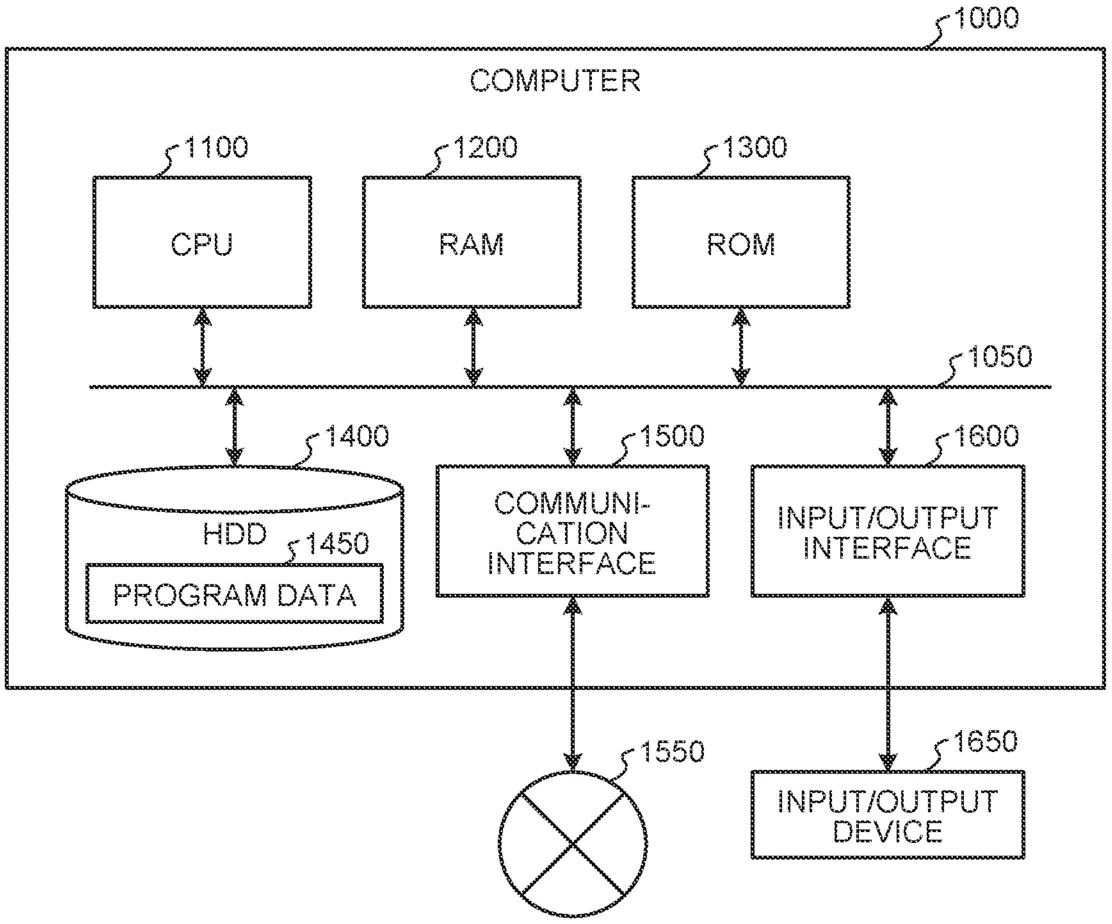
FIG. 40 is a hardware configuration diagram illustrating an example of a computer that implements functions of an information processing apparatus and a general user terminal.

The information devices such as the information processing apparatuses 100, 2100, and 3100, the producer terminal 200, the general user terminals 300 and 3300, or the like according to the embodiments and variation described above are realized by a computer 1000 having a configuration as illustrated, for example, in FIG. 40. FIG. 40 is a hardware configuration diagram illustrating an example of the computer 1000 that implements the functions of the information processing apparatuses 1002100 and 3100, the producer terminal 200, and the general user terminals 300 and 3300. Hereinafter, the information processing apparatus 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 loads the program stored in the ROM 1300 or the HDD 1400 to the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, a printer, or the like via the input/output interface 1600. In addition, the input/output interface 1600 may function as a media interface that reads a program or the like recorded in a predetermined recording medium (medium). The medium is, for example, an optical recording medium such as a digital versatile disc (DVD), phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing apparatus 100 according to the embodiment, the CPU 1100 of the computer 1000 executes an information processing program loaded on the RAM 1200 to realize the functions of the control unit 130 and the like. In addition, the HDD 1400 stores an information processing program according to the present disclosure and data in the storage unit 120. Note that the CPU 1100 reads the program data 1450 from the HDD 1400 and executes the program data, but as another example, these programs may be acquired from another apparatus via the external network 1550.

Note that the present technology can also have the following configurations.

(1)

An information processing apparatus comprising:

a storage unit that stores a plurality of pieces of music feature information in which a plurality of types of feature amounts extracted from music information is associated with predetermined identification information, the music feature information being used as learning data in composition processing using machine learning;

a reception unit that receives instruction information transmitted from a terminal apparatus;

an extraction unit that extracts the music feature information from the storage unit according to the instruction information; and an output unit that outputs presentation information of the music feature information extracted by the extraction unit.

(2)

The information processing apparatus according to (1), wherein the instruction information includes information regarding the feature amounts, the extraction unit ranks a plurality of pieces of the music feature information by using a predetermined rule on a basis of the information regarding the feature amounts, and extracts the music feature information of a preset rank, and the output unit outputs the presentation information of the music feature information extracted by the extraction unit to an external apparatus together with ranking information indicating ranking of the music feature information.

(3)

The information processing apparatus according to (2), wherein the instruction information is operation information in the terminal apparatus.

(4)

The information processing apparatus according to (3), wherein the music feature information includes score information including chord progression information indicating a chord progression, melody information indicating a melody, and bass information indicating a bass progression in a bar having a prescribed length.

(5)

The information processing apparatus according to (4), wherein the score information further includes drum progression information indicating a drum progression in the bar having the prescribed length.

(6)

The information processing apparatus according to (4), wherein the music feature information includes lyric information indicating lyrics in the bar having the prescribed length.

(7)

The information processing apparatus according to (6), wherein the music feature information includes music format information in which identification information of the score information and identification information of the lyric information for a same bar are registered in association with each other, and music order information indicating an order of the music format information.

(8)

The information processing apparatus according to (4), wherein the reception unit receives instruction information for selecting one piece of the score information, and the extraction unit ranks the music feature information including the score information selected by the instruction information by using a predetermined rule, and extracts the music feature information of a preset rank.

(9)

The information processing apparatus according to (6), wherein the reception unit receives instruction information giving an instruction to search lyrics, and the extraction unit ranks the music feature information including lyric information including the lyrics for which instruction of searching is given by the instruction information by using a predetermined rule, and extracts the music feature information of a preset rank.

(10)

The information processing apparatus according to (3), wherein the terminal apparatus is a producer terminal apparatus in which an application related to creation of music is installed, the instruction information is operation history information indicating a history of an operation executed with respect to the producer terminal apparatus by a producer who creates music when the application is activated, the extraction unit obtains music information in which a number of times of predetermined operation exceeds a threshold value on a basis of the operation history information, ranks music feature information used for the obtained music information in descending order of the number of times of predetermined operation, and extracts the music feature information of a preset rank, and the output unit outputs the presentation information of the music feature information extracted by the extraction unit to the producer terminal apparatus.

(11)

The information processing apparatus according to (3), wherein the terminal apparatus is a user terminal apparatus in which an application for viewing music is installed, the instruction information is operation history information indicating a history of an operation executed with respect to the user terminal apparatus by a user who views the music when the application is activated, and the information processing apparatus further comprises:

an analysis unit that analyzes the operation history information to obtain a number of times of each operation.

(12)

The information processing apparatus according to (11), wherein the extraction unit obtains music information in which a number of times of predetermined operation exceeds a threshold value on a basis of results of analysis by the analysis unit, ranks music feature information used for the obtained music information in descending order of the number of times of predetermined operation, and extracts the music feature information of a preset rank, and the output unit outputs the presentation information of the music feature information extracted by the extraction unit to a producer terminal apparatus in which an application related to creation of music is installed.

(13)

The information processing apparatus according to (11), further comprising:

a generation unit that obtains music information in which a number of times of predetermined operation exceeds a threshold value on a basis of results of analysis by the analysis unit, and generates a playlist on a basis of the obtained music information, wherein the output unit outputs the playlist to the user terminal apparatus.

(14)

The information processing apparatus according to (11), further comprising:

a composition unit that composes music information using machine learning on a basis of the music feature information, wherein the extraction unit obtains the music information in which a number of times of predetermined operation exceeds a threshold value on a basis of results of analysis by the analysis unit, ranks music feature information used for the obtained music information in descending order of the number of times of predetermined operation, and extracts the music feature information of a preset rank, the composition unit recomposes or arranges the music information on a basis of the music feature information extracted by the extraction unit, and the output unit outputs the recomposed or arranged music information to the user terminal apparatus.

(15)

The information processing apparatus according to (3), wherein the terminal apparatus is a user terminal apparatus in which an application for viewing music is installed, the instruction information is action history information indicating a movement history of the user terminal apparatus, and the information processing apparatus further comprises:

an analysis unit that obtains music information viewed by the user terminal apparatus and analyzes the action history information to obtain a position of the user.

(16)

The information processing apparatus according to (15), wherein the extraction unit ranks the music feature information used for music information viewed a number of times exceeding a threshold value at a predetermined place by using a predetermined rule on a basis of results of analysis by the analysis unit, and extracts the music feature information of a preset rank, and the output unit outputs the presentation information of the music feature information extracted by the extraction unit to a producer terminal apparatus in which an application related to creation of music is installed.

(17)

The information processing apparatus according to (15), further comprising:

a generation unit that obtains music information in which a number of times of predetermined operation exceeds a threshold value at a predetermined place on a basis of results of analysis by the analysis unit, and generates a playlist on a basis of the obtained music information, wherein the output unit outputs the playlist to the user terminal apparatus located at the predetermined place.

(18)

The information processing apparatus according to (15), further comprising:

a composition unit that composes music information using machine learning on a basis of the music feature information, wherein the extraction unit ranks the music feature information used for music information in which a number of times of predetermined operation exceeds a threshold value at a predetermined place in descending order of the number of times of predetermined operation on a basis of results of analysis by the analysis unit, and extracts the music feature information of a preset rank, the composition unit recomposes or arranges the music information on a basis of the music feature information extracted by the extraction unit, and the output unit outputs the recomposed or arranged music information to the user terminal apparatus located at the predetermined place.

(19)

An information processing method executed by a computer, the method comprising:

receiving instruction information transmitted from a terminal apparatus;

extracting music feature information according to the instruction information from a plurality of pieces of the music feature information in which a plurality of types of feature amounts extracted from music information is associated with predetermined identification information; and outputting presentation information of the extracted music feature information.

(20)

An information processing program causing a computer to:

receive instruction information transmitted from a terminal apparatus;

extract music feature information according to the instruction information from a plurality of pieces of the music feature information in which a plurality of types of feature amounts extracted from music information is associated with predetermined identification information; and output presentation information of the extracted music feature information.

REFERENCE SIGNS LIST

1, 201, 301 INFORMATION PROCESSING SYSTEM
100, 2100, 3100 INFORMATION PROCESSING APPARATUS
110, 210, 310 COMMUNICATION UNIT
120, 240, 340 STORAGE UNIT
121 USER INFORMATION STORAGE UNIT
122 STYLE INFORMATION STORAGE UNIT
123 OWNED INFORMATION STORAGE UNIT
124 PRODUCTION INFORMATION STORAGE UNIT
125 OPERATION HISTORY INFORMATION STORAGE UNIT
130, 250, 350, 2130, 3130, 3350 CONTROL UNIT
131 RECEPTION UNIT
132, 2132, 3132 EXTRACTION UNIT
133 TRANSMISSION UNIT
134 COMPOSITION UNIT
135 REGISTRATION UNIT
136, 2136, 3136 HISTORY ACQUISITION UNIT
137, 2137, 3137 ANALYSIS UNIT
200 PRODUCER TERMINAL
220, 320 INPUT UNIT
230, 330 OUTPUT UNIT
241, 341 OPERATION HISTORY INFORMATION
251, 351 DISPLAY CONTROL UNIT
252, 352, 3352 TRANSMISSION/RECEPTION UNIT
253, 353 SELECTION UNIT
254, 354 REPRODUCTION UNIT
260, 360 DISPLAY UNIT
300, 3300 GENERAL USER TERMINAL
2125 USER OPERATION HISTORY INFORMATION
2138, 3138 GENERATION UNIT
3125 USER ACTION HISTORY INFORMATION STORAGE UNIT
2136 POSITION STYLE INFORMATION STORAGE UNIT
3341 ACTION HISTORY INFORMATION

The invention claimed is:

1. An information processing apparatus comprising:

memory configured to store a plurality of pieces of music feature information including score information in which a plurality of types of feature amounts extracted from music information is associated with predetermined identification information, the music feature information being used as learning data in composition processing using machine learning;

a communication interface configured to receive instruction information transmitted from a terminal apparatus that specifies selection of the music feature information; and circuitry configured to extract the music feature information from the memory according to the instruction information, the extracted music feature information indicating characteristics of the learning data to be used in the composition processing;

output presentation information of the extracted music feature information for display as a list of candidates for the learning data at the terminal apparatus; and receive, from the terminal apparatus via the communication interface, selection information specifying at least one piece of the extracted music feature information selected from the displayed list to be used as the learning data prior to initiating the composition processing.

2. The information processing apparatus according to claim 1, wherein the instruction information includes information regarding the feature amounts, and the circuitry is configured to rank a plurality of pieces of the music feature information by using a predetermined rule on a basis of the information regarding the feature amounts;

extract the music feature information arranged in a preset rank, and output the presentation information of the extracted music feature information to an external apparatus together with ranking information indicating ranking of the music feature information.

3. The information processing apparatus according to claim 2, wherein the instruction information is operation information in the terminal apparatus.

4. The information processing apparatus according to claim 3, wherein the music feature information includes score information including chord progression information indicating a chord progression, melody information indicating a melody, and bass information indicating a bass progression in a bar having a prescribed length.

5. The information processing apparatus according to claim 4, wherein the score information further includes drum progression information indicating a drum progression in the bar having the prescribed length.

6. The information processing apparatus according to claim 4, wherein the music feature information includes lyric information indicating lyrics in the bar having the prescribed length.

7. The information processing apparatus according to claim 6, wherein the music feature information includes music format information in which identification information of the score information and identification information of the lyric information for a same bar are registered in association with each other, and music order information indicating an order of the music format information.

8. The information processing apparatus according to claim 6, wherein the communication interface is configured to receive instruction information for instructing to search lyrics, and the circuitry is configured to rank the music feature information including lyric information including the lyrics for which instruction of searching is given by the instruction information by using a predetermined rule; and extract the music feature information arranged in a preset rank.

9. The information processing apparatus according to claim 4, wherein the communication interface is configured to receive instruction information for selecting any one piece of the score information, and the circuitry is configured to rank the music feature information including the score information selected by the instruction information by using a predetermined rule; and extract the music feature information arranged in a preset rank.

10. The information processing apparatus according to claim 3, wherein the terminal apparatus is a producer terminal apparatus in which an application related to creation of music is installed, the instruction information is operation history information indicating, in response to activation of the application, a history of an operation on the producer terminal apparatus by a producer of music, and the circuitry is configured to obtain music information for which a number of executions of predetermined operation is determined to exceed a threshold value on a basis of the operation history information;

rank music feature information used for the obtained music information in descending order of the number of executions of predetermined operation;

extract the music feature information arranged in a preset rank; and output the presentation information of the extracted music feature information to the producer terminal apparatus.

11. The information processing apparatus according to claim 3, wherein the terminal apparatus is a user terminal apparatus in which an application for listening to music is installed, the instruction information is operation history information indicating, in response to activation of the application, a history of an operation on the user terminal apparatus by a user who listens to the music, and the circuitry is configured to analyze the operation history information to obtain a number of executions of each operation.

12. The information processing apparatus according to claim 11, wherein the circuitry is configured to:

obtain music information for which a number of executions of predetermined operation is determined to exceed a threshold value on a basis of results of analysis;

rank music feature information used for the obtained music information in descending order of the number of executions of predetermined operation;

extract the music feature information arranged in a preset rank; and output the presentation information of the extracted music feature information to a producer terminal apparatus in which an application related to creation of music is installed.

13. The information processing apparatus according to claim 11, wherein the circuitry is configured to:

obtain music information for which a number of executions of predetermined operation is determined to exceed a threshold value;

generate a playlist on a basis of the obtained music information; and output the playlist to the user terminal apparatus.

14. The information processing apparatus according to claim 11, wherein the circuitry is configured to:

compose music information using machine learning on a basis of the music feature information;

obtain the music information for which a number of executions of predetermined operation is determined to exceed a threshold value;

rank music feature information used for the obtained music information in descending order of the number of executions of predetermined operation;

extract the music feature information arranged in a preset rank;

recompose or arrange the music information on a basis of the music feature information extracted by the extraction unit; and output the recomposed or arranged music information to the user terminal apparatus.

15. The information processing apparatus according to claim 3, wherein the terminal apparatus is a user terminal apparatus in which an application for listening to music is installed, the instruction information is action history information indicating a movement history of the user terminal apparatus, and the circuitry is configured to obtain music information played by the user terminal apparatus; and analyze the action history information to obtain a position of the user.

16. The information processing apparatus according to claim 15, wherein the circuitry is configured to:

rank the music feature information used for music information played a number of times exceeding a threshold value at a predetermined place by using a predetermined rule on a basis of results of the analysis;

extract the music feature information arranged in a preset rank; and output the presentation information of the extracted music feature information to a producer terminal apparatus in which an application related to creation of music is installed.

17. The information processing apparatus according to claim 15, wherein the circuitry is configured to:

obtain music information for which a number of executions of predetermined operation at a predetermined place is determined to exceed a threshold value;

generate a playlist on a basis of the obtained music information; and output the playlist to the user terminal apparatus located at the predetermined place.

18. The information processing apparatus according to claim 15, wherein the circuitry is configured to:

compose music information using machine learning on a basis of the music feature information;

rank the music feature information used for music information for which a number of executions of predetermined operation at a predetermined place is determined to exceed a threshold value, the rank being in descending order of the number of executions of the predetermined operation;

extract the music feature information arranged in a preset rank;

recompose or arrange the music information on a basis of the extracted music feature information; and output the recomposed or arranged music information to the user terminal apparatus located at the predetermined place.

19. An information processing method comprising:

receiving instruction information transmitted from a terminal apparatus that specifies selection of music feature information;

extracting the music feature information according to the instruction information from a plurality of pieces of the music feature information including score information in which a plurality of types of feature amounts extracted from music information is associated with predetermined identification information, the extracted music feature information indicating characteristics of learning data to be used in composition processing using machine learning;

outputting presentation information of the extracted music feature information for display as a list of candidates for the learning data at the terminal apparatus; and receiving selection information specifying at least one piece of the extracted music feature information selected from the displayed list to be used as the learning data prior to initiating the composition processing.

20. A non-transitory computer-readable medium including computer-program instructions, which when executed by circuitry, cause the circuitry to:

receive instruction information transmitted from a terminal apparatus that specifies selection of music feature information;

extract the music feature information according to the instruction information from a plurality of pieces of the music feature information including score information in which a plurality of types of feature amounts extracted from music information is associated with predetermined identification information, the extracted music feature information indicating characteristics of learning data to be used in composition processing using machine learning;

output presentation information of the extracted music feature information for display as a list of candidates for the learning data at the terminal apparatus; and receive selection information specifying at least one piece of the extracted music feature information selected from the displayed list to be used as the learning data prior to initiating the composition processing.

* * * * *